(12) United States Patent
Cristi et al.

(10) Patent No.: US 12,371,194 B2
(45) Date of Patent: *Jul. 29, 2025

(54) METHOD, SYSTEM AND APPARATUS FOR SPACECRAFT ATTITUDE CONTROL ERROR REDUCTION IN TRAJECTORY INTERPOLATION

(71) Applicant: THE UNITED STATES OF AMERICA, AS REPRESENTED BY THE SECRETARY OF THE NAVY, Arlington, VA (US)

(72) Inventors: Roberto Cristi, Pebble Beach, CA (US); Joshua Levitas, Monterey, CA (US); Mark Karpenko, Salinas, CA (US)

(73) Assignee: The Government of the United States of America, as represented by the Secretary of the Navy, Alington, VA (US)

( * ) Notice: Subject to any disclaimer, the term of this patent is extended or adjusted under 35 U.S.C. 154(b) by 69 days.

This patent is subject to a terminal disclaimer.

(21) Appl. No.: 18/537,554

(22) Filed: Dec. 12, 2023

(65) Prior Publication Data
US 2024/0190588 A1 Jun. 13, 2024

Related U.S. Application Data

(63) Continuation-in-part of application No. 18/130,565, filed on Apr. 4, 2023.

(60) Provisional application No. 63/431,855, filed on Dec. 12, 2022.

(51) Int. Cl.
B64G 1/24 (2006.01)

(52) U.S. Cl.
CPC ........... *B64G 1/245* (2023.08); *B64G 1/2422* (2023.08)

(58) Field of Classification Search
CPC .................................. B64G 1/244; G05D 1/04
See application file for complete search history.

(56) References Cited

U.S. PATENT DOCUMENTS

| | | | | | |
|---|---|---|---|---|---|
| 6,142,423 | A | * | 11/2000 | Wehner | B64G 1/66 244/164 |
| 6,975,087 | B1 | * | 12/2005 | Crabill | G05B 11/42 318/590 |
| 9,061,775 | B2 | * | 6/2015 | Ross | B64G 1/244 |

(Continued)

OTHER PUBLICATIONS

Panda; "Generalized B-spline signal processing"; Signal Processing 55; 1996; pp. 1-14 (Year: 1996).*

(Continued)

*Primary Examiner* — Stephen Holwerda
(74) *Attorney, Agent, or Firm* — Heber Martin Carbajal; Scott Bell

(57) ABSTRACT

A method, apparatus and system for controlling an attitude of a spacecraft, the spacecraft including an attitude control system operatively associated with a ground-based spacecraft control system. According to an exemplary embodiment, the spacecraft attitude control system uses a B-spline interpolator for commanding the spacecraft and a Kalman filtering process is used to estimate B-spline interpolator coefficients. The methods and systems disclosed herein can be implemented in, for example, executable machine code and/or integrated circuit hardware.

20 Claims, 51 Drawing Sheets

(56) References Cited

U.S. PATENT DOCUMENTS

| | | | |
|---|---|---|---|
| 2009/0319065 A1* | 12/2009 | Risbo | H03H 17/0628 |
| | | | 341/61 |
| 2014/0062744 A1* | 3/2014 | Smiley | H03M 1/66 |
| | | | 341/144 |
| 2014/0379176 A1* | 12/2014 | Ross | B64G 1/244 |
| | | | 701/3 |
| 2016/0182101 A1* | 6/2016 | Markovic | H04L 27/364 |
| | | | 375/296 |
| 2023/0312141 A1 | 10/2023 | Karpenko | |

OTHER PUBLICATIONS

Scheid; "Applications for General Purpose Command Buffers: The Emergency Conjunction Avoidance Maneuver"; SpaceOps Conferences, American Institute of Aeronautics and Astronautics; 2016; pp. 1-11 (Year: 2016).*

Lu; "High Precision Modeling for Aerospace TT&C Channels Using Piecewise Osculating Interpolation"; IEEE Transactions on Aerospace and Electronic Systems; vol. 55, No. 3; 2019; pp. 1284-1300 (Year: 2019).*

Sun; "High-Precision Trajectory Data Reconstruction for TT&C Systems Using LS B-Spline Approximation"; IEEE Signal Processing Letters; vol. 27; 2020; pp. 895-899 (Year: 2020).*

NASA, "Lunar Reconnaissance Orbiter." https://lunar.gsfc.nasa.gov/ (accessed Jun. 13, 2022).

B. Steigerwald, "Teaching an old spacecraft new tricks to continue exploring the moon." http://www.nasa.gov/feature/goddard/2021/lro-new-tricks (accessed Jun. 13, 2022).

M. Karpenko, M. Barker, and J. K. Halverson, "Multi-leg occultation avoidance maneuvers for the Lunar Reconnaissance Orbiter," AAS, vol. 175, pp. 4755-4774, 2020.

M. Karpenko, J. K. Halverson, and R. Besser, "Waypoint following dynamics of a quaternion error feedback attitude control system," Proc. Inst. Mech. Eng. Part G J. Aerosp. Eng., May 2021, doi: 10.1177/09544100211010916.

J. E. Sedlak and M. B. Houghton, "Lunar Reconnaissance Orbiter (LRO) attitude maneuver planning," presented at the Proceedings of the 21st International Symposium on Spaceflight Dynamics, Toulouse, France, 2009.

NASA, "NASA Engineering and Safety Center 2018 Technical Update," Hampton, VA, USA,2018. [Online]. Available: https://www.nasa.gov/sites/default/files/atoms/files/nesc_technical_update_2018_mobile_0.pdf.

M. Karpenko, J. T. King, C. J. Dennehy, and M. I. Ross, "Agility analysis of the James Webb space telescope," J. Guid. Control Dyn., vol. 42, No. 4, pp. 810-821, Apr. 2019, doi:10.2514/1.G003816.

Wie, B., Space Vehicle Dynamics and Control, AIAA, Reston, VA, 1998.

Bedrossian, N., Bhatt, S., Kang, W., and Ross, I. M., "Zero-Propellant Maneuver Guidance, "IEEE Control Systems Magazine, Oct. 2009, pp. 53-73.

Karpenko, M., Bhatt, S., Bedrossian, N., and Ross, I. M., "Flight Implementation of Shortest-Time Maneuvers for Imaging Satellites," Journal of Guidance, Control and Dynamics, vol. 37, No. 4, pp. 1069-1079, 2014.

Lippman, T., Kaufman, J.M., and Karpenko, M., "Autonomous Planning of Constrained Spacecraft ReorientationManeuvers," AAS/AIAA Astrodynamics Specialist Conference, Aug. 20-24, 2017 Stevenson, WA. Paper No. AAS 17-676.

Karpenko, M., Ross, I. M., Stoneking, E., Lebsock, K., and Dennehy, N., "A Micro-Slew Concept for Precision Pointing of the Kepler Spacecraft," AAS/AIAA Astrodynamics Specialist Conference, Aug. 9-Aug. 13, 2015, Vail, CO. Paper No. AAS-15-628.

Ross, I. M., Lee, D., and Karpenko, M., Method and apparatus for contingency guidance of a CMGactuated spacecraft, U.S. Pat. No. 9,038,958, issued May 26, 2015.

Marsh, H. C., Karpenko, M., and Gong, Q., "Electrical-Power Constrained Attitude Steering", AAS/AIAA Astrodynamics Specialist Conference, Aug. 20-24, 2017, Stevenson, WA. Paper No. AAS 17-774.

Karpenko, M., Lippman, T., Ross, I. M., Halverson, J. K., McClanahan, T., Barker, M., Mazarico, E., Dennehy, C. J., Besser, R., VanZwieten, T., and Wolf, A., "Fast Attitude Maneuvers for the Lunar Reconnaissance Orbiter," 42nd AAS Guidance, Navigation and Control Conference, Feb. 1-6, 2019, Breckenridge, CO. Paper No. AAS-19-053.18.

Calhoun, P. C., and Garrick, J. C., "Observing Mode Attitude Controller for the Lunar Reconnaissance Orbiter," 20th International Symposium on Space Flight Dynamics, Annapolis, MD, Sep. 24-28, 2007.

Ross, I. M. and Karpenko, M., "A Review of Pseudospectral Optimal Control: From Theory to Flight," Annual Reviews in Control, vol. 36, No. 2, pp. 182-197, 2012.

Fahroo, F. and Ross, I. M., "Direct trajectory optimization by a Chebyshev pseudospectral method," Journal of Guidance, Control, and Dynamics, vol. 25, No. 1, pp. 160-166, 2002.

Babic, D., "Design of polynomial-based digital interpolation filters based on Chebyshev polynomials," 36th International Conference on Telecommunications and Signal Processing, Jul. 2-4, 2013, Rome, Italy.

Berrut, J-P. and Trefethen, L. N., "Barycentric Lagrange Interpolation," SIAM Reveiw, vol. 46, No. 3, pp. 501-517, 2004.

* cited by examiner

METHOD, SYSTEM AND APPARATUS FOR SPACECRAFT ATTITUDE CONTROL ERROR REDUCTION IN TRAJECTORY INTERPOLATION

CROSS REFERENCE TO RELATED PATENT(S) AND APPLICATION(S)

This application claims the benefit of U.S. Provisional Application No. 63/431,855, filed Dec. 12, 2022, and entitled METHOD FOR ERROR REDUCTION IN TRAJECTORY INTERPOLATION, which is hereby incorporated in its entirety by reference.

US Published Patent Application 2023/0312141, by Karpenko et al., filed Apr. 4, 2023, and entitled Method, System and Apparatus For Spacecraft Attitude Control Using B-Spline Interpolation, is hereby incorporated in its entirety by reference.

BACKGROUND

This disclosure, and the exemplary embodiments described herein, describe methods and systems for spacecraft attitude control. The implementation described herein is related to systems and methods for spacecraft attitude control, the spacecraft including an attitude control system operatively associated with a ground-based spacecraft control system and the spacecraft attitude control system using a B-spline interpolator for commanding the spacecraft, however it is to be understood that the scope of this disclosure is not limited to such application.

INCORPORATION BY REFERENCE

The following publications are incorporated by reference in their entirety.

[Ref. 1] Karpenko, M., Polyard, T., Audo, V., Wade, B. M., and Ross, I. M., "Attitude Guidance: Reducing the Cost of Rotating from 'A' to 'B',", 44th Annual AAS Guidance, Navigation and Control Conference, Feb. 4-9, 2022, Breckenridge, CO. Paper number: AAS 22-056.

[Ref. 2] Bedrossian, N., Bhatt, S., Kang, W., and Ross, I. M., "Zero-Propellant Maneuver Guidance," IEEE Control Systems Magazine, October 2009, pp. 53-73.

[Ref. 3] Karpenko, M., Bhatt, S., Bedrossian, N., and Ross, I. M., "Flight Implementation of Shortest-Time Maneuvers for Imaging Satellites," *Journal of Guidance, Control and Dynamics*, vol. 37, no. 4, pp. 1069-1079, 2014.

[Ref. 4] Lippman, T., Kaufman, J. M., and Karpenko, M., "Autonomous Planning of Constrained Spacecraft Reorientation Maneuvers," AAS/AIAA Astrodynamics Specialist Conference, Aug. 20-24, 2017 Stevenson, WA. Paper number: AAS 17-676.

[Ref 5] Marsh, H. C., Karpenko, M., and Gong, Q., "Electrical-Power Constrained Attitude Steering", AAS/AIAA Astrodynamics Specialist Conference, Aug. 20-24, 2017 Stevenson, WA. Paper number: AAS 17-774.

[Ref. 6] Karpenko, M., Ross, I. M., Stoneking, E., Lebsock, K., and Dennehy, N., "A Micro-Slew Concept for Precision Pointing of the Kepler Spacecraft," AAS/AIAA Astrodynamics Specialist Conference, Aug. 9-Aug. 13, 2015, Vail, CO. Paper number: AAS-15-628.

[Ref. 7] U.S. Pat. No. 9,038,958 by Ross et al., granted May 26, 2015, and entitled Method and Apparatus for Contingency Guidance of a CMG-Actuated Spacecraft.

[Ref. 8] National Aeronautics and Space Administration, "Teaching an old spacecraft new tricks to continue exploring the Moon," https:!! www.nasa.gov!feature!goddard!2021! lro-new-tricks! (2021, accessed 20 Aug. 2021).

[Ref. 9] Halverson, J., Hsu, O., Calhoun, P., Snell, S., Besser, R., and DeHart, R., Testing of the Lunar Reconnaissance Orbiter Attitude Control System Re-Design Without a Gyro," 42nd Annual AAS Guidance & Control Conference, Jan. 31 to Feb. 6, 2019, Breckenridge, CO. Paper number: AAS 19-108.

[Ref. 10] Karpenko, M., Halverson, J. K., Besser, R., "Waypoint Following Dynamics of a Quaternion Error Feedback Attitude Control System", *Proc Institution of Mech Eng Part G: Journal Aerospace Engineering*, vol. 236, no. 2, pp. 281-293, 2022.

[Ref. 11] Berrut, J-P. and Trefethen, L. N., "Barycentric Lagrange Interpolation," *SIAM Review*, vol. 46, no. 3, pp. 501-517, 2004.

[Ref. 12] Unser, M., "Splines: A Perfect fit for Signal and Image Processing," *IEEE Signal Processing Magazine*, pp. 22-38, November 1999.

[Ref. 13] Hogenauer, E. B., "An Economical Class of Digital Filters for Decimation and Interpolation," *IEEE Transactions on Acoustics, Speech and Signal Processing*, ASSP-29(2), pp. 155-161, 1984.

[Ref. 14] Frerking, M. *Digital Signal Processing in Communication Systems*, Kluwer Academic Publishers, Boston, 1994.

[Ref. 15] Franklin, G. F., Powell, J. D., and Workman, M. L., *Digital Control of Dynamic Systems*, 3ed., Addison Wesley Longman Inc., Menlo Park, CA, 1998.

[Ref. 16] Vaidyanathan, P. P., *Multirate Systems and Filter Banks*, Prentice Hall, 1993.

[Ref. 17] Harris, F. J., *Multirate Signal Processing for Communication Systems*, Prentice Hall Professional Technical Reference, Upper Saddle River, N J, 2004.

[Ref. 18] Calhoun, P. C., and Garrick, J. C., "Observing Mode Attitude Controller for the Lunar Reconnaissance Orbiter," 20$^{th}$ *International Symposium on Space Flight Dynamics*, Annapolis, M D, Sep. 24-28, 2007.

[Ref. 19] Smith, J. O., "Introduction to Digital Filters with Audio Applications", W3K Publishing, September 2007.

[Ref. 20] Ogata, K., *Discrete-Time Control Systems*, 2 ed., Prentice-Hall, Upper Saddle River, N J, 1995.

[Ref. 21] U.S. Pat. No. 8,880,246, by Karpenko et al., granted Nov. 4, 2014, and entitled Method and Apparatus for Determining Spacecraft Maneuvers.

[Ref. 22] U.S. Pat. No. 9,061,775 by Ross et al., granted Jun. 23, 2015, and entitled Method and Apparatus for Spacecraft Attitude Control Using Polynomial Interpolation.

[Ref. 23] US Published Patent Application 2020/0241569 by Ross et al., filed Jan. 30, 2020, and entitled Method and System For Optimal Trajectory Path Tasking For An Unmanned Aerial Vehicle (UAV).

[Ref. 24] US Published Patent Application 2020/0241569 by Ross et al., filed Jan. 30, 2020, and entitled Method and System For Optimal Trajectory Path Tasking For An Unmanned Aerial Vehicle (UAV).

BRIEF DESCRIPTION

In accordance with one exemplary embodiment of the present disclosure, disclosed is a method for controlling an attitude of a spacecraft, the spacecraft including an attitude control system operatively associated with a ground-based spacecraft control system, the spacecraft attitude control system using a B-spline interpolator for commanding the spacecraft and the method comprising: the ground-based spacecraft control system obtaining an attitude trajectory of the spacecraft; the ground-based spacecraft control system down sampling the attitude trajectory and using a Kalman filtering process to determine time-tagged spacecraft commands; the ground-based spacecraft control system transmitting the time-tagged spacecraft commands to the spacecraft after processing the down sampled attitude trajectory; the spacecraft attitude control system applying a B-spline interpolation filter to a sequence of down-sampled attitude trajectory points to determine a set of interpolated spacecraft commands at an arbitrary upsampling rate; and the spacecraft attitude control system modifying an attitude of the spacecraft based on the interpolated spacecraft commands.

In accordance with another exemplary embodiment of the present disclosure, disclosed is a vehicle guidance system for implementing attitude control of a vehicle, comprising: a command reduction module for generating a reduced data set corresponding to a time-varying attitude command trajectory for a vehicle, the command reduction module comprising: circuitry configured to receive at least one time-varying attitude command; the trajectory defining an attitude of the vehicle; and circuitry configured to reduce the at least one time-varying attitude command trajectory into a vector of polynomial B-spline coefficients using a Kalman filtering process; and a command reconstruction module for generating data corresponding to the time varying attitude command trajectory, the command reconstruction module comprising: circuitry configured to receive the vector of B-spline polynomial coefficients; and circuitry configured to reconstruct at least one time-varying attitude command trajectory by utilizing the vector of B-spline polynomial coefficients to perform a polynomial B-spline interpolation operation.

In accordance with another exemplary embodiment of the present disclosure, disclosed is a method for implementing attitude control of a vehicle, comprising: receiving at a remote location from the vehicle data corresponding to at least one time-varying attitude command trajectory defining an attitude of the vehicle; at the remote location, processing the time-varying attitude command trajectory using a Kalman filtering process to generate a down sampled attitude command trajectory including a vector of polynomial B-spline coefficients; the remote location communicating the down sampled attitude command trajectory to the vehicle; and the vehicle modifying an attitude of the vehicle based on the down sampled attitude command trajectory and an interpolation filter operatively associated with the vehicle.

BRIEF DESCRIPTION OF THE DRAWINGS

For a more complete understanding of the present disclosure, reference is now made to the following descriptions taken in conjunction with the accompanying drawings.

DETAILED DESCRIPTION

Figure 1:
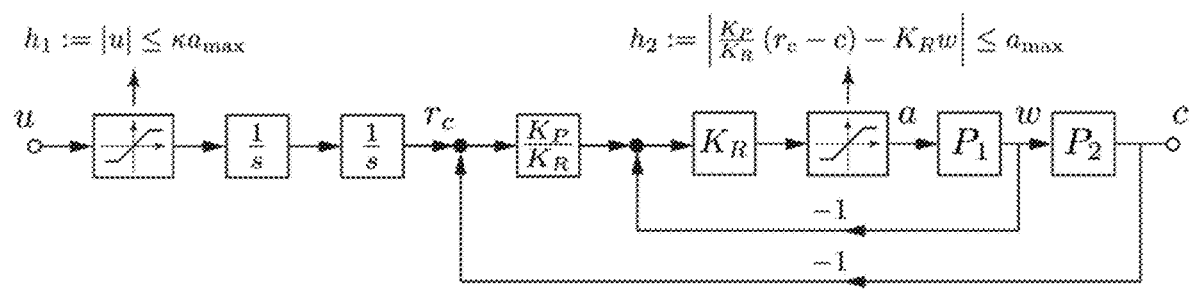
FIG. 1 shows an input shaping model method and system for attitude guidance of a canonical rotational plant.

This disclosure and exemplary embodiments described herein provide methods, systems, and apparatus, for controlling an attitude of a spacecraft, the spacecraft including an attitude control system operatively associated with a ground-based spacecraft control system. According to an exemplary embodiment, the spacecraft attitude control system uses a B-spline interpolator for commanding the spacecraft. The methods and systems disclosed herein can be implemented in, for example, executable machine code and/or integrated circuit hardware.

Attitude guidance is a concept for implementing performance enhancing rotational maneuvers using a conventional closed-loop attitude control system.[Ref. 1] The idea is to operate the attitude control system (ACS) as a tracking controller to follow a pre-computed attitude profile. Attitude guidance has been used to implement the zero-propellant maneuver on the International Space Station [Ref. 2] and to implement time-optimal maneuvers on NASA's TRACE space telescope.[Ref. 3] Other applications of attitude guidance include bright object avoidance, [Ref. 4] reducing reaction wheel power consumption during slew [Ref. 5] and recovering a spacecraft after a hardware failure. [Ref. 6 and Ref. 7] Minimum-time attitude guidance is presently being used for executing agile occultation avoidance maneuvers called FastMan for Fast Maneuvers on NASA's Lunar Reconnaissance Orbiter (LRO). [Ref. 8] FastMan has become an indispensable tool for autonomously generating feasible slew plans that are compatible with the LRO's all-stellar attitude determination filter that was recently implemented to address issues related to the spacecraft's aging inertial measurement unit. [Ref. 9] Without FastMan it is not possible to perform many large angle maneuvers because star tracker occultations during slews are not allowed per the mission operator's flight safety rules.

Maneuver profiles for attitude guidance—including FastMan—are determined by solving trajectory optimization problems formulated to maximize rotational efficiency while satisfying various physics, engineering, and operational constraints. Because a conventional flight computer is resource limited, attitude trajectory generation is done as a ground process. Then to execute maneuvers on orbit, the time-series of incremental attitude commands are first uplinked to the spacecraft and stored in the vehicle's command buffer. The maneuver is then implemented by executing an absolute- or relative-time command sequence. Optimized maneuver trajectories for attitude guidance are continuous-time curves that should be sampled at the update rate of the attitude controller for the best performance.[Ref. 10] Thus, it is apparent that implementing even a single attitude guided maneuver may require the transmission and storage of a large number of time-tagged commands. A challenge in meeting this requirement for practical systems, such as TRACE or LRO, is the time required to uplink these large data sets as well as the limited storage capacity of the spacecraft command buffer. These difficulties arise because spacecraft attitude control systems are typically designed to regulate to an attitude set-point—slew to a single commanded attitude—rather than to track a time-series of incremental rotation commands. For example, a typical roll maneuver for LRO is about 65 deg. The angular rate limit is 0.13 deg/sec so the total maneuver time is about 500 sec. The update rate of the attitude controller is 5 Hz and so nearly 2500 commands are required for command tracking. This number of commands is about the total number of commands that can be stored in the spacecraft's command buffer. Thus, a single attitude guided maneuver can exhaust the capacity of the buffer, which is normally used to store about 7-days of conventional maneuver commands.

One solution to overcome these problems is to preprocess the command time-series by downsampling in order to reduce the length of the data sequence. The downsampled command time-series can then be transmitted and stored on the spacecraft more efficiently. Then, in order to operate the attitude controller, interpolation can be used to reconstruct an approximation of the original command sequence at the required attitude control update rate. As an example, if a maneuver trajectory is downsampled from 5 Hz to 0.1 Hz, a 50:1 compression, then only 50 commands would need to be stored in order to implement an attitude guided maneuver. This would allow nearly 10 attitude guided maneuvers per day to be stored in LRO's command buffer to support the day-to-day operation of the spacecraft.

In previous work, [Ref.10] proposed is the use of a Chebyshev interpolating filter to perform this task. An advantage of this approach is that when downsampling is performed on a non-uniform time grid (the Chebyshev-Gauss-Lobatto grid), the original continuous-time signal can be perfectly reconstructed as a Lagrange polynomial. The disadvantage of the approach is that the support of Lagrange polynomials covers the entire maneuver time-horizon. This means that the entire downsampled command data sequence is needed to evaluate the trajectory at any given instant in time via the Barycentric interpolation formula. [Ref. 11] This disadvantage is not insurmountable but may require significant patching of the ground operations software in addition to the spacecraft flight software in order to 'upgrade' an existing mission.

In this disclosure, proposed is an alternative approach, that enables the attitude guidance concept to be more efficiently implemented for heritage attitude control logics. The idea is to utilize polynomial B-splines as the basis for performing interpolation. [Ref. 12] B-splines of degree n are piecewise curves that are smoothly joined together at uniformly spaced points called 'knots'. [Ref. 12] The splines, defined both in continuous-time and in discrete-time, are generated by recursive convolution of a square pulse with itself. Smoothness constraints are additionally used to ensure the continuity of the spline and its derivatives up to the order n−1. Moreover, B-splines have a compact support, which means they are zero everywhere outside of a short time interval. This property can be exploited to allow the polynomial coefficients for interpolation to be loaded serially from a command buffer according to the spacecraft clock. This greatly simplifies the implementation of the interpolating filter for clock-driven attitude control systems.

The B-spline interpolator is implemented using a Hogenauer filter, [Ref.13] also known as a Cascaded Integrator Comb (CIC) filter, to achieve expansion by a factor of M. A CIC filter structure is composed of a cascade of differentiators, followed by an upsampler (adding M−1 zeros between two samples) and a string of integrators. CIC filters are widely used in digital communications [Ref. 14] and are particularly attractive in applications requiring resampling by a large integer factor. In this particular application, used is a cubic B-spline where each string of differentiators and integrators has length 3 and can thus be implemented by cascading several causal discrete time filters in series. Other spline order can be used as well.

This disclosure presents an overview of the approach and describes how the filter can be implemented by repurposing existing digital filtering routines that may already be available in a spacecraft's flight software. This reduces the effort involved in upgrading an existing vehicle for attitude guidance. Simulations using a high-fidelity simulation model of the LRO spacecraft provided by NASA's Goddard Space Flight Center show that 50:1 data compression (or more) can be achieved without any impact on maneuver performance. In fact, maneuver performance is enhanced over the current state of practice because commands can be generated and issued to the ACS at its native update rate. This eliminates intersample ripple phenomenon and also reduces the stress induced on the attitude control hardware when operating in a trajectory tracking mode.

An input shaping model for attitude guidance of a (simplified) canonical rotational plant is shown in FIG. 1 (see also Karpenko et al. [Ref. 1] for other approaches of attitude guidance). Referring to FIG. 1, attitude reference trajectory, $r_c(t)$, is the input to the feedback system. Proportional gain $K_P/K_R$ operates on the attitude error, while the inner loop rate gain $K_R$ operates on the rate error. Nonlinear plants $P_1$ and $P_2$ represent the rotational dynamics and attitude kinematics of the spacecraft plant, respectively. Rate and attitude feedback signals are determined using the available sensors by appropriate processing, i.e., an attitude determination filter. The saturation block at the plant input accommodates the limited torque capability of the actuators, such as reaction wheels. Other saturation blocks, for example, attitude or rate saturation may also be included and used to enforce other constraints on the rotation response.

Figure 2A:
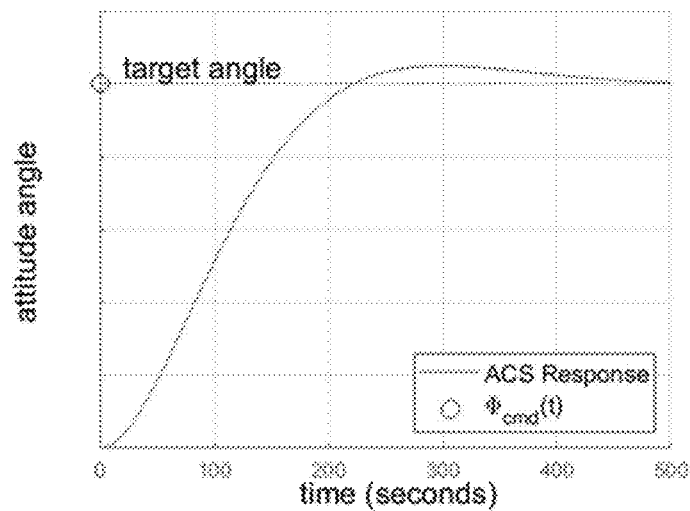
FIG. 2A shows an example attitude responses for a step input $-r_c$.
Figure 2B:
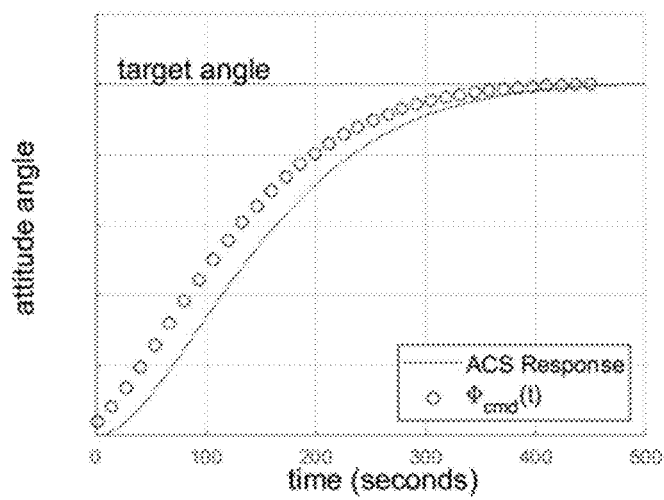
FIG. 2B shows an example attitude responses for a time varying attitude guidance command $-r_c(t)$ (right plot).

Normally reference input, $r_c$, is a constant set-point and the feedback system operates as a regulator. However, in attitude guidance, an autonomous system model can be prepended to the closed loop in order to generate a smooth $r_c(t)$ that can be tracked by the feedback system (see FIG. 2A and FIG. 2B). Other configurations are also possible. In any case, reference trajectory $r_c(t)$ can be determined by solving a nonlinear trajectory optimization problem. A general form of the attitude guidance optimization problem is given as $$P_{\mathcal{A}}: \begin{cases} \text{Minimize} & J(x(\cdot), u(\cdot), t_f) = E(x(t_f), t_f) + \int_{t_o}^{t_f} F(x(t), u(t))dt \\ \text{Subject to} & \dot{x}(t) = f(x, u, t) \\ & x(t_o) = x^o \\ & x(t_f) = x^f \\ & h_L(t) \leq h(x(t), u(t), t) \leq h^U(t) \end{cases} \quad (1)$$

The objective is to optimize the slew performance, quantified in terms of a cost functional J, based on an appropriate state-space model, $\bar{x}(t) = f(x, u, t)$, of the nonlinear spacecraft rotational plant from input u to output c, maneuver boundary conditions, $x(t_o)$ and $x(t_f)$, and path constraints $h(x(t), u(t), t)$. The set of path constraints can include any and all requirements that must be met for safe operation of the spacecraft, for example, actuator torque and angular rate limits, power, and thermal constraints, as well as pointing constraints such as Sun or occultation avoidance. In addition, path constraints for accommodating the closed-loop dynamics are also employed. For example, $h_1 := -\kappa\alpha_{max} \leq u \leq +\kappa\alpha_{max}$ (see. FIG. 1) can be used to set the bandwidth of the reference signal, $r_c(t)$, via the adjustment of parameter $\kappa$. The path constraint, $$h_2 := -a_{max} \leq \frac{K_P}{K_R}(r_c - c) - K_R w \leq a_{max},$$

accommodates the limited torque capacity of the actuators when driven by the feedback law. A version of the concept shown in FIG. 1 is what has been implemented as part of FastMan for minimum-time attitude guidance and occultation avoidance of the LRO.

A properly validated solution to Problem (1) provides the reference trajectory $r_c(t)$ that can be used to drive the closed-loop ACS. In practice, however, it is generally not possible to solve (1) as part of a flight software process due to limited resources of the flight hardware itself. The solution of (1) is done in a mission operations center as a ground process and continuous-time $r_c(t)$ is sampled as $r_c[n]$ to generate a time-tagged command sequence. The discrete-time commands are assembled as an absolute- or relative-time sequence that can be uploaded to the spacecraft and then supplied as inputs to the flight control system according to the spacecraft clock. Ideally, $r_c[n]$ should be sampled at the ACS rate. This, however, may not be possible due to communications bottlenecks and/or limited storage onboard the spacecraft.

Figure 3:
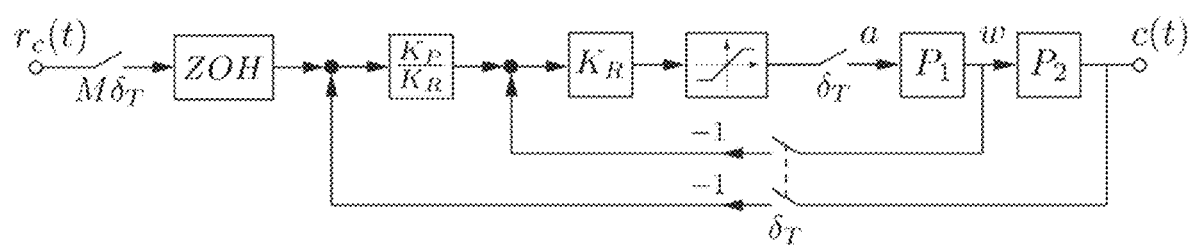
FIG. 3 is a block diagram of attitude guidance implemented using a downsample-and-hold pre-filter.

One solution to such issues is to downsample the commands as $r_c[k]$, by the downsampling factor M and then employ a Zero Order Hold (ZOH) on the ACS input between the downsampling intervals. This approach is akin to introducing the pre-filter function $$F(s) = \frac{1}{s}(1 - e^{-sM\delta_T})$$

ahead of the control loop as shown in FIG. 3. The simple approach of downsample-and-hold leads to degraded tracking performance because the attitude control system must now regulate to a set sparsely spaced attitude waypoints as opposed to tracking a reference signal. In particular, down-sample-and-hold introduces intersample ripples [Ref. 10]—an undesirable artifact of operating the attitude control system as multi-rate digital control system. [Ref. 15]

Signal Interpolation by Splines

B-splines are widely used in digital signal processing, especially in image processing, as a family of curves for efficient interpolation. In this disclosure, the problem is to represent the discrete time sequence s[n] of attitude waypoints by a sequence of waypoint coefficients c[k] at a much lower data rate, taking advantage of the low frequency content in the smooth trajectory represented by s[n]. In this way, if the (integer) data compression rate is called M, the goal is to approximate s[n] by a series, where $$\hat{s}[n] = \sum_k c[k]\beta_M^r[n - kM] \quad (2)$$

with $\beta^0[n]$ the causal rectangular pulse defined as $\beta^0[n]=1$ for $n=0, M-1$ and zero otherwise, and $$\beta_M^r[n] = \beta_M^{r-1}[n] * \beta_M^0[n], \text{ for } r=1,2, \quad (3)$$

Figure 4:
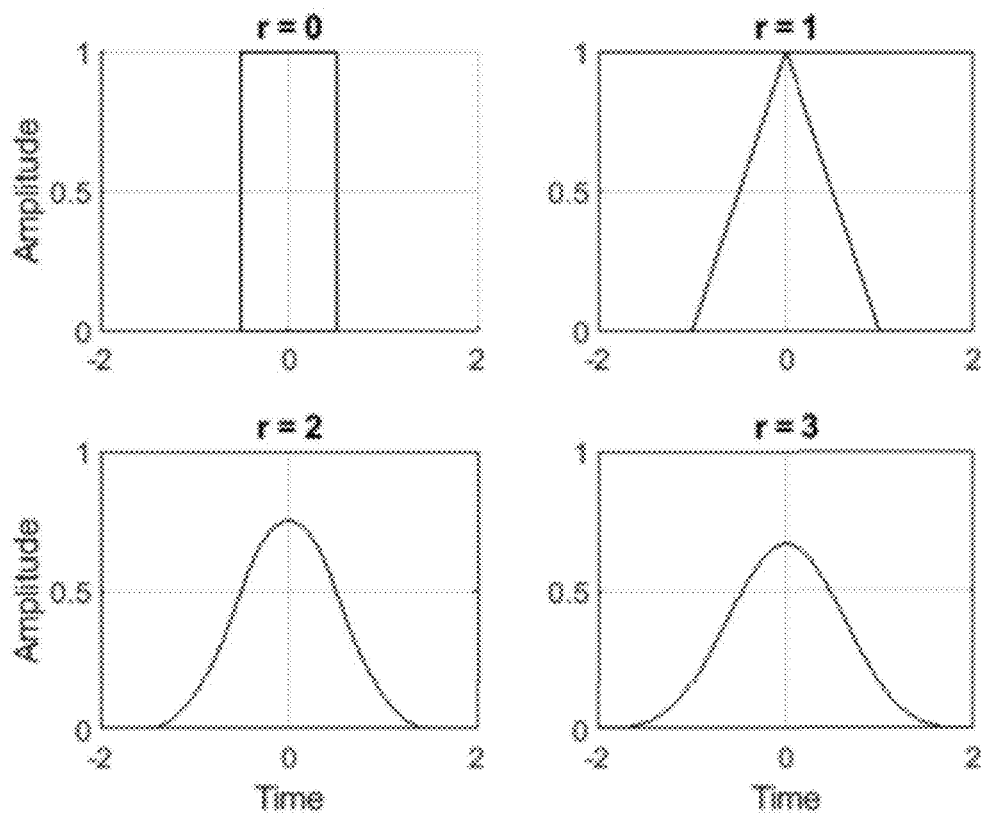
FIG. 4 shows basis functions for B-splines of degrees r=0 to r=3. as disclosed herein.
Figure 5A:
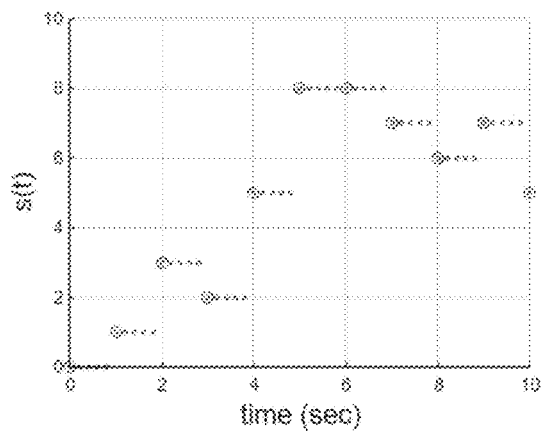
FIG. 5A shows B-spline interpolation over an arbitrary data set with M=5: r=0—sample and hold.
Figure 5B:
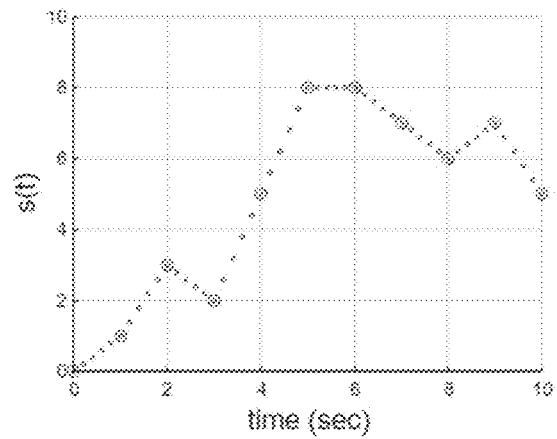
FIG. 5B shows B-spline interpolation over an arbitrary data set with M=5: r=1–linear interpolation.
Figure 5C:
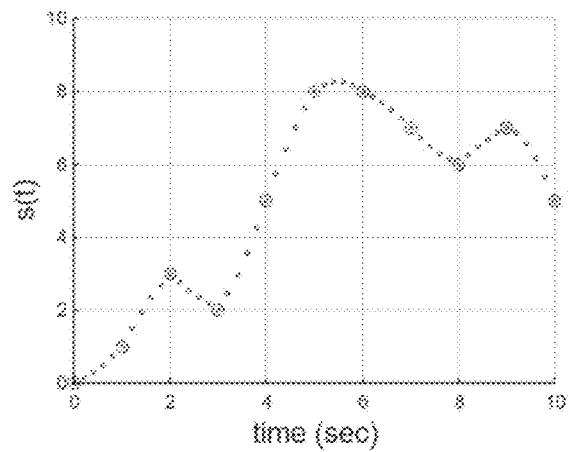
FIG. 5C shows B-spline interpolation over an arbitrary data set with M=5: r=2–quadratic interpolation.
Figure 5D:
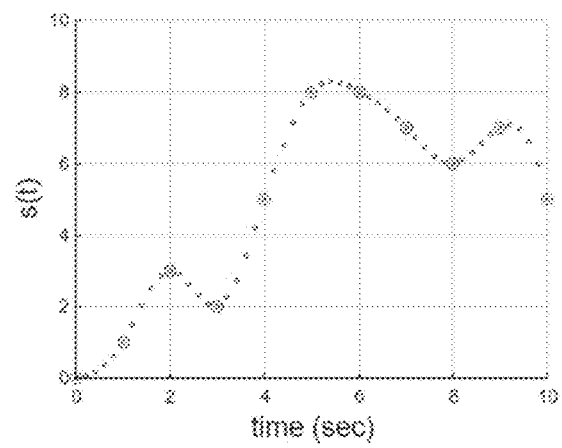
FIG. 5D shows B-spline interpolation over an arbitrary data set with M=5: r=3–cubic interpolation.

The first four orders of B-splines are shown in FIG. 4. The case of a cubic spline, $\beta_M^3[n]$, $n=0, \ldots, 4M-4$ is particularly attractive. Its continuous time definition yields the minimum curvature with respect to all other splines, [Ref. 12] which results in a smoother approximation with lower artifacts. For practical applications, the spline basis function must be discretized. FIG. 5A-FIG. 5D illustrates the results of a discrete B-spline interpolation over an arbitrary data set for various spline orders. Each sampled data point (input) is convolved with a B-spline to perform the desired interpolation. Thus, each B-spline is amplified or attenuated according to the samples. The interpolated data (output) is the linear combination of the weighted B-splines. Since B-splines have a compact support, they are zero everywhere outside of a short time interval (see FIG. 4). Therefore, only r+1 sequential data points are needed to perform the interpolation. Once the interpolation rate M is fixed, $h[n]=\beta_M^3[n]$ is defined so that $$\hat{s}[n] = \sum_k c[k]h[n - kM] \quad (4)$$

Figure 6:
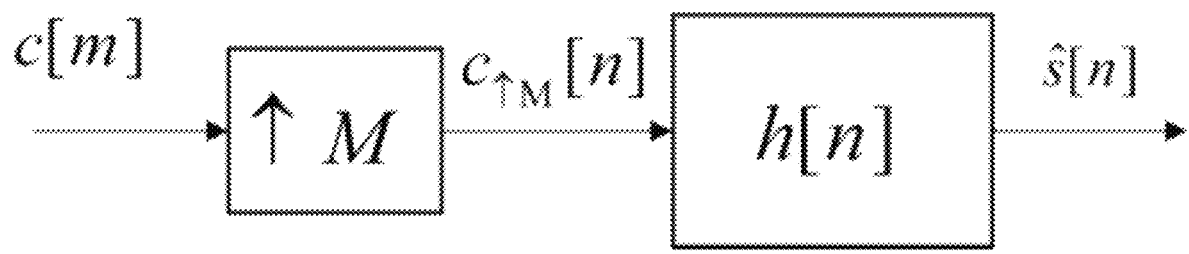
FIG. 6 is a block diagram of a multi-rate filtering interpolation operation as upsampling and filtering as disclosed herein.

Equation (4) illustrates interpolation as a multi-rate filtering operation as shown by the block diagram in FIG. 6, where the upsampler increases the sampling rate by a factor of M by placing M−1 zeros between two samples, as $$c_{\uparrow M}[n] = \begin{cases} c[m] & \text{if } n = mM \\ 0 & \text{otherwise} \end{cases} \quad (5)$$

The transfer function of the filter can be easily determined using the fact the z-transform of the rectangular pulse is $$\mathcal{Z}(\beta_M^0) = \frac{1}{M}\sum_{n=0}^{M-1} z^{-n} = \frac{1-z^{-M}}{M(1-z^{-1})} \quad (6)$$

$$H(z) = \mathcal{Z}(h[n]) = \frac{1}{M^4}\left(\frac{1-z^{-M}}{1-z^{-1}}\right)^4 \quad (7)$$

Since the third order spline interpolating function h[n] is obtained by convolving the rectangular pulse with itself 3 times, the following filter transfer function is obtained in the z-domain.

Estimation of Spline Coefficients by Non-Causal Linear Filtering

The waypoint coefficients c[k] for interpolation of an attitude guidance trajectory can be estimated in a number of ways. The waypoint coefficients are not necessarily the same as the attitude quaternions because in (7), transfer function $H(z)\neq 1$. One approach to determine the waypoint coefficients is based on the fact that the cubic spline h[n] has length 4M−3 with an even symmetry around the index $n_0=2M-2$ $$h[n_0+n]=h[n_0-n], \text{ for } n=1,\ldots,2M-2 \quad (8)$$

By imposing zero error at the downsampled points $s[mM+n_0]$, obtained is $$\bar{s}[m] \triangleq s[mM+n_0] = h[n_0]c[m] + h[n_0+M](c[m-1]+c[m+1]) \quad (9)$$

since all other terms $h[n_0\pm kM]$ for $k\geq 1$ are zero. This relates the sequences $\bar{s}[m]$ and c[m] by a linear difference equation which, in the z-domain, can be written as $$\bar{S}(z)=B(z)C(z) \quad (10)$$

with transfer function $$B(z) = h[n_0+M]\frac{z^2+b(M)z+1}{z} \quad (11)$$

where $b(M)=h[n_0]/h[n_0+M]$ is dependent on the expansion factor M. The coefficients, C(z), can be computed by rearranging the transfer function $$C(z) = \frac{1}{B(z)}\bar{S}(z) = \frac{1}{h[n0+M]}\left(\frac{z}{z-p_1(M)}\right)\left(\frac{1}{z-p_2(M)}\right)\bar{S}(z) \quad (12)$$

with $p_1(M)$, $p_2(M)$ the zeros of B(z). As $M\to\infty$, the term $b(M)\to 4$, as in the corresponding term in the continuous time spline[12] so that the poles tend to $$p_1(\infty)\to -0.2679 \, p_2(\infty)\to -3.7321 \quad (13)$$

Just to get an idea, b(10)=4.0606 and b(50)=4.0024 and the corresponding poles are close to their convergence. The factorization of the transfer function 1/B(z) as in equation (12) allows the computation of the coefficients c[m] to be done using two first order linear difference equations, one causal and one anti-causal as follows $$c_1[m] = p_1 c_1[m-1] + \frac{1}{h[n0+M]}\bar{s}[m], \text{ for } m = 0, 1, \ldots, \text{end} \quad (14)$$

$$c[m-1] = p_1 c[m] + p_1 c_1[m], \text{ for } m = \text{end}, \text{end}-1, \ldots, 1 \quad (15)$$

using the fact that the two poles are related by $p_2=1/p_1$.

Figure 7A:
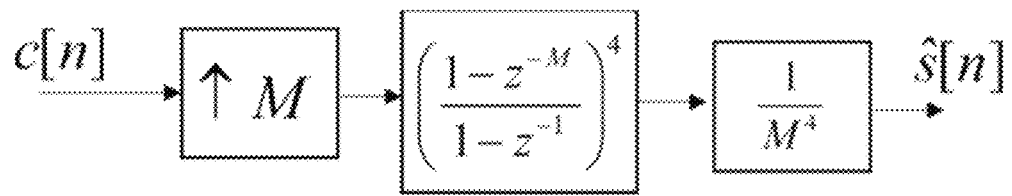
FIG. 7A shows a block diagram of a cubic spline interpolating filter.

Practical Implementation of the Interpolating Filter
Cascade Integrator Comb (CIC) Filter Discrete time interpolation is efficiently implemented using techniques that are well established is multi-rate digital signal processing. [Ref. 16 and 17] In the specific case of cubic splines, the implementation can be economized by exploiting the particular form of its transfer $$H(z) = \frac{1}{M^4}\left(\frac{1-z^{-M}}{1-z^{-1}}\right)^4 \quad (16)$$

function as shown in FIG. 7A.

Figure 7B:
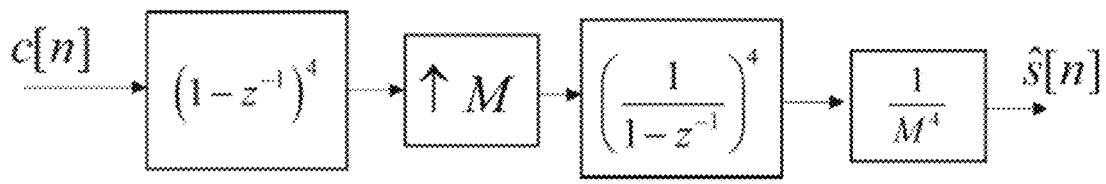
FIG. 7B shows a Cascade Integrator Comb.

By the Noble Identity, [Ref. 16] the transfer function $1-z^{-M}$ and the upsampler $\uparrow$ M can be interchanged by replacing $z^M$ with z since they represent the same time shift. This leads to the diagram in FIG. 7. The arrangement is called the Cascade Integrator Comb (CIC) where the latter term comes from the frequency response of $1-z^{-M}$. In practical applications, the ideal upsampler $\uparrow$ M which increases the sampling rate by inserting "zeros" as the interpolating function, is replaced with the ZOH that uses a rectangular pulse as the interpolating function. This leads to the more practical scheme in FIG. 7C.

Figure 7C:
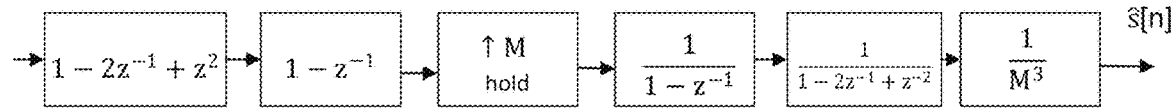
FIG. 7C shows a practical implementation using the Zero-Order-Hold as disclosed herein.

There are two main advantages of the implementation shown in FIG. 7C. The first is that the only dependence on the parameter M is in the hold operation. The second advantage is that the interpolation can be performed using only sum and differences operations. Scaling is done either at the beginning or the end of the chain of filters.

As a consequence, this yields a very simple implementation for the intended flight application, where the expansion factor M can be chosen according to the complexity of the maneuver. This allows for a more efficient implementation, in terms of memory requirements, for very smooth maneuvers in order to leave more space in the command buffer for more complex trajectories. The only potential issue is the presence of the integrators after the hold interpolator. Since the implementation of the filter relies on exact pole zero cancellations on the unit circles, this implementation calls for fixed point arithmetic, with sufficient number of bits per sample to ensure that saturation is not reached.

Direct-Form-II Instantiation of the CIC

The flight software of many spacecraft utilize digital filters as part of the various attitude control routines. For example, digital filters may be used to implement structural filters for suppression of low frequency spacecraft modes. Since such digital filter routines may already be available on board the spacecraft, it is logical to consider their use for instantiating the CIC interpolation filter. This would reduce the complexity of the flight software modifications needed for an efficient implementation of the attitude guidance per-filter. The flight software of the LRO spacecraft implements a second-order Direct-Form-II (DF-II) filter routine that is used as part of the observing mode attitude control loop. [Ref. 18] The digital filter subroutine has also been used to implement the complementary filter of the LRO's new all-stellar attitude determination algorithm. [Ref. 9] In this section, illustrated is how the DF-II filter can also be repurposed and utilized in order to implement the CIC interpolation filter.

Figure 8:
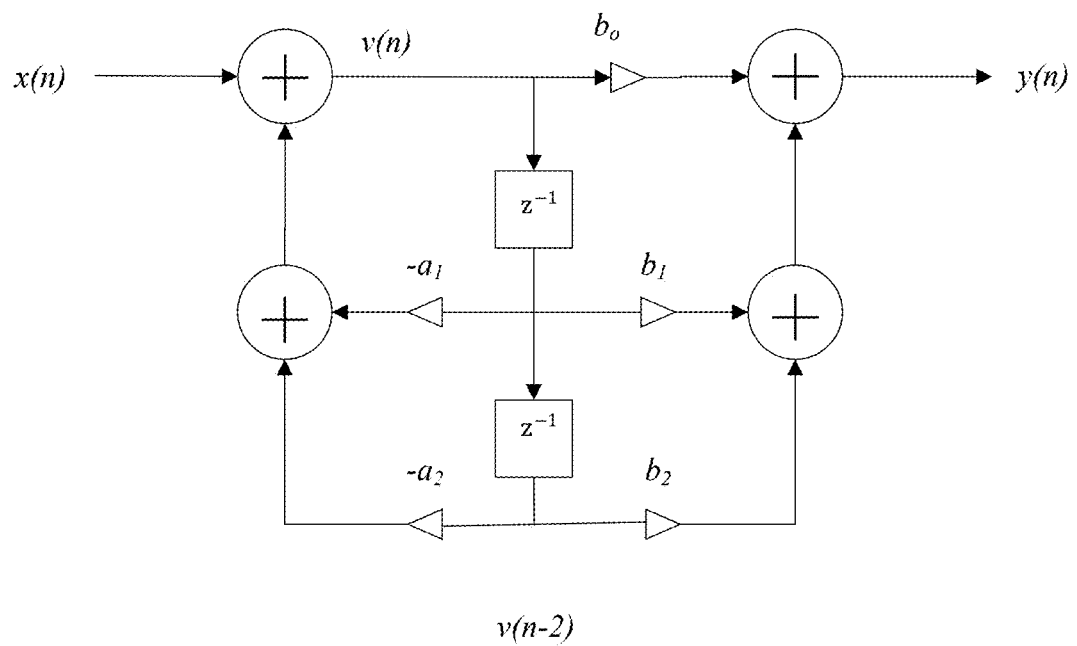
FIG. 8 shows a block diagram of a second-order (biquadratic) direct-form-II filter as disclosed herein.

The DF-II filter already implemented in the flight software is a second-order biquadratic filter since in the z-domain the filter transfer function is the ratio of two quadratic functions. A higher order filter can be synthesized by cascading several $$H(z) = \frac{b_0 + b_1 z^{-1} + b_2 z^{-2}}{1 + a_1 z^{-1} + a_2 z^{-2}} \quad (17)$$

biquadratic sections in series. A schematic of the DF-II filter is shown in FIG. 8. In the z-domain, the transfer function of the filter is given in normalized form as The filter transfer function is implemented in two stages as $$y[n] = b_0 v[n] + b_1 v[n-1] + b_2 v[n-2] \quad (18)$$

where $$v[n] = x[n] - a_1 v[n-1] - a_2 v[n-2] \quad (19)$$

Referring to FIG. 7c which shows the third-order CIC filter, the slow filter stages that are updated once every M control cycles can be written as the product $$H_{slow}(z) = (1 - 2z^{-1} + z^{-2})(1 - z^{-1}) \quad (20)$$

which requires the concatenation of two biquadratic DF-II filters. The first has the coefficients, $a_1 = a_2 = 0$ and $b_0 = 1$, $b_1 = -2$, $b_2 = -1$. The second filter is used to realize the remaining first order term by setting, $a_1 = a_2 = 0$ with $b_0 = 1$, $b_1 = -1$, $b_2 = 0$. The fast filter stages that are updated on every control cycle can be similarly written as the product $$H_{fast}(z) = \left(\frac{1}{1 - 2z^{-1} + z^{-2}}\right)\left(\frac{1}{1 - z^{-1}}\right) \quad (21)$$

Figure 9:
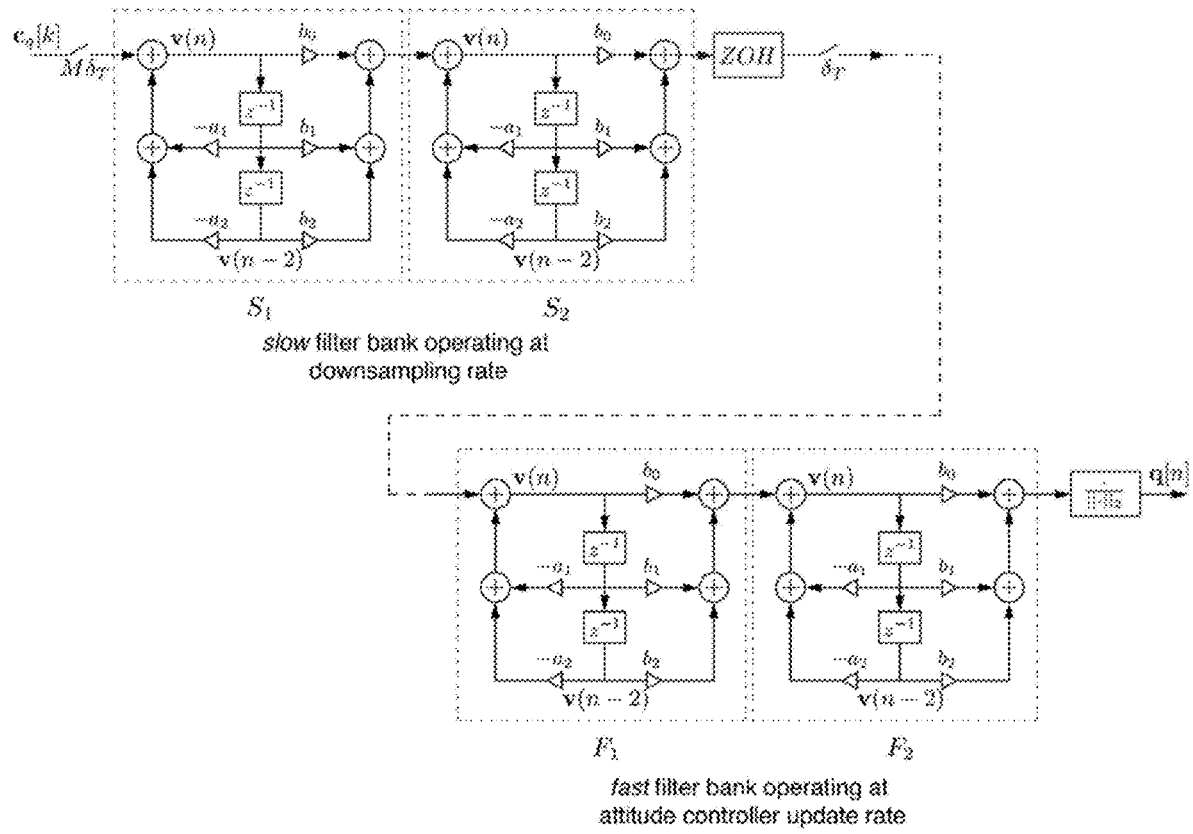
FIG. 9 shows an example of a DF-II filter bank configured using two slow filters, $S_1$ and $S_2$ updated at the downsampling rate, and two fast filters, $F_1$ and $F_2$ updated at the attitude controller rate, to replicate a vector cubic spline CIC interpolator for implementation in flight software.

Series connection of two biquadratic DF-II filters is also needed to implement the fast filter function. The first in the series has the coefficients, $a_1 = -2$, $a_2 = -1$ and $b_0 = 1$, $b_1 = b_2 = 0$. The second DF-II filter in the series has the coefficients, $a_1 = -1$, $a_2 = 0$ and $b_0 = 1$, $b_1 = b_2 = 0$. Thus, the third-order CIC attitude guidance pre-filter can be implemented using a total of four vector DF-II filter stages as shown in FIG. 9 for instantiation as part of the spacecraft flight software. The output of the final filter stage is normalized to produce the interpolated quaternion.

Application to the LRO

This illustrates the application of the interpolating pre-filter for attitude guidance of a practical spacecraft, namely the LRO. In fact, the need for such a development was motivated by the desire to integrate FastMan attitude guided maneuvers into the daily operation of the LRO spacecraft and to do so with minimal disruption to the existing operational workflow. The overall goal is to incorporate the ability to perform any number of FastMan slews alongside LRO's conventional maneuvers by managing the size of FastMan's command data footprint in the system command load. Presently, LRO mission operations allows up to 7 large angle (>20-deg) slews per day to support various science objectives. In this section, shown it is possible to achieve at least a 50:1 data compression for commanding at the ACS update rate, without any impact on maneuver performance.

FastMan Attitude Maneuver Test Slew

Since the first FastMan was implemented on the LRO in July 2020, [Ref. 8] numerous fast maneuvers have been performed to support various science collection activities. Nearly all of these maneuvers have been implemented by sampling the continuous-time attitude guidance commands at 1-Hz, which has tested the limited capacity of the spacecraft command buffer. In addition, the mission operations team has had to develop special single-day command loads as opposed to the usual 7 day loads that are used for conventional maneuvering operations. Recently, the mission operators have decided to sample the attitude guidance commands at a slightly reduced rate (0.5-Hz) to make it easier to fulfill the majority of the project scientist's daily slew requests. In this disclosure, demonstrated is the application of the proposed interpolating pre-filter by using, as a test case, a FastMan that was implemented to perform a maneuver in support of the LRO Camera team. The FastMan slew was used to execute a 65.2-deg nominal roll to obtain the image of some interesting volcanic landforms near Mare Serenitatis.

Figure 10A:
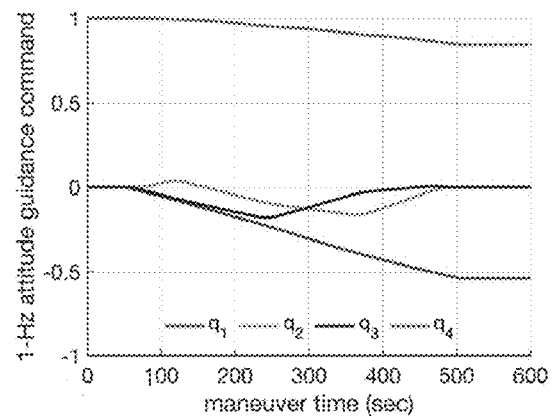
FIG. 10A shows telemetry data for an attitude maneuver implemented on an Lunar Reconnaissance Orbiter (LRO): attitude guidance commands (sampled at 1-Hz)
Figure 10B:
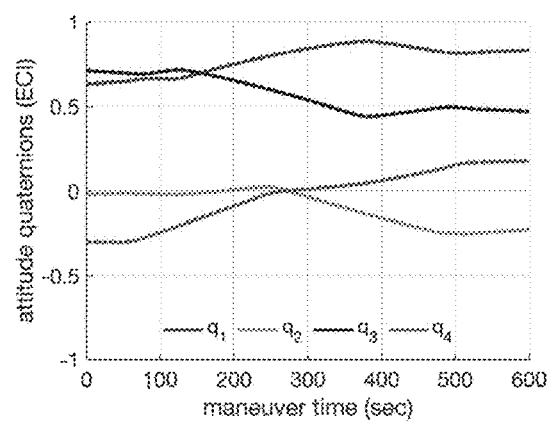
FIG. 10B shows telemetry data for an attitude maneuver implemented on an LRO: attitude response.
Figure 10C:
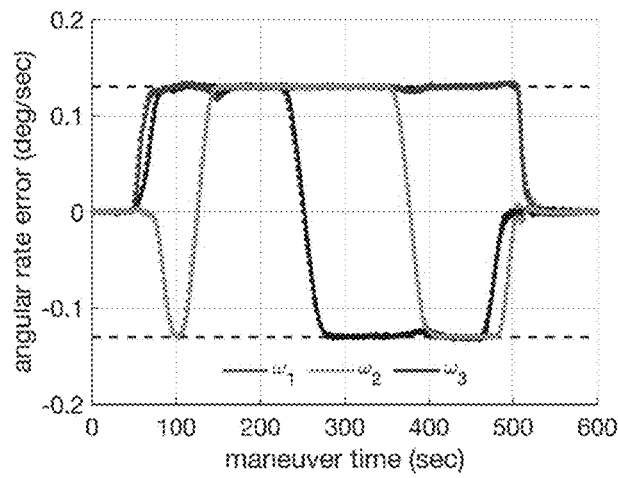
FIG. 10C shows telemetry data for an attitude maneuver implemented on an LRO: controller rate error.
Figure 10D:
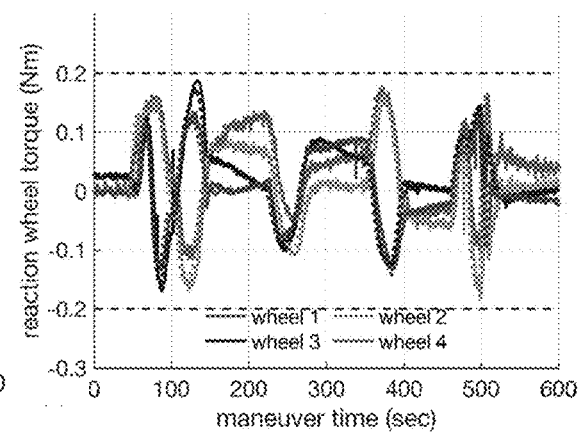
FIG. 10D shows telemetry data for an attitude maneuver implemented on an LRO: reaction wheel torques. Legend: solid-telemetry from flight; dotted-predictions from NASA's high-fidelity simulator.

Telemetry data pertaining to the maneuver are shown in FIGS. 10A-FIG. 10D—solid lines. For this attitude maneuver, the continuous time attitude guidance trajectory was sampled at 1-Hz (see FIG. 10A) in order to prepare a command load for the spacecraft. The total maneuver time was approximately 460-sec and a total of 461 time-tagged quaternion commands had to be stored in LRO's command buffer. FIG. 10B shows the resulting attitude response telemetry. The spacecraft attitude is reported with respect to the Earth-Centered Inertial (ECI) frame. Note that the attitude command trajectory is referenced to the spacecraft orbital frame as opposed to ECI. Thus, the curves in FIG. 10A represent an attitude 'offset' from the orbital frame. Telemetry for the controller angular rate errors are shown in FIG. 10C. As can be seen, the attitude maneuver slew adheres to the 0.13 deg/sec (per axis) rate limit imposed as a path constraint by the flight software. Telemetry of the reaction wheel torques corresponding to the maneuver is shown in FIG. 10D, where it is seen that the torques are all maintained with the linear region of reaction wheel operation (±0.2 Nm).

A simulation of the FastMan, i.e. attitude maneuver, slew was also carried out using the high-fidelity simulation model of the LRO spacecraft developed by NASA's Goddard Space Flight Center. The results of the high-fidelity simulation are also shown in FIGS. 10A-FIG. 10D—dotted lines. Comparing the results of the simulation against the telemetry data from the actual flight, it is seen that the two data sets are in excellent agreement and that the predictions of the high-fidelity model are very much in line with flight. Thus, the high-fidelity simulation model can be used with reasonable confidence to understand the performance of the attitude control system using the new interpolating pre-filter.

Determining the Waypoint Coefficients

The first step for implementing an attitude guided maneuver using the proposed interpolating prefilter is to determine the sequence of downsampled waypoint coefficients that will be used as the inputs for interpolation. One approach is simply to interpolate between the downsampled attitude quaternions, q[k]. However, referring back to equation (11), the interpolating filter has dynamics and so the interpolated quaternion profile will differ from the original data. This discrepancy can be addressed through a pre-processing step by applying equation (12), which inverts the interpolating filter dynamics to determine a set of corrected waypoints, $c_q[k]$ that 'lead' the pre-filter response. The resulting sequence of $c_q[k]$, k=1, 2, . . . is then used as the downsampled attitude guidance trajectory.

Pre-processing also addresses two other practicalities. First, the application of equation (12) may give the result that $c_q[k] \neq I_q$ for k<0 because equation (12) is non-causal. The symbol $I_q$ is used to refer to the identity quaternion $I_q = [0, 0, 0, 1]^T$, i.e. the nominal nadir pointing attitude. Thus, initiating the interpolation process at k=0, may introduce a transient error into the interpolated signal. For example, the quaternion error between the commanded identify quaternion and the DF-II filter output at the beginning of the maneuver is on the order of $10^{-4}$ (approximately 0.01-deg). This can be mitigated by properly setting the initial states of the DF-II filter bank. Doing so many are not practical, however, because additional commanding would be required in order to initialize the filter states prior to each maneuver. An alternative is to extend the attitude guidance trajectory. For example, if the trajectory is extended to the left N=4 samples, then the quaternion error between the commanded identity quaternion and the DF-II filter output at the beginning of the maneuver is on the order of $10^{-10}$ (less than 0.1-milliarcseconds). This facilitates a smooth transition from attitude hold to attitude tracking. Nonetheless, since the error for a N=0 signal extension is still quite small, the need to prepend the attitude guidance trajectory may not be necessary in practice.

The second practicality that needs to be addressed is the fact that interpolation via the DF-II filter bank is a causal process and as a consequence, the interpolated output is delayed by $t_d = 2M\delta_T$, where M is the expansion factor and $\delta_T$ is reciprocal of the attitude controller update rate. In other words, the interpolator output at any instant in time depends on several preceding downsampled inputs. It is well known that such a delay could potentially cause instability in feedback loops and this is the main reason why such higher-order hold circuits are seldom used in control systems. [Ref. 20] However, in the present case, the DF-II filter bank is being used as a pre-filter that is not embedded in a feedback loop so instability is not a concern. Moreover, the delay can be annihilated simply by shifting the time tags on the entire sequence of $c_q$ to the left by $t_d$ seconds, i.e., by two downsamples.

Figure 11A:
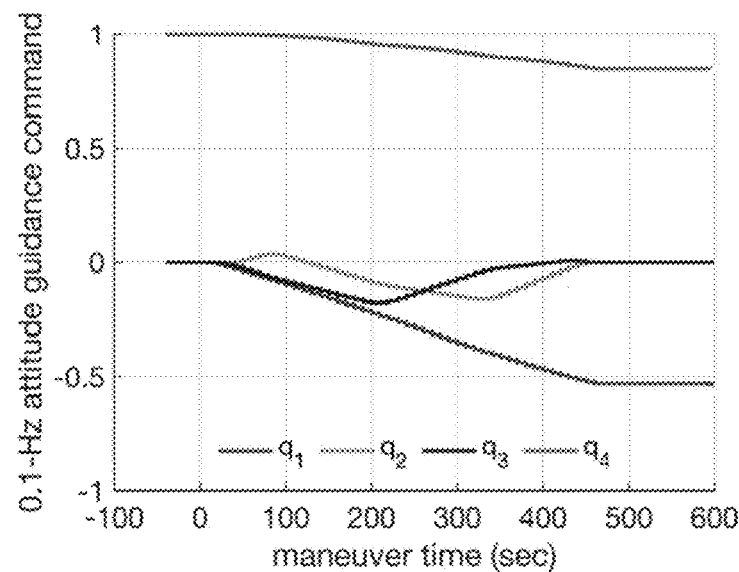
FIG. 11A shows example quaternion trajectories for attitude guidance an attitude maneuver solution extended to the left and downsampled at 0.1-Hz.
Figure 11B:
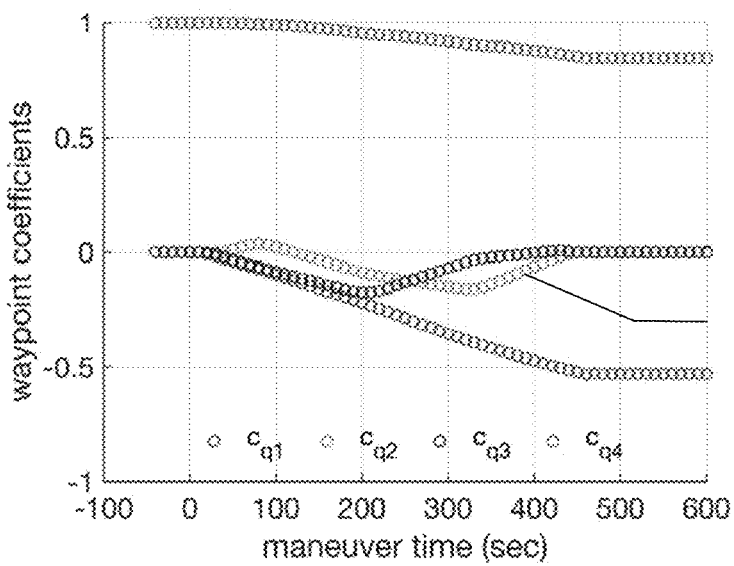
FIG. 11B shows example quaternion trajectories for attitude guidance waypoint coefficients obtained using equation (12).
Figure 12A:
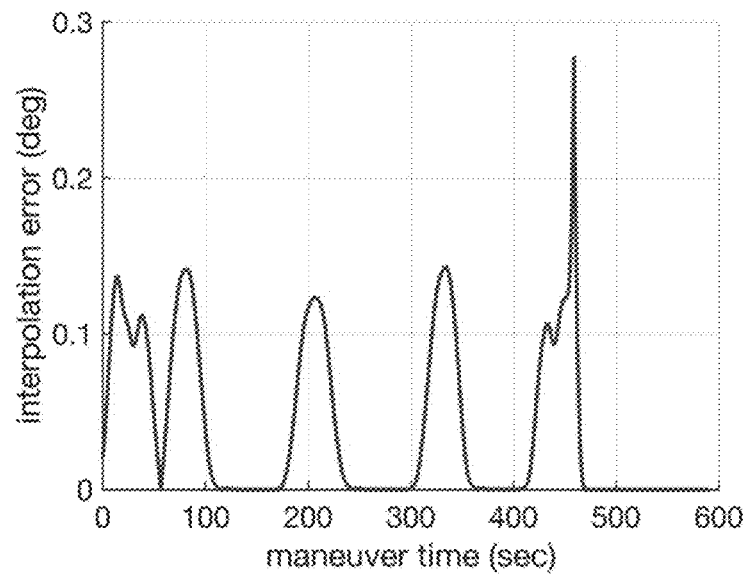
FIG. 12A shows interpolation 'cone error' of an example attitude guidance command trajectory using downsampled quaternion trajectory and FIG. 12B shows interpolation 'cone error' of an example attitude guidance command trajectory using waypoint coefficients.
Figure 12B:
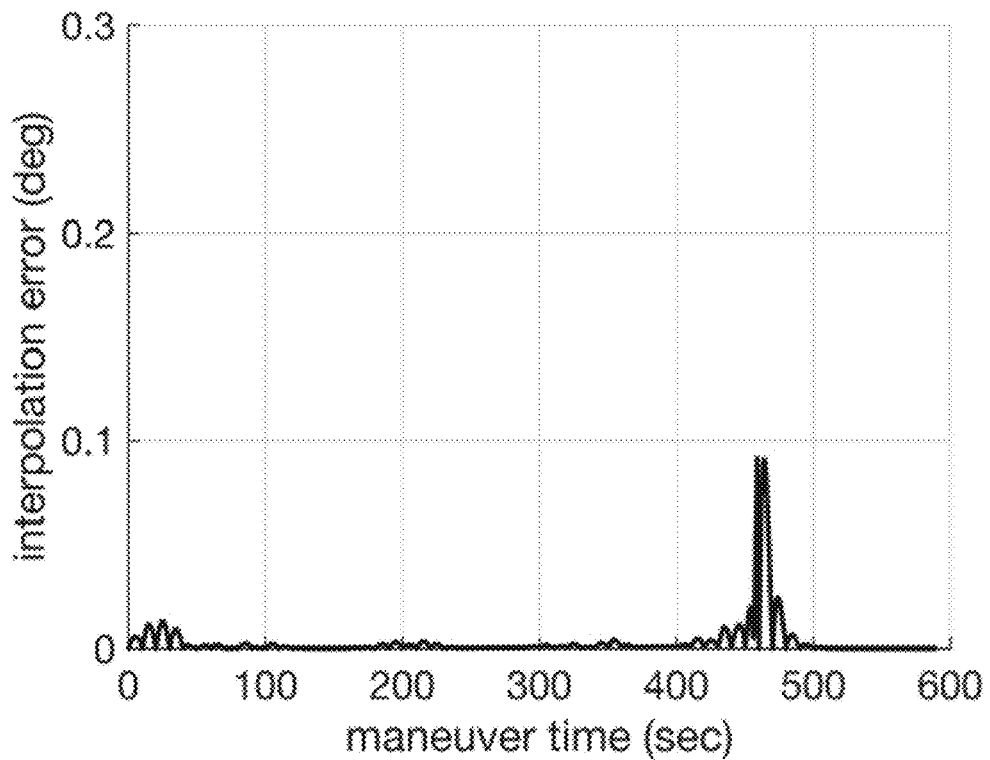

Now that the nuances for a practical implementation have been addressed, the process of creating a quaternion command trajectory at the ACS update rate using a sequence of downsampled waypoints can be demonstrated. FIGS. 11A-FIG. 11B show the downsampled attitude guidance trajectory, q[k], for the attitude maneuver implemented, as well as the corresponding waypoint coefficients, $c_q[k]$ that are generated by the application of equation (12). The downsampling rate was 0.1-Hz, which gives an interpolation expansion factor, M=50. As shown, the data sequence was extended to the left by 6 downsamples to accommodate interpolating filter start-up as well as to accommodate the delay introduced by the DF-II filter bank. As described above, either the sequence of q[k] or $c_q[k]$ can be processed by the interpolating filter. However, utilizing the waypoint coefficients, $c_q[k]$, minimizes the error between the continuous-time attitude maneuver reference trajectory, $q_{ref}$, and the interpolated guidance trajectory, $q_{interp}$. The interpolation errors are shown in FIGS. 12A-FIG. 12B which reports the interpolation error in terms of the 'cone error' defined as $\Phi_e = 2 \tan^{-1}(\|v_e\|^2/s_e)$, where $v_e$ and $s_e$ are the vector and scalar parts, respectively, of the quaternion error, $q_e = q_{interp}^{-1} q_{ref}$.

Figure 13A:
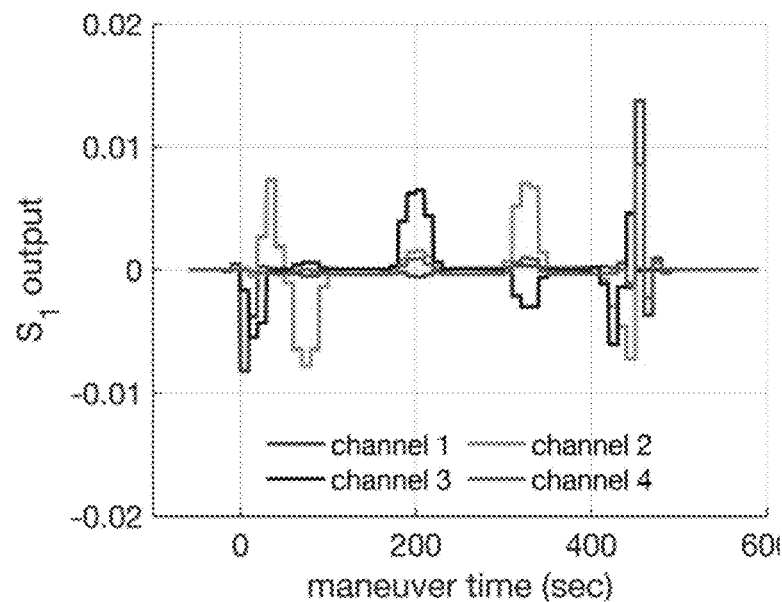
FIG. 13A shows an output of the DF-II filter stages for a cubic spline interpolating pre-filter: slow filter $S_1$ normalized to preserve the unit norm condition as disclosed herein.
Figure 13B:
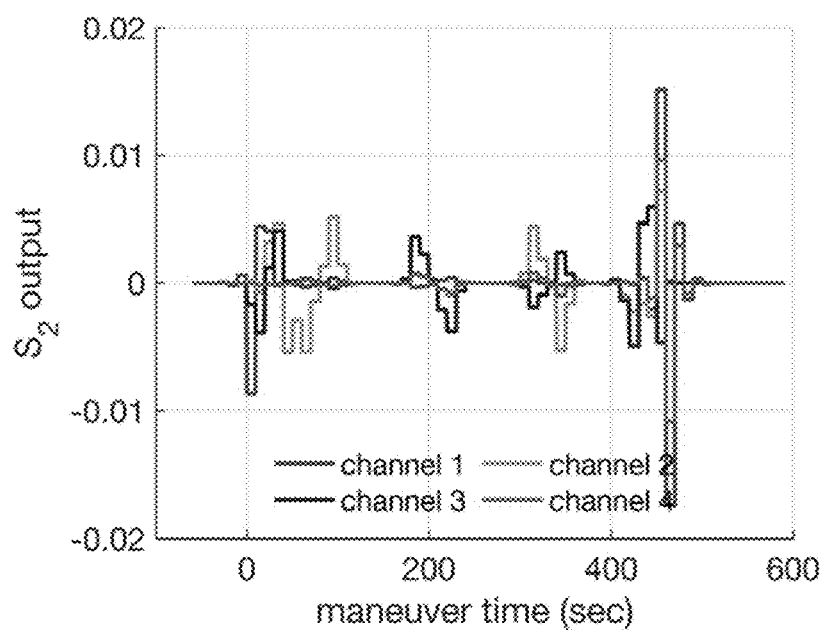
FIG. 13B shows an output of the DF-II filter stages for a cubic spline interpolating pre-filter: slow filter $S_2$ normalized to preserve the unit norm condition as disclosed herein.
Figure 13C:
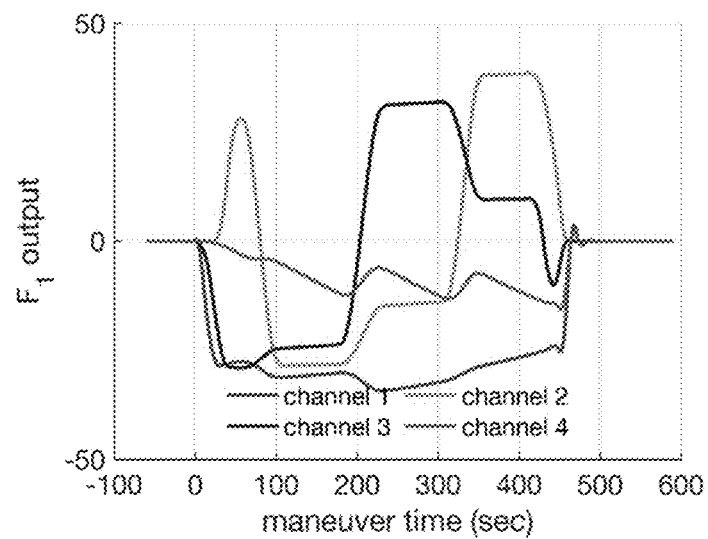
FIG. 13C shows an output of the DF-II filter stages for a cubic spline interpolating pre-filter: fast filter $F_1$ normalized to preserve the unit norm condition as disclosed herein.
Figure 13D:
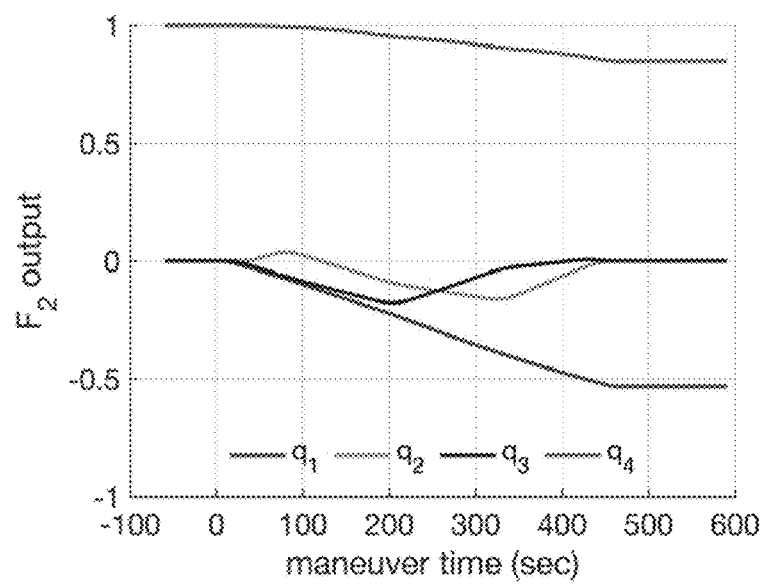
FIG. 13D shows an output of the DF-II filter stages for a cubic spline interpolating pre-filter: fast filter $F_2$ normalized to preserve the unit norm condition as disclosed herein.

The interim outputs of the various DF-II filter stages are shown in FIGS. 13A-FIG. 13D to illustrate the evolution of the signals as they are processed through the filter bank. Referring to FIGS. 13A and 13B, it is seen that the command data stream, which is loaded serially from the spacecraft command buffer, is first manipulated by the two slow filters $S_1$ and $S_2$ (operating at the downsampling rate) to form a sequence of signals that are held constant over each downsample period. These signals can be interpreted as a series of constant 'jerk' segments, i.e. $\dddot{q}[k]$ for each quaternion. These are then integrated by the fast filters $F_1$ and $F_2$ (operating at the ACS update rate) to form a $C^2$ smooth quaternion trajectory (see FIGS. 13C and 13D that is applied as the input signal to the closed-loop attitude controller. Note that the curves in FIG. 13D are normalized to preserve the unit norm condition and so scaling by the factor $M^{-3}$ is not required.

Figure 14A:
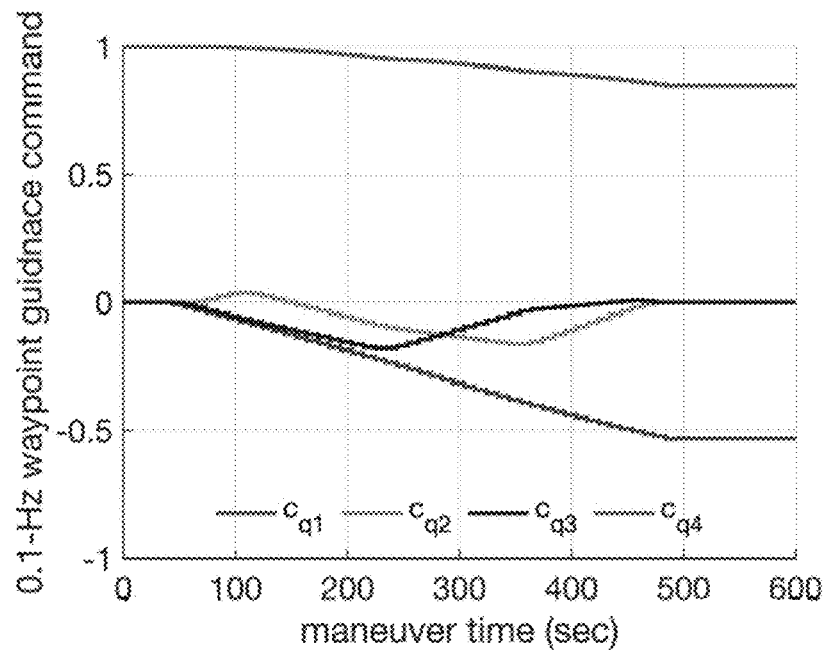
FIG. 14A shows high-fidelity simulation data for an attitude maneuver using a B-spline interpolating pre-filter attitude guidance commands (downsampled at 0.1-Hz) as disclosed herein
Figure 14B:
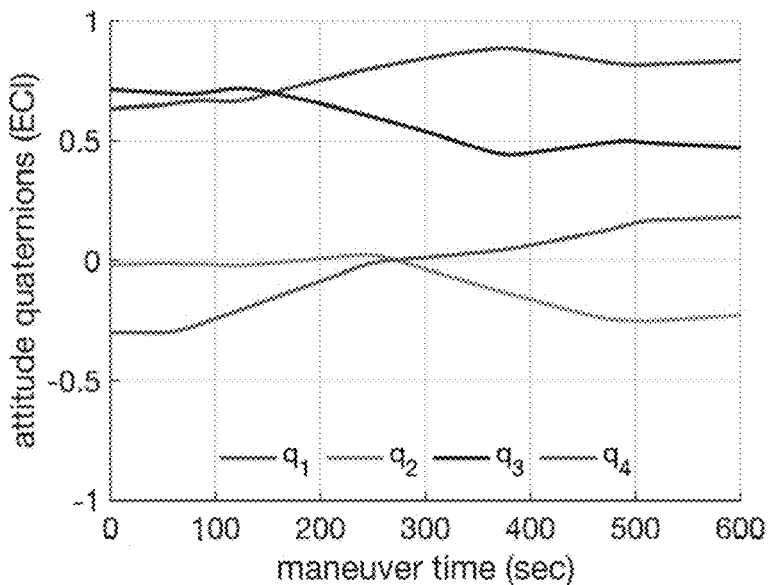
FIG. 14B shows high-fidelity simulation data for an attitude maneuver using a B-spline interpolating pre-filter attitude response as disclosed herein.
Figure 14C:
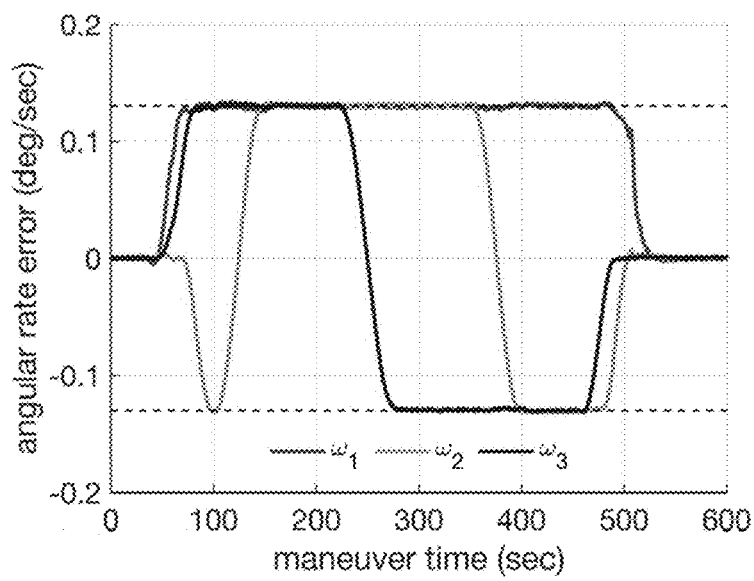
FIG. 14C shows high-fidelity simulation data for an attitude maneuver using a B-spline interpolating pre-filter controller rate error as disclosed herein.
Figure 14D:
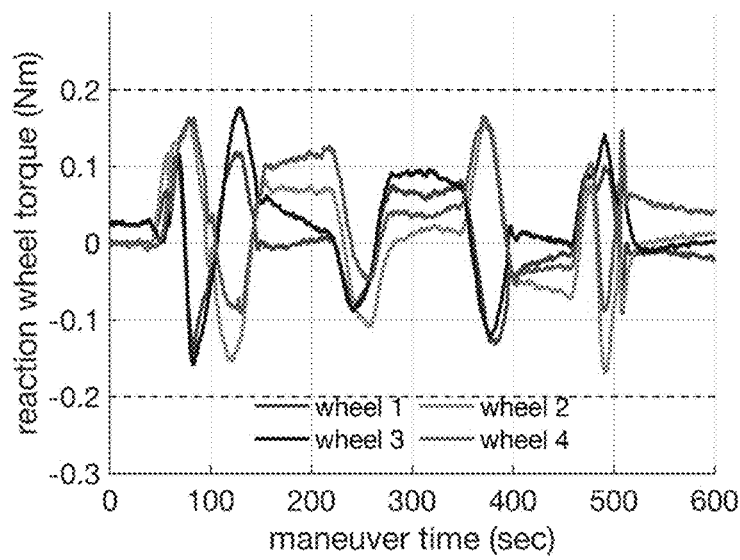
FIG. 14D shows high-fidelity simulation data for an attitude maneuver using a B-spline interpolating pre-filter reaction wheel torques as disclosed herein.

The disclosed method, system and apparatus for the interpolating attitude guidance pre-filter was implemented in MATLAB/Simulink and incorporated into the LRO high-fidelity simulation model for testing. The high fidelity simulation results of the attitude maneuver test maneuver are shown in FIGS. 14A-FIG. 14D. In FIG. 14A, the 0.1-Hz spaced waypoint coefficients for attitude guidance are shown. This is the command sequence that would be loaded and stored in the spacecraft command buffer for processing through the attitude control system including the interpolating pre-filter. The simulated attitude response is shown in FIG. 14 and it is seen that the reorientation is performed similarly to the flight telemetry (refer to FIGS. 10A-FIG. 10D). The traces of the controller angular rate errors and of the reaction wheel torques are also essentially the same as the flight telemetry. These results indicate that the DF-II filter bank is operating correctly and that the downsampled attitude guidance trajectory can indeed be used to properly execute the maneuver.

Figure 15A:
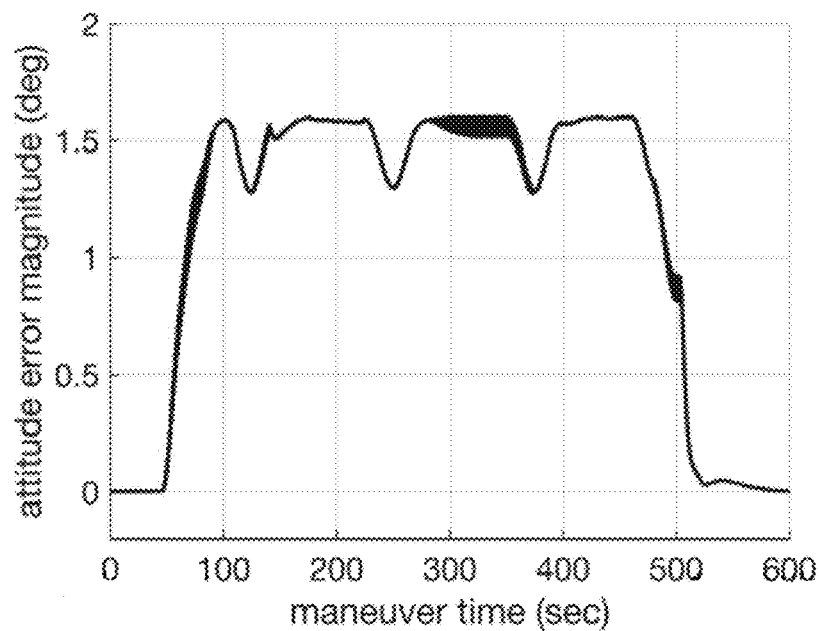
FIG. 15A shows attitude tracking error magnitude for an attitude maneuver slew flight telemetry for commanding at 1-Hz simulation using interpolating attitude guidance pre-filter as disclosed herein and FIG. 15B shows attitude tracking error magnitude for an attitude maneuver slew high-fidelity simulation using interpolating attitude guidance pre-filter as disclosed herein.
Figure 15B:
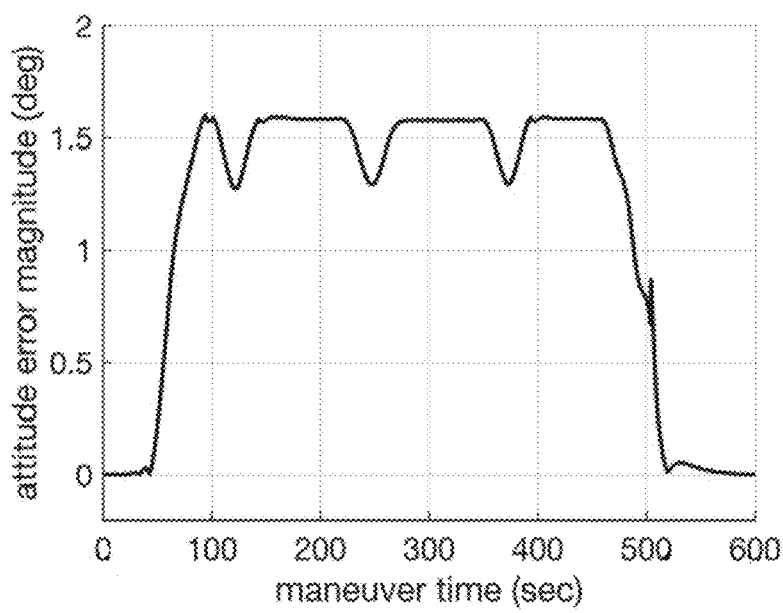

The primary advantage of the interpolating pre-filter from the operations point-of-view is not that attitude maneuver slews can be implemented similarly to the current practice but that fact that attitude maneuver slews can now be implemented on the spacecraft by using at least an order-of-magnitude less data. The attitude maneuver implemented on orbit in FIGS. 10A-FIG. 10D required 461 commands at a 1-sec spacing, whereas the attitude maneuver simulated in FIGS. 14A-FIG. 14D used only 51 commands spaced at 10-sec intervals. This eases the burden on the spacecraft command buffer and allows for a variety of different maneuvers, i.e. a mix of FastMan and standard slews, to be performed in a single command load for supporting the needs of the LRO project scientists. In addition to reducing the data requirements, the new approach is also beneficial to the operation of the ACS and attitude control hardware. This can be seen by observing the tracking performance of the attitude controller. The attitude tracking error magnitude obtained from the flight telemetry for commanding at 1-Hz is compared against the attitude tracking error magnitude obtained from the high-fidelity simulation using the interpolating pre-filter in FIGS. 15A-FIG. 15B. While the overall magnitudes of the two error signals are similar, the profile for 1-Hz commanding exhibits noise that is not seen when using the interpolating pre-filter. This noise is a kind of intersample ripple that is introduced by commanding the ACS at a slower rate (1-Hz) than the ACS update rate (5-Hz). However, using the interpolating pre-filter, commands can be generated and issued to the ACS at the native 5-Hz update rate. This eliminates the intersample ripple and as a consequence also reduces the stress induced on the reaction wheel hardware when operating in a trajectory tracking mode.

Figure 16:
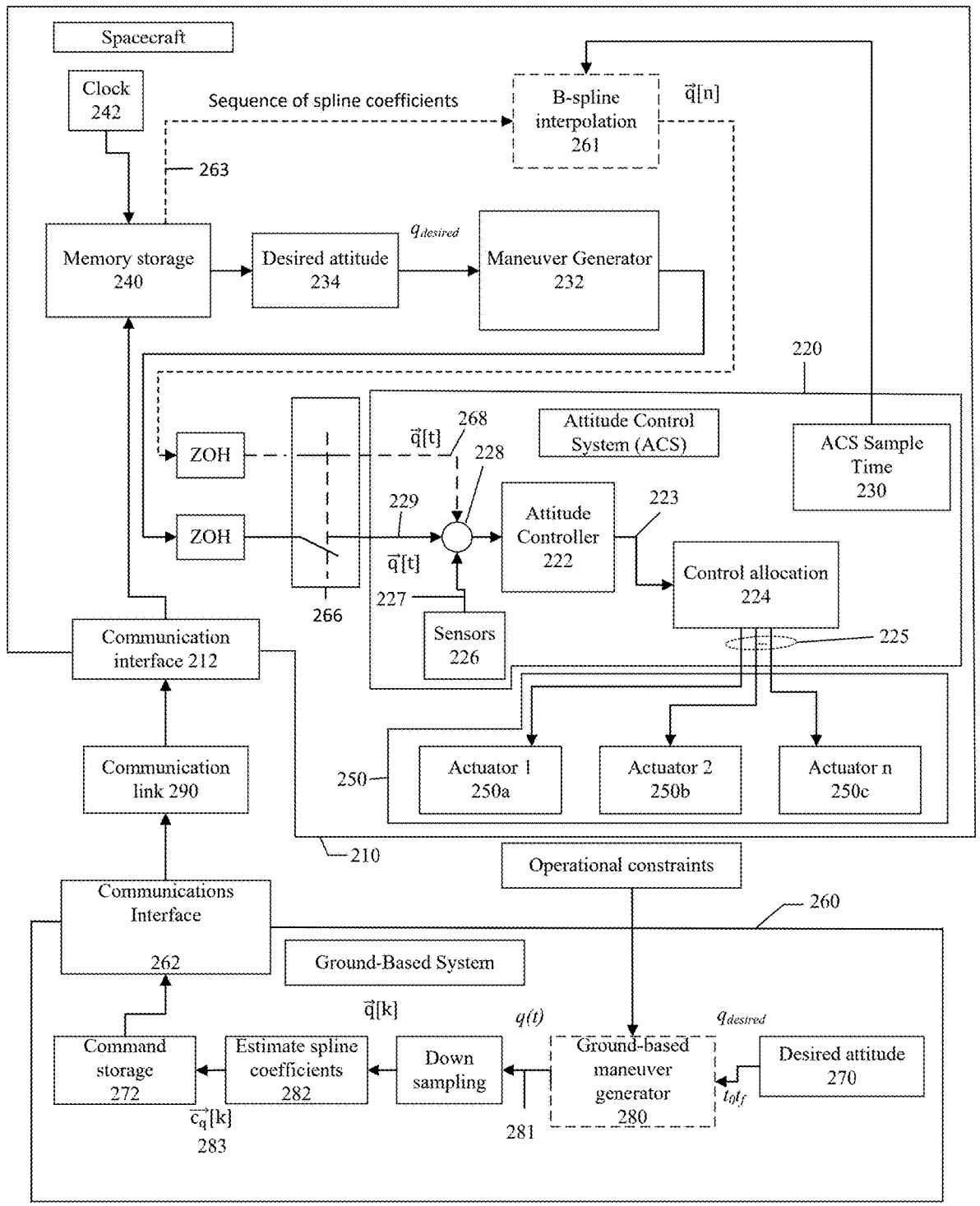
FIG. 16 shows a block diagram of a system illustrating an exemplary spacecraft with an attitude control system and a ground-based system having apparatus for reducing, transmitting, and reconstructing attitude maneuver trajectories in accordance with one or more aspects of the present disclosure.

Referring to FIG. 16, shown is an exemplary spacecraft 210 equipped with an attitude control system 220 having an attitude controller 222, a control allocation block 224 and a bank of sensors 226 for determining an attitude of the spacecraft. In order to control the attitude or orientation of spacecraft 210, attitude control system 220 generates commands to a plurality of actuators 250 that in turn produce a torque on the body of spacecraft 210. The action of plurality of actuators 250 thus effects a change in the attitude or orientation of spacecraft 210. Multiple actuators 250a, 250b, 250c are generally required since it is generally necessary to produce torque output components in three orthogonal directions to control the attitude of spacecraft 210 in any arbitrary direction. The plurality of actuators 250 may include a group or array of reaction wheels, a group or array of control moment gyroscopes (CMGs), a group or array of magnetic torque coils, and/or a group or array of thrusters. The role of attitude control system 220 is to operate plurality of actuators 250 by activating the actuators in a manner that decreases any errors between the spacecraft attitude command trajectory 229 or 268 and the actual spacecraft attitude 227. Actual spacecraft attitude 227 is determined using a bank of sensors 226 that measure the spacecraft angular rate and/or other variables to compute the spacecraft attitude. A filter (not shown) may also be implemented to smooth out and/or perform sensor fusion operations on the raw sensor data. Spacecraft attitude command trajectory 229 or 268 is compared to the measured spacecraft attitude 227 at summing node 228. By taking the difference between the desired spacecraft attitude command trajectory 229 or 268 and actual attitude angles 227, which may be expressed in a variety of forms including Euler angles, quaternions, Gibbs parameters or any other convenient way of expressing the attitude of the spacecraft, attitude control system 220 computes an error signal that is then filtered by attitude controller 222 to produce a vector of torque command components $T_{cmd}$ 223 generally given in three orthogonal directions. Other signals, for example, attitude rates and/or attitude accelerations, could also be utilized by attitude control system 220 to generate error or feedforward signals as inputs to attitude controller 222. A vector of torque command components $T_{cmd}$ 223, generally expressed in the spacecraft body fixed frame, is then processed by control allocation block 224 in order to map commanded components $T_{cmd}$ 223 to vector of command signals 225 for each of n plurality of actuators 250. Those of ordinary skill in the art sometimes also refer to control allocation block 224 as a steering law or torque allocation matrix. By way of control allocation block 224, attitude controller 222 may drive a plurality of actuators 250 in a way that decreases the attitude error calculated at summing node 228.

Conventionally, spacecraft attitude command trajectory 229 has been calculated onboard the spacecraft by onboard maneuver generator 232. Onboard maneuver generator 232 computes an spacecraft attitude command trajectory 229 according to predefined control logic in order to transition the attitude of spacecraft 210 from an initial or current orientation to a desired orientation specified by an operator of the spacecraft 210. A desired attitude 234 may be specified in terms of angular positions and/or may be represented as angular speeds, acceleration values or any combination thereof. Desired attitude 234 may be time-tagged and read from a memory or memory storage 240 when a time-tag becomes current as determined by evaluating the output of spacecraft clock 242. When any time-tagged attitude setpoint becomes current, the desired attitude angles, desired angular rates, desired maneuver completion time and any other parameters required by onboard maneuver generator 232 are read out of memory storage 240 and used by onboard maneuver generator 232 in order to compute spacecraft attitude command trajectory 229 for attitude control system 220 to follow.

Spacecraft 210 also has an onboard communications interface 212 that can be utilized to load one or more time-tagged attitude setpoints into memory storage 240. In general, the storage capacity of memory storage 240 may be limited so a means of reducing the amount of data to be stored in memory storage 240 may be used advantageously in operating spacecraft 210. Time-tagged attitude setpoints are transmitted from a system remote to the spacecraft, such as ground-based system 260, over an appropriate communication link 290. Although reference is made here to a ground-based system 260, this is merely exemplary. Ground-based system 260 could be part of an aircraft, watercraft, or even another spacecraft separate and remote from the spacecraft 210.

Referring now back to ground-based system 260, desired attitude 270 may be specified by an operator of the spacecraft or generated automatically by an automated supervisory or planning system (not shown). A series of time-tagged attitude setpoints may be stored local to ground-based system 260 in, for example, a command storage module 272 (e.g., volatile, or non-volatile memory, such as RAM, flash RAM, magnetic-based memory, etc.). Command storage module 272 may then be readout by communication interface 262 and transmitted to the spacecraft memory storage 240 over communications link 290. In general, the bandwidth of communications link 290 may be limited so a means of reducing the amount of data to be transmitted using communication link 290 to spacecraft 210 may be used advantageously in operating spacecraft 210.

As previously described, the method, system and apparatus, in accordance with the present disclosure provide a means for reducing an attitude command trajectory, transmitting the reduced attitude command trajectory to a spacecraft, and reconstructing the reduced attitude command trajectory at the spacecraft. As used herein, the term "reducing" is defined as encoding any time-varying attitude command trajectory by a set of polynomial coefficients to enable numerical data pertaining to the time-history of a time-varying attitude command trajectory to be efficiently and advantageously compressed by a set of polynomial coefficients. Further, as used herein, the term "reconstructing" is defined as determining the time-history of any time-varying attitude command trajectory described by a set of polynomial coefficients so that the resulting decompressed attitude command trajectory may be sampled at any arbitrary time during the span of the associated attitude maneuver and utilized as an input to a spacecraft attitude control system.

For example, an attitude command trajectory 281 can be computed by a conventional remote maneuver generator, such as a ground-based maneuver generator 280. The attitude command trajectory 281 may be computed according to any control logic capable of generating an attitude command pro file to transition the attitude of spacecraft 210 from an initial or current orientation to a desired attitude 270. Attitude command trajectory 281 output of ground-based maneuver generator 280 may be a vector or several vectors describing attitude command trajectories y (t) that provide curves for transitioning spacecraft 210 from some initial attitude to a desired final attitude.

Attitude command trajectory 281 output of ground-based maneuver generator 280 may then be provided to the input of a spline coefficient generator 282 of ground-based system 260. Spline coefficient generator 282 may include hardware and/or software configured to reduce a vector of attitude command trajectory 281 into B-spline coefficient vector 283 may include, in general, a set of polynomial B-spline coefficients as well as the begin and end times an attitude maneuver. Advantageously, B-spline coefficient vector 283 may have a reduced dimension as compared to attitude command trajectory 281. As used herein, the term "reduced dimension" refers to the compression of attitude command trajectory 281 by the process, in accordance with the present disclosure, of determining a set of polynomial coefficients that have the effect of removing non-essential information from the description of attitude command trajectory 281. The set of polynomial B-spline coefficients and the attitude maneuver begin and end times obtained in accordance with the present disclosure are stored in command storage module 272 and subsequently transmitted over link 290 to spacecraft 210 for implementation. In the preferred embodiment in accordance with the present disclosure, spline coefficient generator 282 encodes or compresses information contained in attitude command trajectory 281 as a vector of polynomial B-spline coefficients vector 283 that may be referenced to a predetermined time grid. Using the values of the polynomial B-spline coefficients vector 283 and a predetermined time grid, the original attitude command trajectory may be reconstructed or decompressed to an accuracy specified by the user of the process.

In order to execute a maneuver computed at ground-based system 260 using ground-based maneuver generator 280, polynomial B-spline coefficient vector 283 and a vector of maneuver begin and end times may be stored at ground-based system 260 using command storage module 272. The vector of maneuver begin and end times may be appended to the vector of polynomial B-spline coefficients vector 283 if desired by a user of the process. When a number of maneuvers have been reduced and stored in this way, vectors of polynomial B-spline coefficients vector 283 and vectors of maneuver begin and end times may be transmitted via communications interface 262 over communications link 290 to spacecraft 210. Upon arriving at spacecraft 210, communications interface 212 then routes the transmitted data to spacecraft memory storage 240 (e.g., volatile and/or non-volatile memory) where the reduced attitude command trajectories are stored until required for execution of each maneuver.

When it is determined, via spacecraft clock 242, that a maneuver should be executed, the relevant vector of polynomial B-spline coefficients 263 is read from memory storage 240 by the B-spline interpolation/command reconstruction module 261. B-spline interpolation/command reconstruction module 261 contains hardware and/or software for reconstructing any maneuver generated by ground-based maneuver generator 280 into a spacecraft attitude command trajectory 268 suitable for execution by attitude control system 220. Additionally, B-spline interpolation/command reconstruction module 261 can output spacecraft attitude command trajectory 268 (e.g. a four-dimensional quaternion vector) at any sample time spacecraft attitude command trajectory 229 as determined by the requirements of attitude control system 220. Spacecraft attitude command trajectory 268 is reconstructed by B-spline interpolation/command reconstruction module 261 by utilizing a vector of polynomial B-spline coefficients and associated circuitry to perform a polynomial B-spline interpolation operation.

Additionally, a switching apparatus 266, which may be realized in either a software or hardware or a combination thereof, can be employed to allow B-spline interpolation/command reconstruction module 261 to be implemented alongside any existing onboard maneuver generator 232 that may already be present as part of spacecraft 210. Switching apparatus 266 can be activated by an additional hardware or software module (not shown) in order to connect B-spline interpolation/command reconstruction module 261 to attitude control system 220. The action of switching apparatus 266 enables the function of existing onboard maneuver generator 232 to be bypassed so that B-spline interpolation/command reconstruction module 261 may be used advantageously to implement an attitude maneuver.

A benefit of utilizing the command reduction process provided by spline coefficient generator 282 in conjunction with command reconstruction process provided by B-spline interpolation/command reconstruction module 261 is that more sophisticated means of generating spacecraft guidance and control commands can be employed to operate spacecraft 210. In one embodiment, command trajectories can be generated using maneuver generator 280 to optimize aspects of the spacecraft performance, such as minimizing the maneuver time or energy consumption or other aspects of performance that cannot be improved or modified by sole use of onboard maneuver generator 232. Moreover, due to the complexities involved in the computation of such optimized command trajectories, it may not even be possible to compute optimized attitude command trajectories at update rates required for smooth computation of the attitude controller 222 or at the servo rates required for operation of plurality of actuators 250. In such a case, attitude command trajectories may be computed off-line using a ground-based system 260 remote from the spacecraft 210, including ground-based maneuver generator 280 and spline coefficient generator 282. Attitude command trajectory 281 computed by ground-based maneuver generator 280 are generally specified in the form of a plurality of time-tagged attitude trajectories. The series of time-tagged attitude command trajectory 281 and their derivatives and/or any feed-forward terms may then be transmitted to spacecraft 210 and stored in memory storage 240. If the ACS sample time 230 of attitude control system 220 is faster than the sample rate of attitude command trajectory 281 produced by the ground-based maneuver generator 280 and/or spline coefficient generator 282, intermediate points may need to be calculated by B-spline interpolation/command reconstruction module 261 between each of the stored attitude values for implementation of the spacecraft attitude command trajectory 268.

One scheme for generating intermediate points between two successive attitude values is to use a sample and hold mechanism, whereby the values of the desired attitude are held at their previous values until the time when the next setpoint becomes current as determined by the output of spacecraft clock 242. When the next setpoint becomes current, its values are read form the memory storage 240 and the values of the held setpoints are updated at the B-spline interpolation/command reconstruction module 261 and fed into summing node 228.

An issue associated with using a simple sample and hold mechanism to generate intermediate points at sample rates between two successive setpoints stored at memory storage 240 is that a discontinuity is produced at each instant that the setpoint is updated. Such discontinuities can cause the actual spacecraft response to deviate from the desired attitude command trajectory 281 as calculated by the ground-based maneuver generator 280. In addition, discontinuities can produce impulsive rates, accelerations, or jerks on the spacecraft body that, in turn, can excite spacecraft structural flexibilities and/or damage delicate electronics and instruments.

The deleterious effects of discontinuities at the input to summing node 228 can be minimized by generating (using ground-based maneuver generator 280) and storing (using command storage module 272) time-tagged attitude commands directly at ACS sample time 230. This approach, however, demands significant command storage requirements at memory storage 240. Moreover, since the command sequence is generated off-line at ground-based system 260, the entire sequence of time-tagged attitude setpoints must be uplinked to the spacecraft over communications link 290. The bandwidth required to transmit the command trajectories via 290 and/or the command storage requirements may not be achievable and thus an attitude command trajectory may become infeasible for implementation.

The method, apparatus, and system in accordance with the present disclosure thus provides for a spline coefficient generator 282 that can reduce or compress a plurality of guidance or attitude command trajectory 281 to a set of control points or B-spline coefficient vector 283. By reducing the dimension of the attitude command trajectory 281 to a polynomial, such as but not limited to, B-spline coefficient vector 283, the bandwidth and space requirements for transmission and storage of advanced spacecraft guidance and control commands is significantly reduced. Hardware and/or software may also be provided in the B-spline interpolation/command reconstruction module 261 to reconstruct attitude command trajectory 281 at any desired frequency with an accuracy tolerance specified by an operator of the process. The method, apparatus, and system in accordance with the present invention thus provide a means for spacecraft guidance and control that enables guidance and control trajectories calculated by a ground-based maneuver generator 280 and subsequently reduced by the spline coefficient generator 282 to be reproduced by the B-spline interpolation/command reconstruction module 261 as closely as desired to the original calculated trajectories.

Figure 17:
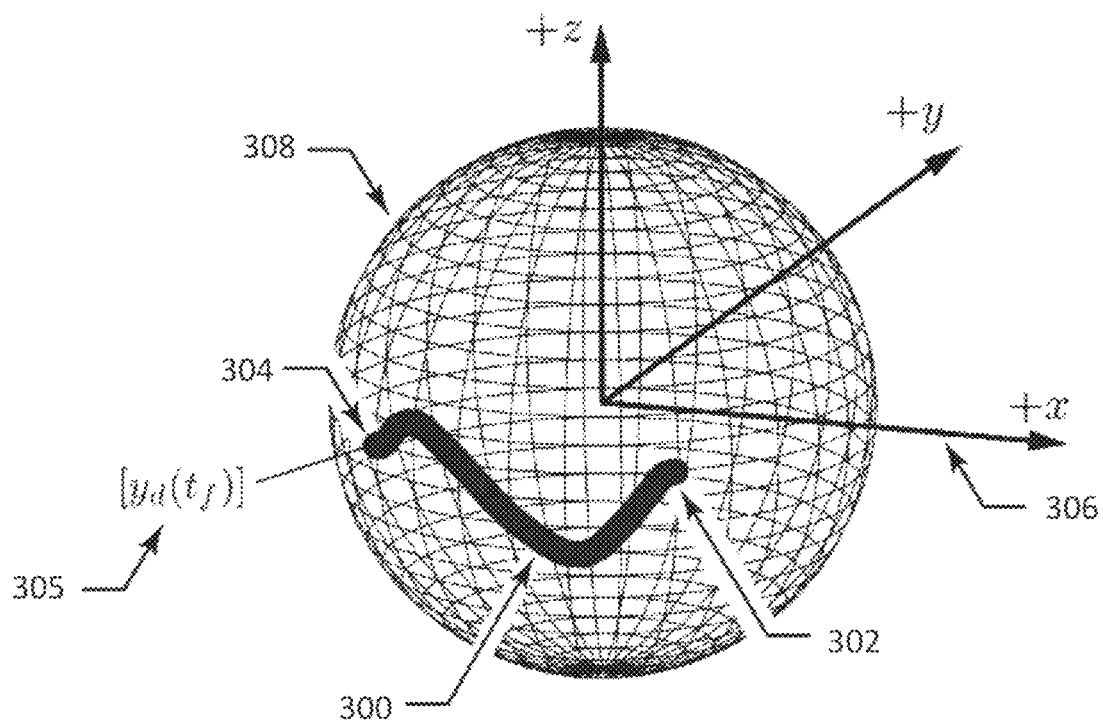
FIG. 17 illustrates an exemplary attitude maneuver that may be computed on a ground-based system and then implemented on board a spacecraft in accordance with the present disclosure.
Figure 18:
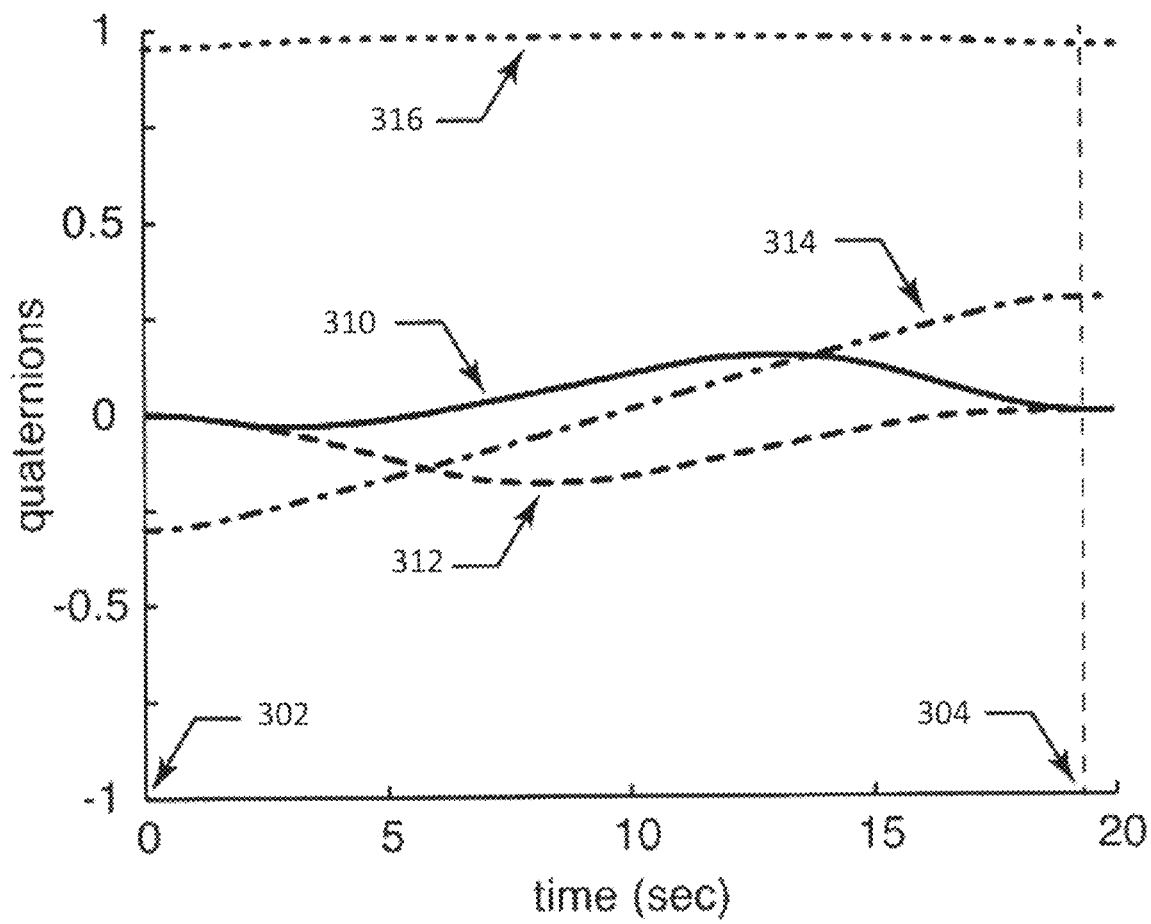
FIG. 18 shows a representation of an exemplary attitude maneuver expressed in terms of attitude quaternions as disclosed herein.

Referring now to FIG. 17, an exemplary spacecraft attitude maneuver 300 is shown. Spacecraft attitude maneuver 300 is carried out between two orientations beginning at initial time (to) 302 and ending at final time (tf) 304. As shown in FIG. 17, spacecraft attitude maneuver 300 is depicted in terms of the motion of an instrument axis as a projection on sphere 308 centered about a fixed orthogonal xyz coordinate system 306. At final time (tf) 304, attitude trajectory 310 may be denoted by desired attitude vector $[y_d(tf)]$ 305. It is noted that desired attitude vector $[y_d(tf)]$ 305 may be independent and distinct from the y-axis of the xyz coordinate system 306 shown in FIG. 17 (i.e., the "y" of the desired attitude function is unrelated to the "y-axis"). Associated with this maneuver are the desired attitude and velocity trajectories and their higher-order time-derivatives, as well as relevant actuator command trajectories that may also be calculated by maneuver generator 380. One representation of attitude command trajectories 281 associated with exemplary spacecraft attitude maneuver 300 is given in terms of attitude trajectory 310, 312, 314 and 316 quaternions as depicted in FIG. 18 between maneuver begin time 302 and maneuver end time 304. Quaternions are a four-dimensional representation of the attitude of an object, such as attitude trajectory 310, in three-dimensional space and are a familiar means of representing attitude of a spacecraft for those having ordinary skill in the art. Other representations of the spacecraft attitude, such as Euler angles or Gibbs parameters, are also possible and are fully compatible with the method in accordance with the present disclosure.

Attitude command trajectory 281 generated by ground-based maneuver generator 280 may be viewed as a plurality of signals in either discrete or continuous time. The plurality of signals may be reduced or compressed to a finite B-spline coefficient vector 283 that encode information contained within attitude command trajectory 281, so as to allow attitude command trajectory 281 to be reconstructed at any later time via the B-spline interpolation/command reconstruction module 261. In the preferred embodiment, coefficient vector 283 may be determined by approximating each command trajectory, for example, attitude trajectory 310 using a set of mathematical basis functions b(t)), for example B-splines and a forward/backward filtering process. In simple terms, basis functions b(t) are a set of basic functional building blocks that can be blended together in order to generate a mathematical description of a curve or any other data distributed over space, time or other continuum. There are many ways to construct a set of basis functions b(t). For example, if time, t, is the independent variable, a general set of basis functions may comprise the powers of t, e.g., $t^0, t^1, t^2, t^3, t^4, \ldots, t^N$. Another well-known set of basis functions is the Fourier basis, e.g., 1, $\sin(\omega t)$, $\cos(\omega t)$, $\sin(2\omega t)$, $\cos(2\omega t)$, ..., $\sin(N\omega t)$, $\cos(N\omega t)$. Every continuous function, in the function space from which the basis functions are derived, including the sets of basis functions described above, can be represented as a linear combination of the basis functions.

Figure 19:
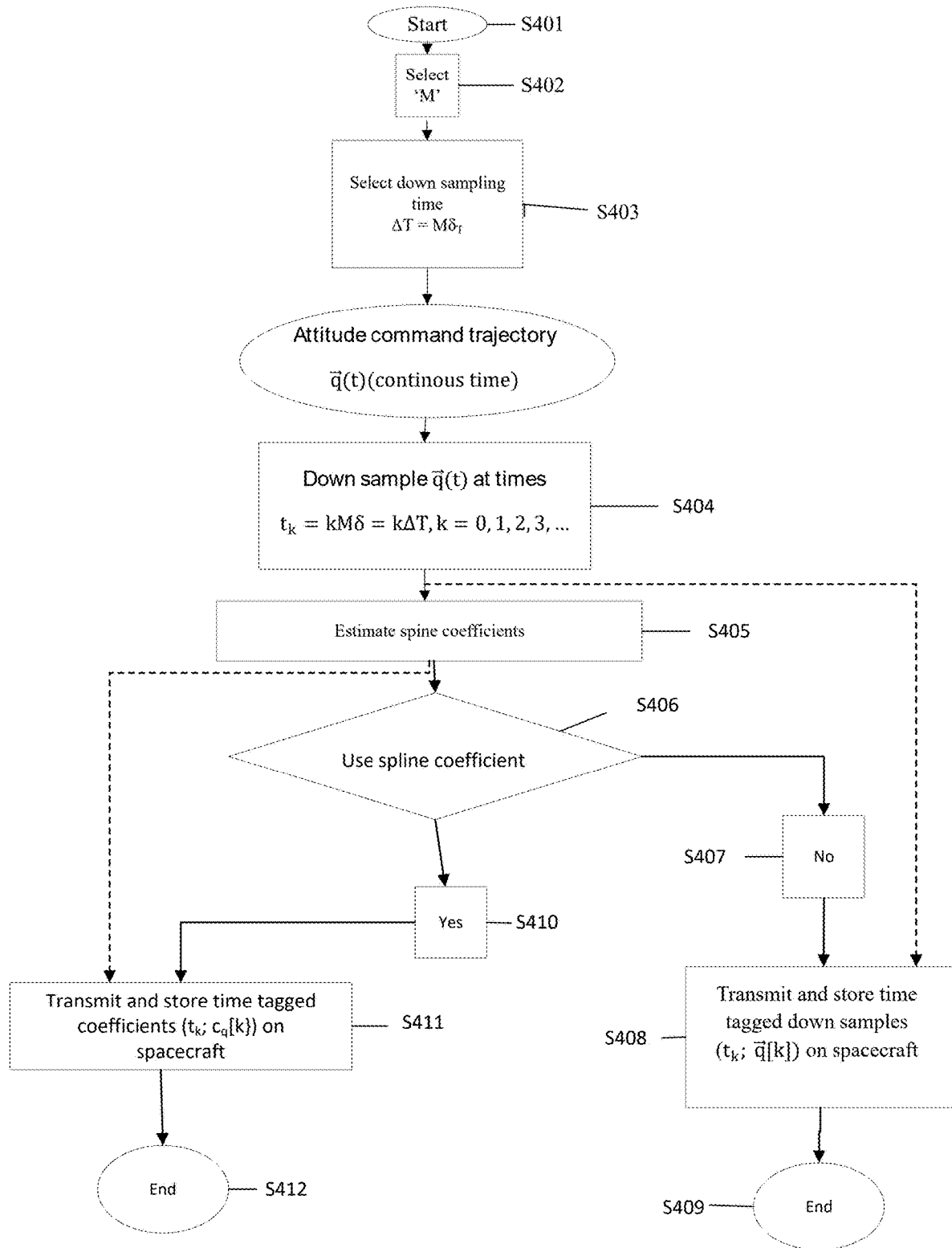
FIG. 19 is a flow diagram illustrating an exemplary method for reducing and encoding an attitude command trajectory as a vector of polynomial coefficients as disclosed herein.

With reference to FIG. 19, shown is a flow diagram illustrating an exemplary method/process for reducing and encoding an attitude command trajectory as a vector of polynomial coefficients as disclosed herein.

At step S401, the process Starts.
At step S402, 'M' is selected.
At step S403, the process sets down the sampling time $\Delta T = M\delta_T$.
At step S404, $\Delta T = M\delta_T$ and the attitude command trajectory $\vec{q}(t)$ (continuous time) are used to calculate $d\vec{q}(t)$ at times $t_k = kM\delta_T$ own sample=$k\Delta T$, k=0, 1, 2, 3, . . . .
At step S405, the process estimates the spline coefficients.
At step S406, a determination is made to use the spline coefficients or not?, IF YES
  S410, THEN, at step S411 the process transmits and stores the time tagged spline coefficients ($t_k$; $C_q[k]$) on the spacecraft and the process ENDS at step S412.
  IF NO S407, THEN the process transmits and stores time tagged down samples ($t_k$; $\vec{q}[k]$) on the spacecraft S408 and the process ENDS at step S409.

Figure 20:
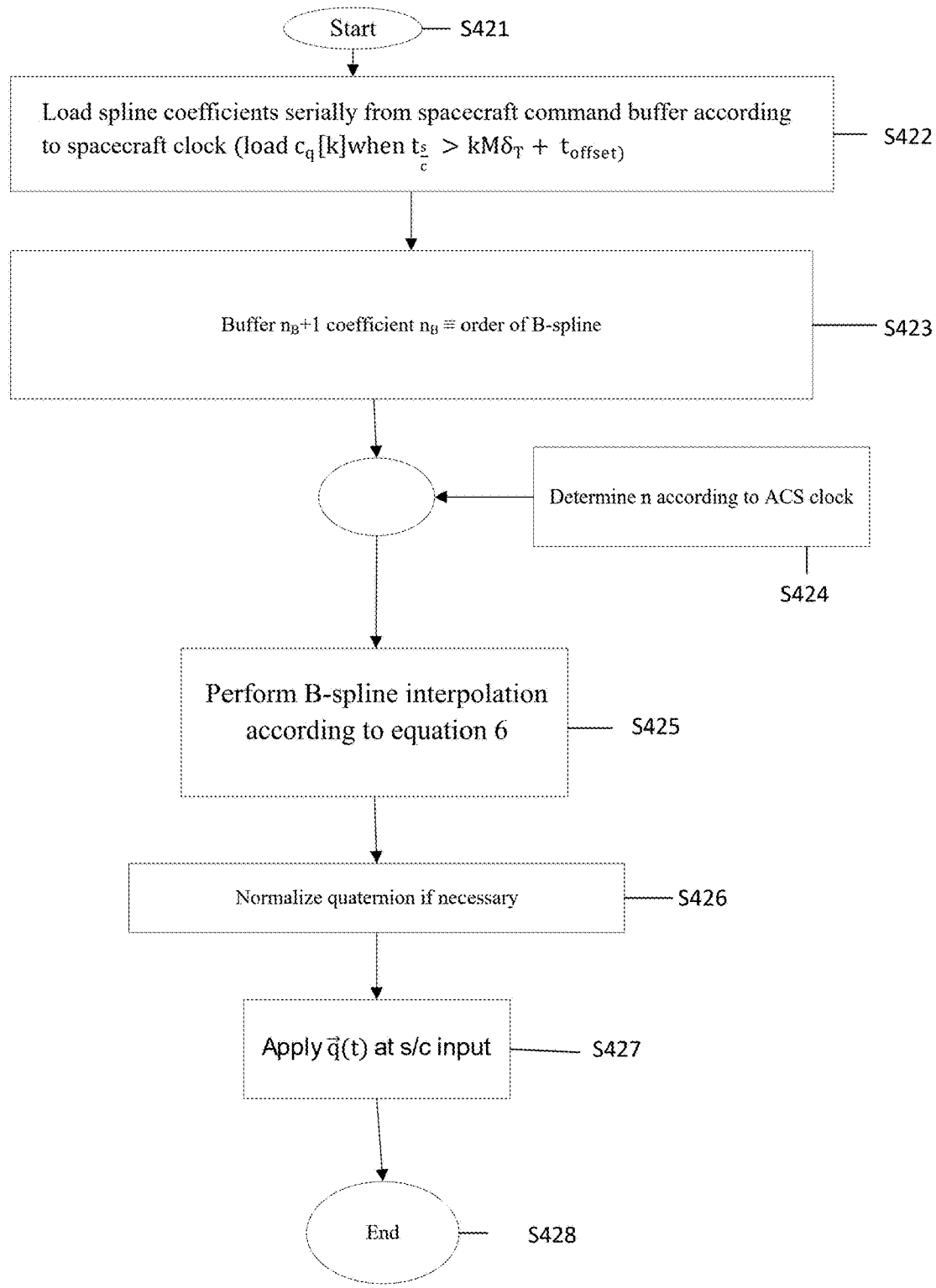
FIG. 20 is a flow diagram depicting an exemplary method for reconstructing an attitude command profile from a vector of polynomial B-spline coefficients at any given sample rate as disclosed herein.

With reference to FIG. 20, shown is a flow diagram depicting an exemplary method for reconstructing an attitude command profile from a vector of polynomial B-spline coefficients at any given sample rate as disclosed herein.

At step S421, the process Starts.
At step S422, the process loads the spline coefficients serially from the spacecraft command buffer according to the spacecraft clock (load $c_q[k]$ when $t_{s/c} > kM\delta_T + t_{offset}$).
At step S423, the process buffers $n_B+1$ coefficients, $n_B$=order of B-spline.
At step S425, the process performs B-spline interpolation according to equation (6), using
  the buffered $n_B+1$ coefficients and, where n is determined according to the ACS clock (step S424).

At step S426, the process normalizes the quaternion if necessary.

At step S427, the process applies $\vec{q}[n]$ at the s/c input, and the process ENDs at step S428.

Provided below, and with reference to FIGS. 21-37, are further details related to a Method for Implementing Tracking Commands for Spacecraft Reorientations, Guidance, and Steering according to exemplary embodiments of this disclosure. The goal of the described method and systems is to reduce the number of stored commands needed per degree of rotation by deploying a the disclosed flight software filter and related ground pre-processing. The input is an attitude trajectory (quaternions, Euler angles, Rodriguez parameters, etc.).

Figure 21:
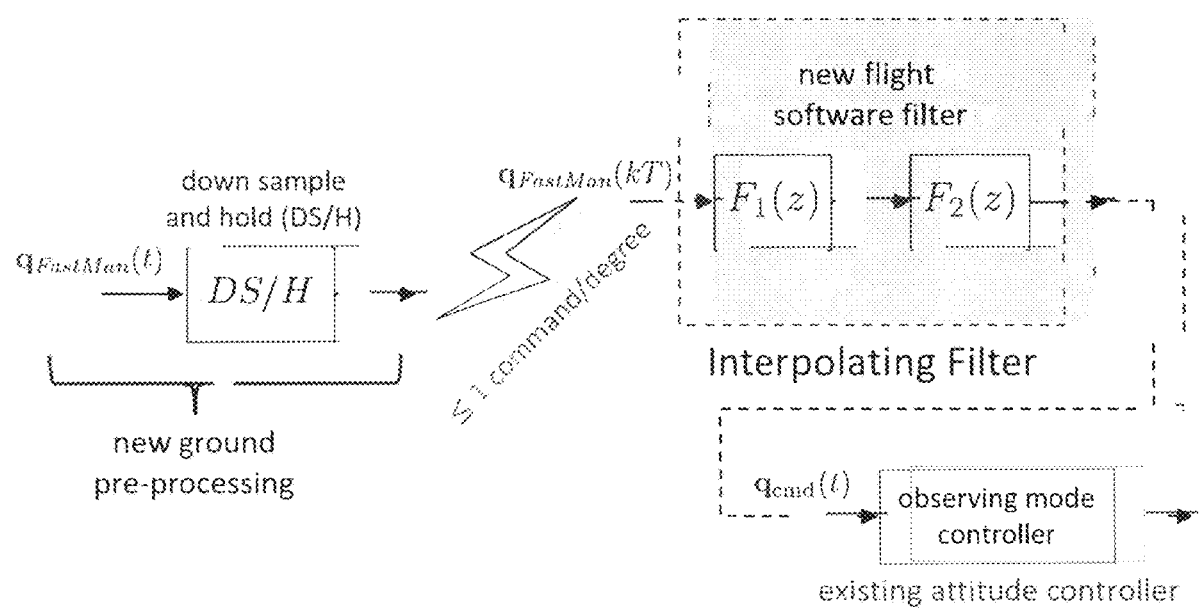
FIG. 21 shows a method and system for controlling an attitude of a spacecraft, the spacecraft including an attitude control system operatively associated with a ground-based spacecraft control system, and the spacecraft attitude control system using a B-spline interpolator for commanding the spacecraft as disclosed herein.

With reference to FIG. 21 shown is a method and system for controlling an attitude of a spacecraft, the spacecraft including an attitude control system operatively associated with a ground-based spacecraft control system, and the spacecraft attitude control system using a B-spline interpolator for commanding the spacecraft as disclosed herein.

Interpolation Filter Requirements:
1) Typical flight software is 'clock driven' with each time-tagged attitude command loaded sequentially from an absolute time sequence command buffer.
2) Interpolation filter should rely only on sequential (local) inputs read from the command buffer at a given downsampling interval.
3) Interpolation filter should produce an output at the observing mode (attitude) controller update rate (e.g., 5 Hz).
4) Interpolation error should be reasonably bounded (<0.5-deg).
5) Implementation should minimize structural changes to spacecraft flight software and be easy to instantiate.

Interpolating Filter Design
1) An Interpolation filter can be built upon polynomial splines.
2) Polynomial splines are piecewise curves of degree n that are smoothly joined together at points called 'knots'.
3) Assume uniformly spaced knots (DS/H spacing).
4) Smoothness constraints used to ensure the continuity of the spline and its derivatives up to the order n−1.
5) These properties can be described in terms of a B-spline expansion:

$$s(t) = \sum_k c(k)\beta^n(t-k)$$

Interpolated signal spline coefficient B-spline of degree n

B-spline Background/Summary
1) B-splines are symmetrical functions constructed by repeated convolutions of a 'rectangular pulse', where $$\beta^0(t) = \begin{cases} 1, & -\frac{1}{2} < t < \frac{1}{2} \\ \frac{1}{2}, & |t| = \frac{1}{2} \\ 0, & \text{otherwise} \end{cases}$$

and B-splines of degree n are determined as $$\beta^n(t) = \underbrace{\beta^0(t) * \beta^0(t) * \ldots * \beta^0(t)}_{(n+1) \text{ trans}}$$

and n=2 or n=3 B-splines are desirable for mechanical systems because they produce constant acceleration and constant jerk.

B-splines in the Frequency Domain
1) Fourier transform of the B-spline for unit spacing is $$\beta^n(\omega) = \frac{\left(e^{j\omega/2} - e^{-j\omega/2}\right)^{(n+1)}}{(j\omega)^{n+1}}$$

2) From above, a (strictly proper) transfer function for a third-order B-spline is $$\beta^3(s) = \frac{e^{-4Ts} - 4e^{-3Ts} + 6e^{-2Ts} - 4e^{-Ts} + 1}{(Ts)^4}$$

'Literal' Implementation of Third-Order B-spline
1) Rearranging the B-spline transfer function provide $$\beta^3(s) = \underbrace{\frac{1-e^{-sT}}{Ts}}_{ZOH} \cdot \underbrace{1 - 3e^{-sT} + 3e^{-2sT} - e^{-3sT}}_{F_a(z)@1/T-Hz} \cdot \underbrace{\frac{1}{(Ts)^3}}_{F_2(z)@5-Hz}$$

2) Filters $F_1(z)$ and $F_2(z)$ may be further decomposed into the series connection of several generic second-order filters.
3) $F_1(z)$ is a differentiating filter; $F_2(z)$ is an integrating filter.
4) This differentiator-integrator structure is also known as a (scaled) cascaded integrator-comb (CIC) interpolator.

Figure 22:
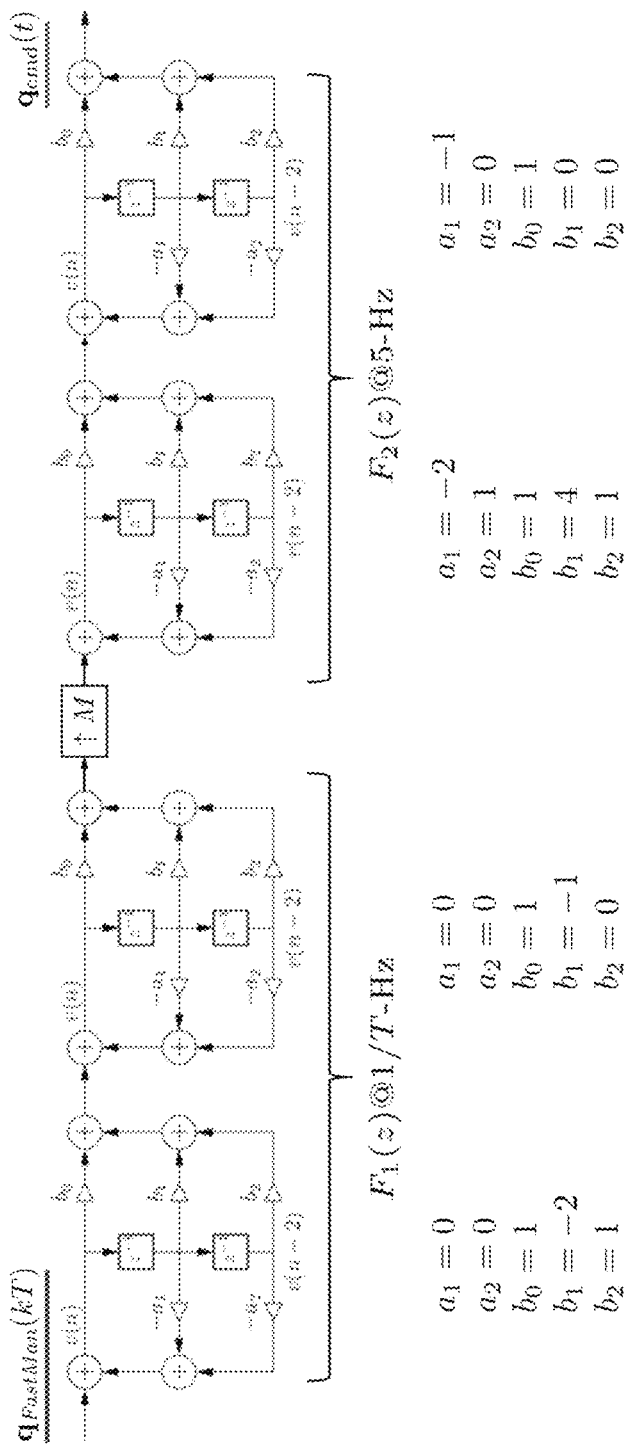
FIG. 22 shows an example Embodiment 1 including a DF-II Implementation of a Third-Order B-spline Interpolation, e.g. Cascade 4 second-order filters in series (two running at 1/T-Hz, two running at 5-Hz), as disclosed herein.

A generic discrete time filter on a spacecraft is a direct-form-II (DF-II) realization of a second-order infinite impulse response (IIR) filter. (See FIG. 8 and Equations (18) and (19). With reference to FIG. 22, shown is an example Embodiment 1 including a DF-II Implementation of a Third-Order B-Spline Interpolation, e.g. Cascade 4 second-order filters in series (two running at 1/T-Hz, two running at 5-Hz), as disclosed herein.

Figure 23:
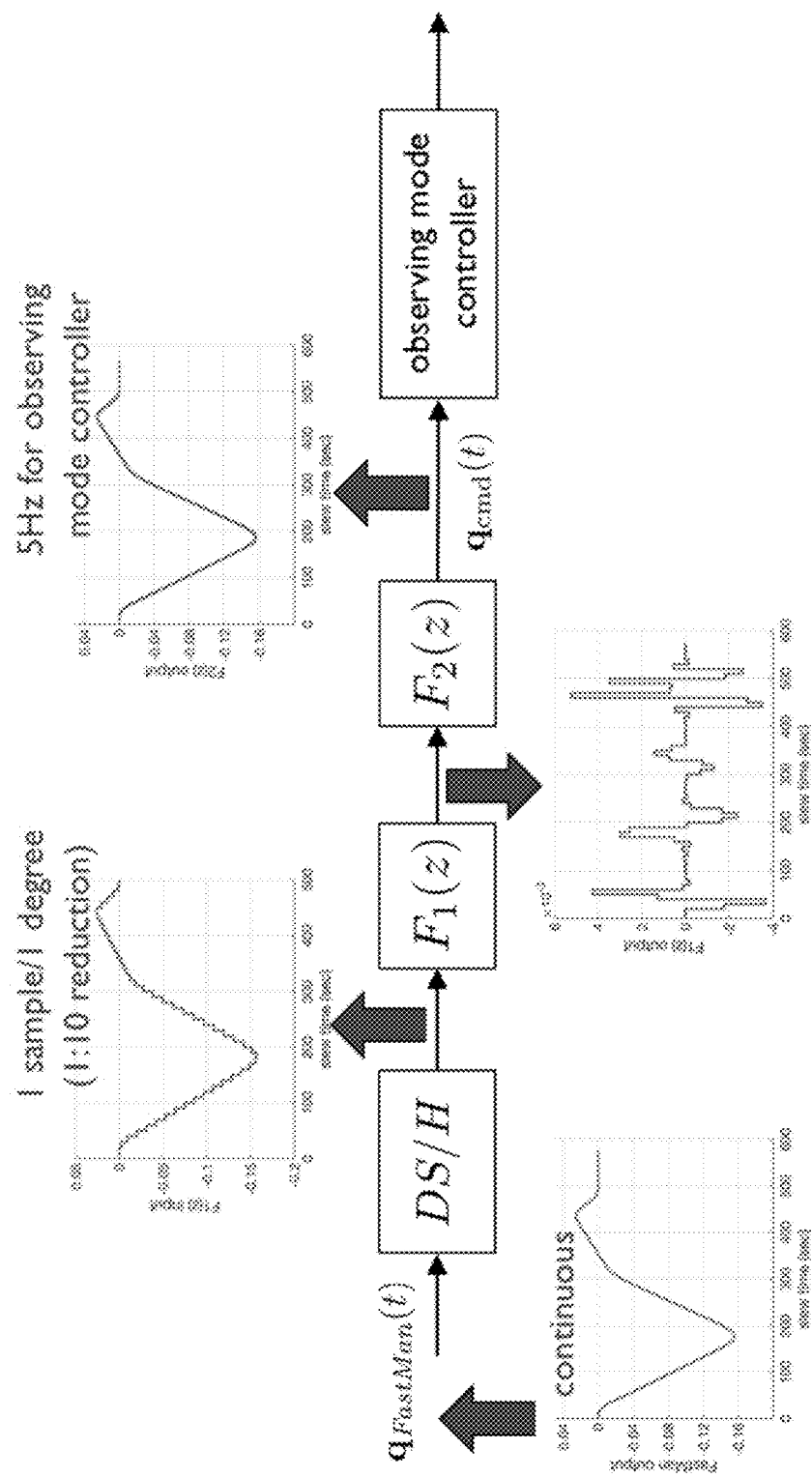
FIG. 23 shows a Proof-of-concept implementation of Embodiment 1 as disclosed herein.

With reference to FIG. 23, shown is a Proof-of-concept implementation of Embodiment 1 as disclosed herein.

Figure 24:
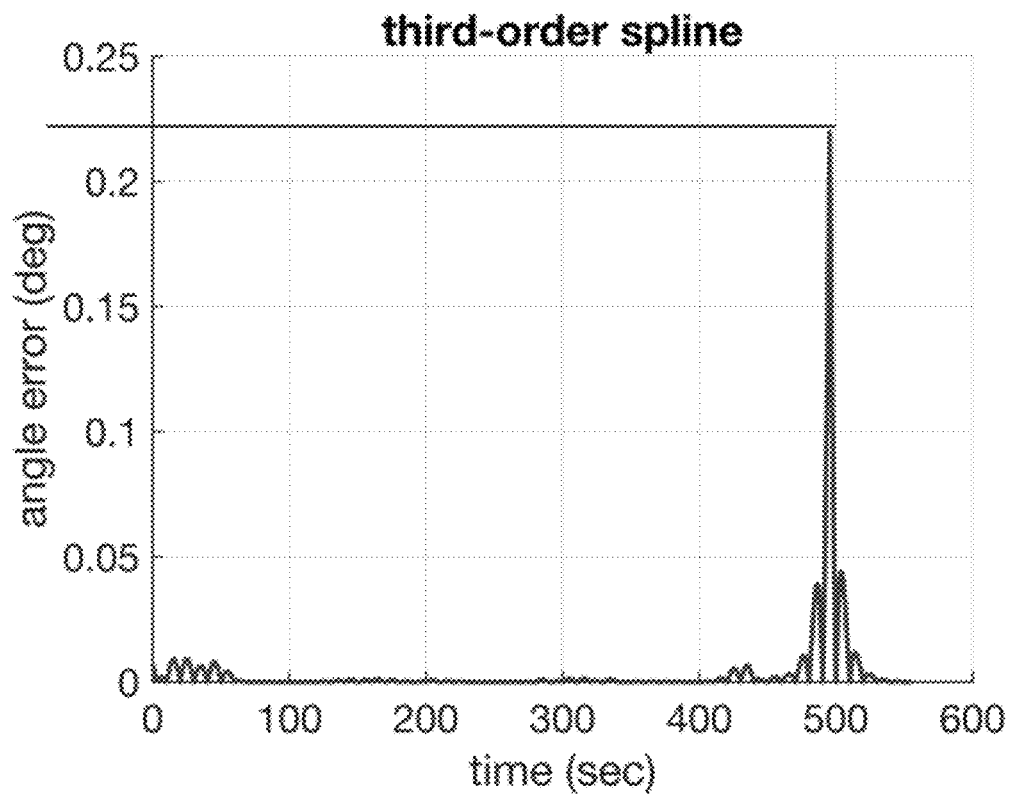
FIG. 24 shows Embodiment 1 Command profile interpolation error (peak error <0.25-deg.

With reference to FIG. 24, shown is Embodiment 1 Command profile interpolation error (peak error <0.25-deg.

Figure 25:
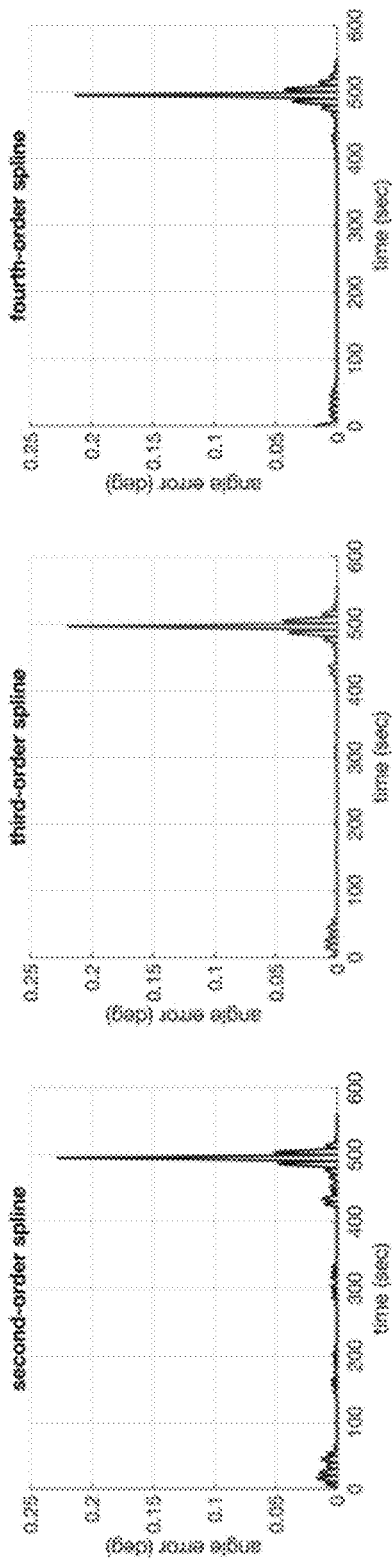
FIG. 25 shows Embodiment 1 Interpolation errors for various spline orders. Notably the overall, peak error is about the same (Preferred embodiment is third-order B-spline).

With reference to FIG. 25, shown is Embodiment 1 Interpolation errors for various spline orders. Notably the overall, peak error is about the same (Preferred embodiment is third-order B-spline).

Figure 26:
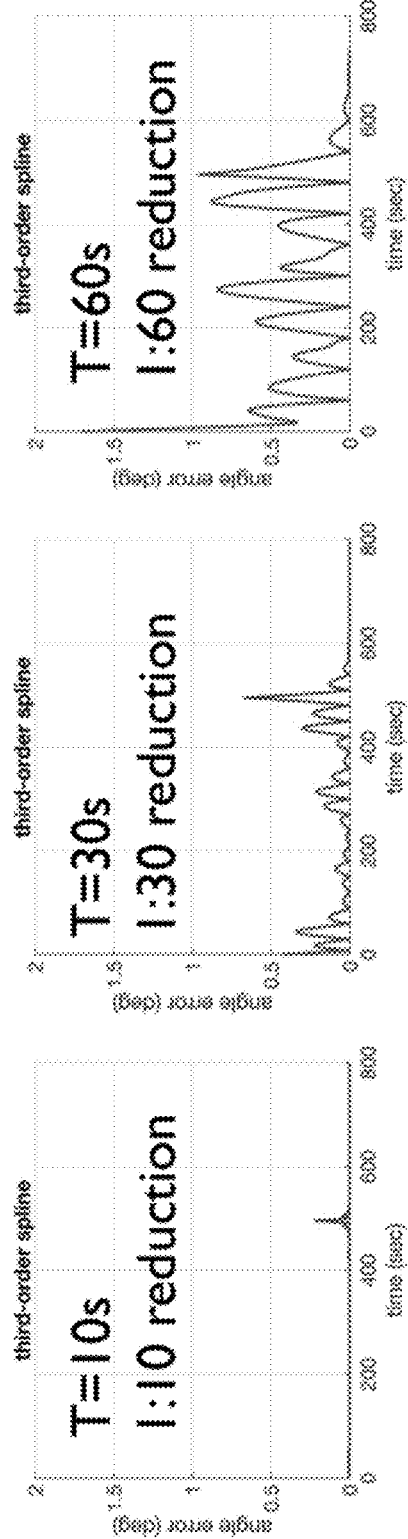
FIG. 26 shows Embodiment 1 Interpolation errors for various downsampling times (third order spline). Notably, the operator can decides an acceptable error tolerance.

With reference to FIG. 26, shown is Embodiment 1 Interpolation errors for various downsampling times (third order spline). Notably, the operator can decides an acceptable error tolerance.

Figure 27:
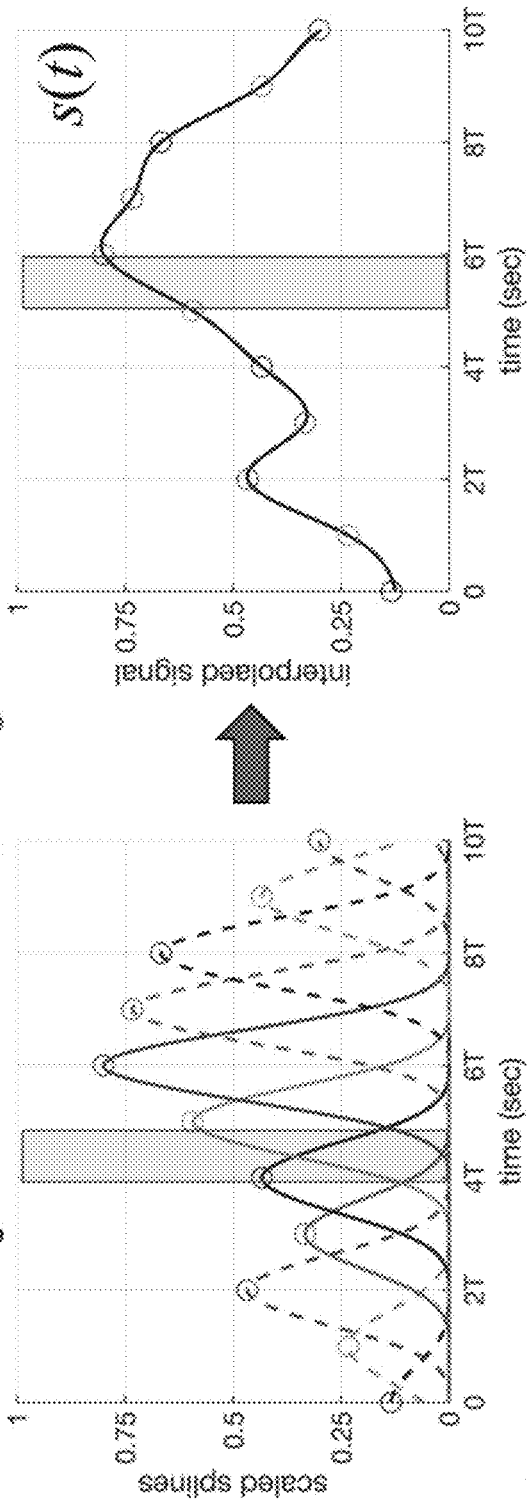
FIG. 27 shows Shifted B-splines in the Time Domain where a Third order B-spline interpolation is the convolution of (4) repeating spline segments with (4) local spline coefficients as disclosed herein.
Figure 28:
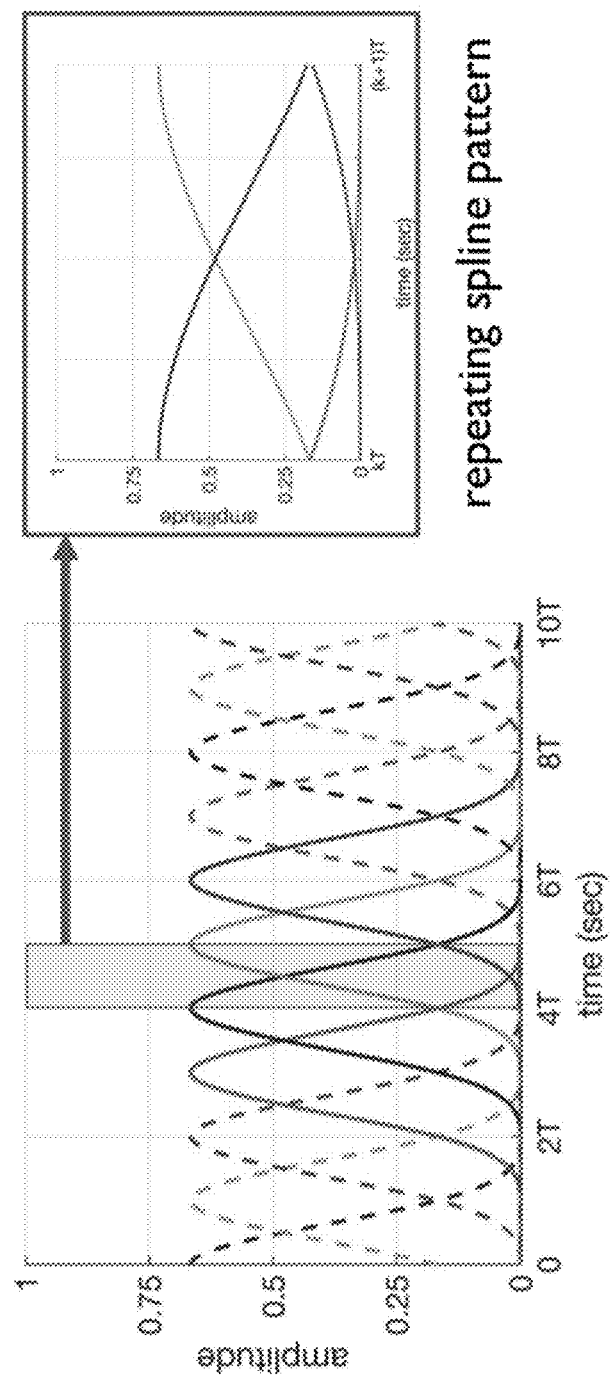
FIG. 28 shows Shifted B-splines in the Time Domain where B-splines are the shortest possible polynomial splines and have a 'compact support' (zero most of the time) and repeat in a pattern as disclosed herein.

With reference to FIG. 27, shown is Shifted B-splines in the Time Domain where a Third order B-spline interpolation is the convolution of (4) repeating spline segments with (4) local spline coefficients as disclosed herein With reference to FIG. 28, shown is Shifted B-splines in the Time Domain where B-splines are the shortest possible polynomial splines and have a 'compact support' (zero most of the time) and repeat in a pattern as disclosed herein.

Figure 29:
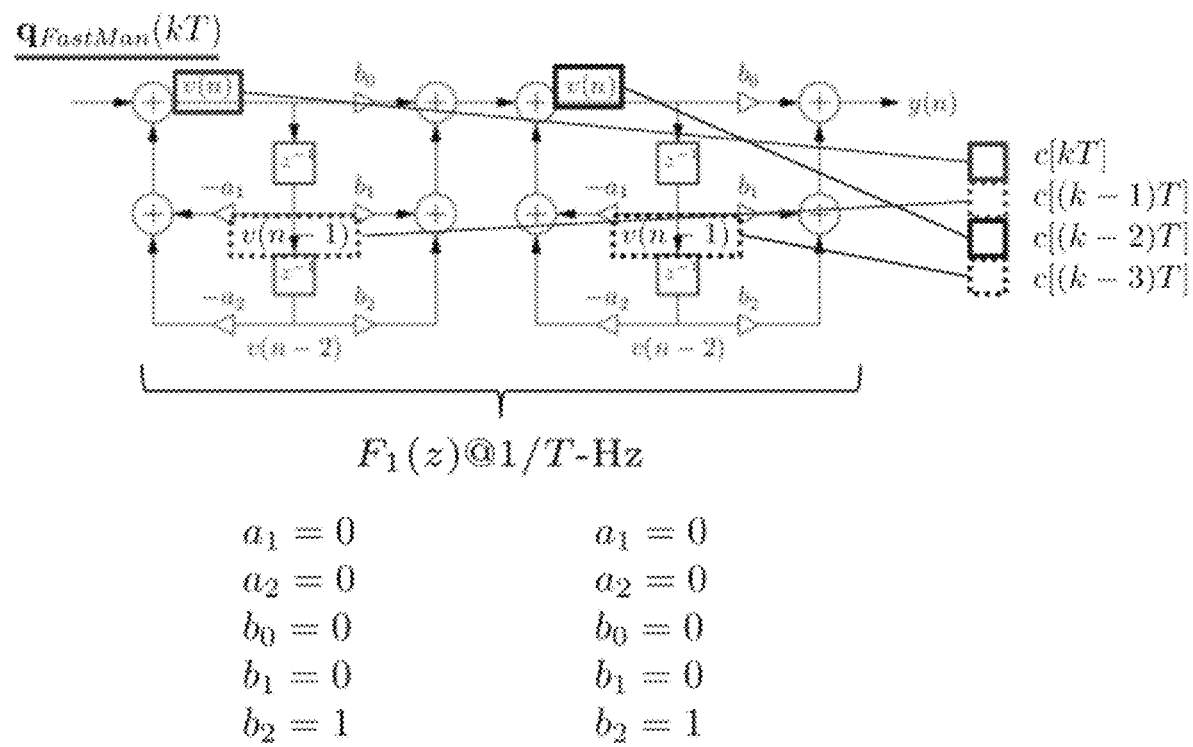
FIG. 29 shows an example Embodiment 2 including DF-II+Shifted Spline Interpolation. Step 1: Cascade 2 second-order filters in series (running at 1/T-Hz) to form a serial-in/parallel-out shift register as disclosed herein.

With reference to FIG. 29, shown is an example Embodiment 2 including DF-II+Shifted Spline Interpolation. Step 1: Cascade 2 second-order filters in series (running at 1/T-Hz) to form a serial-in/parallel-out shift register as disclosed herein.

Figure 30:
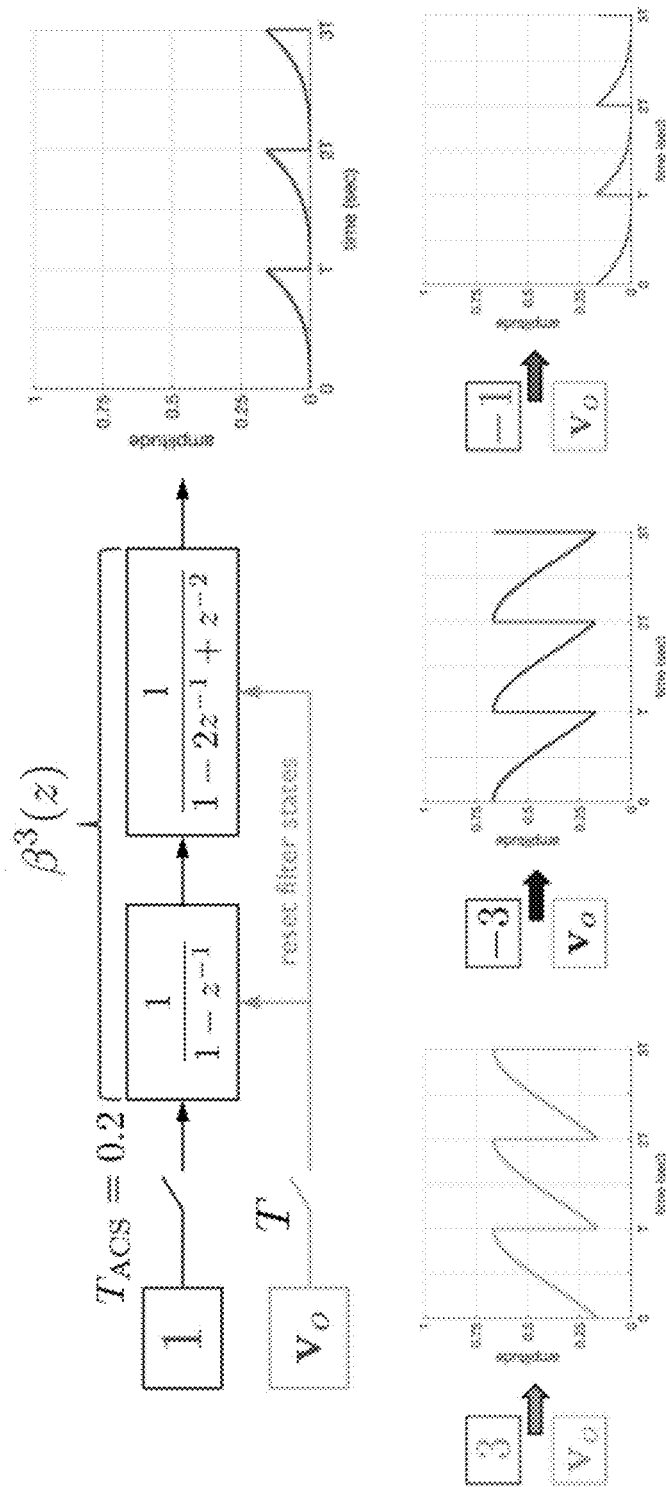
FIG. 30 shows Embodiment 2A including a Shifted Spline Filter. Step 2A: Implement repeating B-spline segments using a 'reset filter' structure as disclosed herein.

With reference to FIG. 30, shown is Embodiment 2A including a Shifted Spline Filter. Step 2A: Implement repeating B-spline segments using a 'reset filter' structure as disclosed herein.

Figure 31:
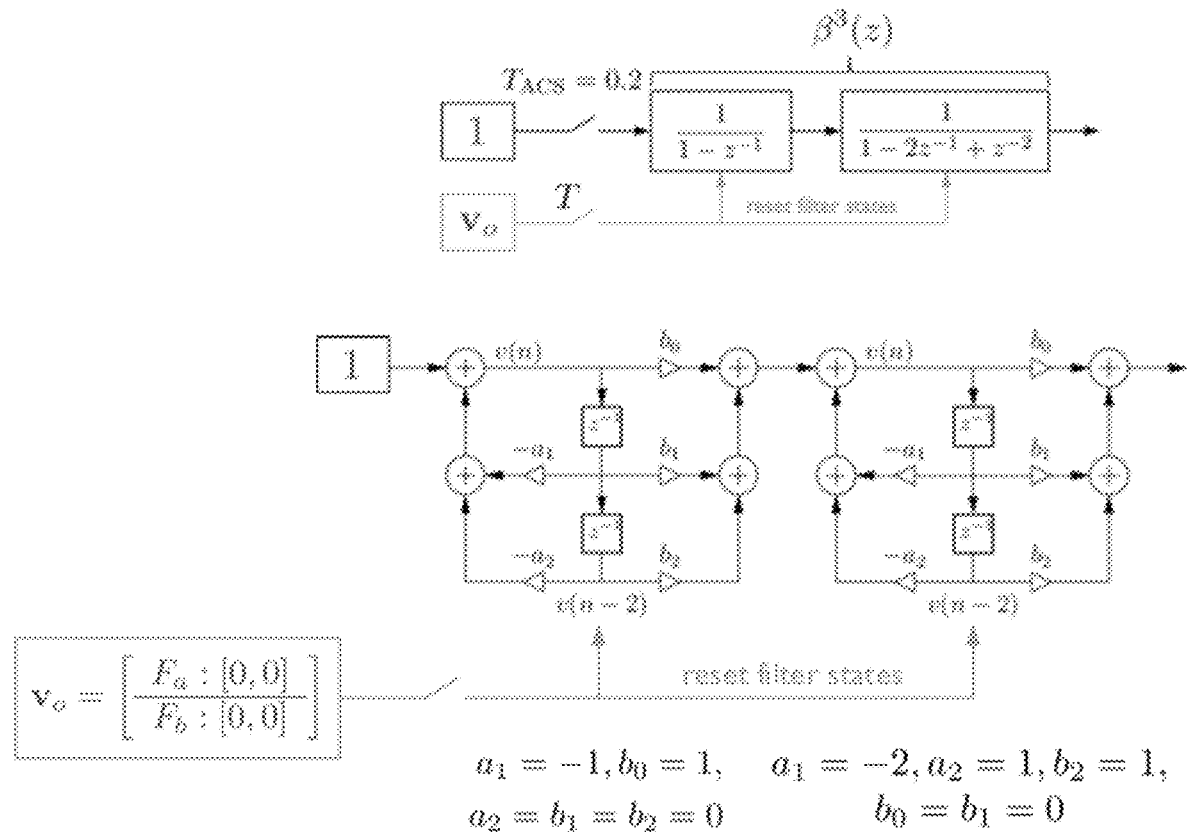
FIG. 31 shows Embodiment 2A including a DF-II Shifted Spline Filter. Step 2A: Implementation using DF-II filters as disclosed herein.

With reference to FIG. 31, shown is Embodiment 2A including a DF-II Shifted Spline Filter. Step 2A: Implementation using DF-II filters as disclosed herein.

Figure 32:
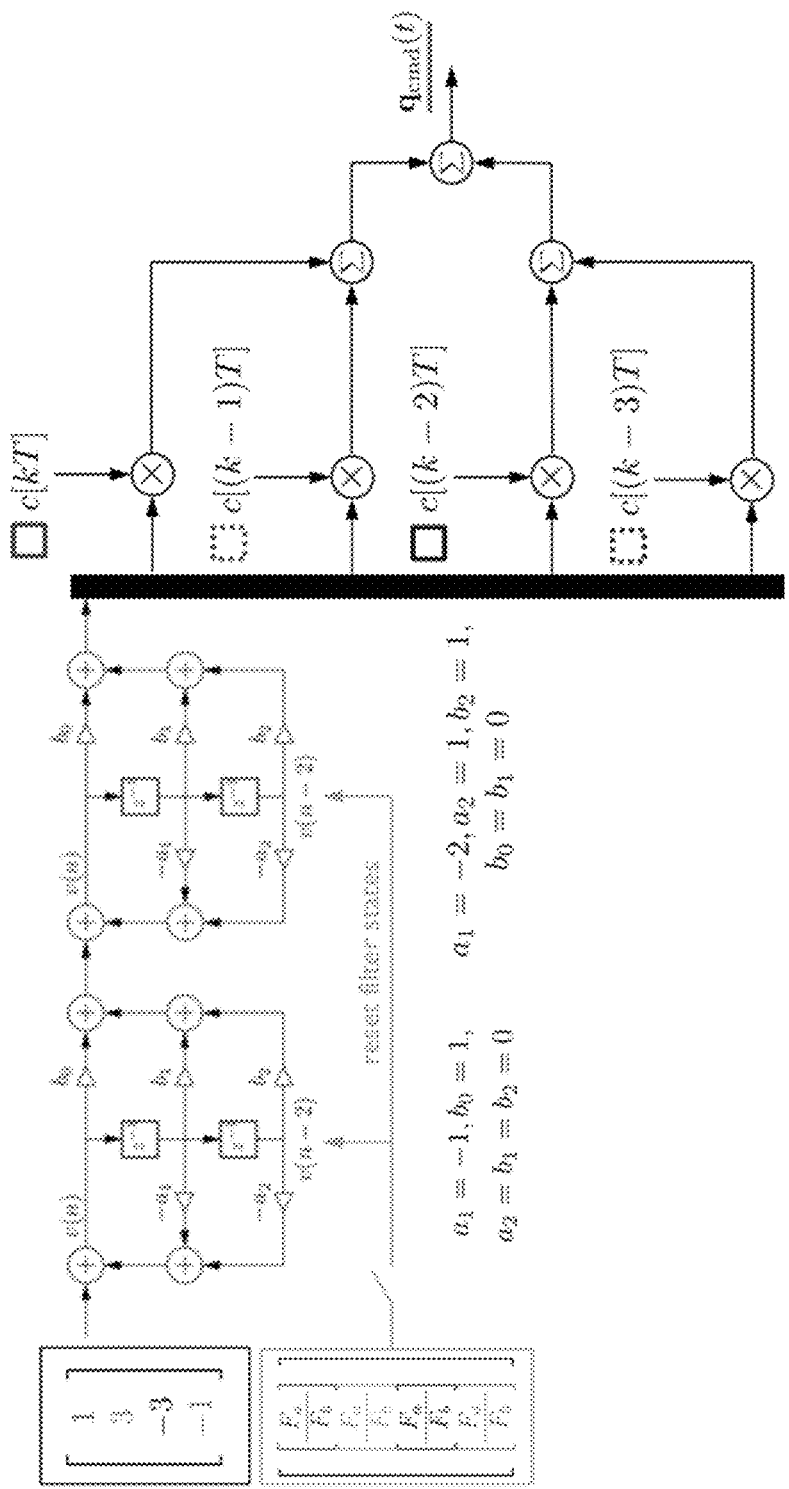
FIG. 32 shows Embodiment 2A including a Shifted Spline Filter. Step 2A: interpolation of signal as represented in the block diagram shown, including all 4 spline segments computed using two 4D filters in series.

With reference to FIG. 32, shown is Embodiment 2A including a Shifted Spline Filter. Step 2A: interpolation of signal as represented in the block diagram shown, including all 4 spline segments computed using two 4D filters in series.

Figure 33:
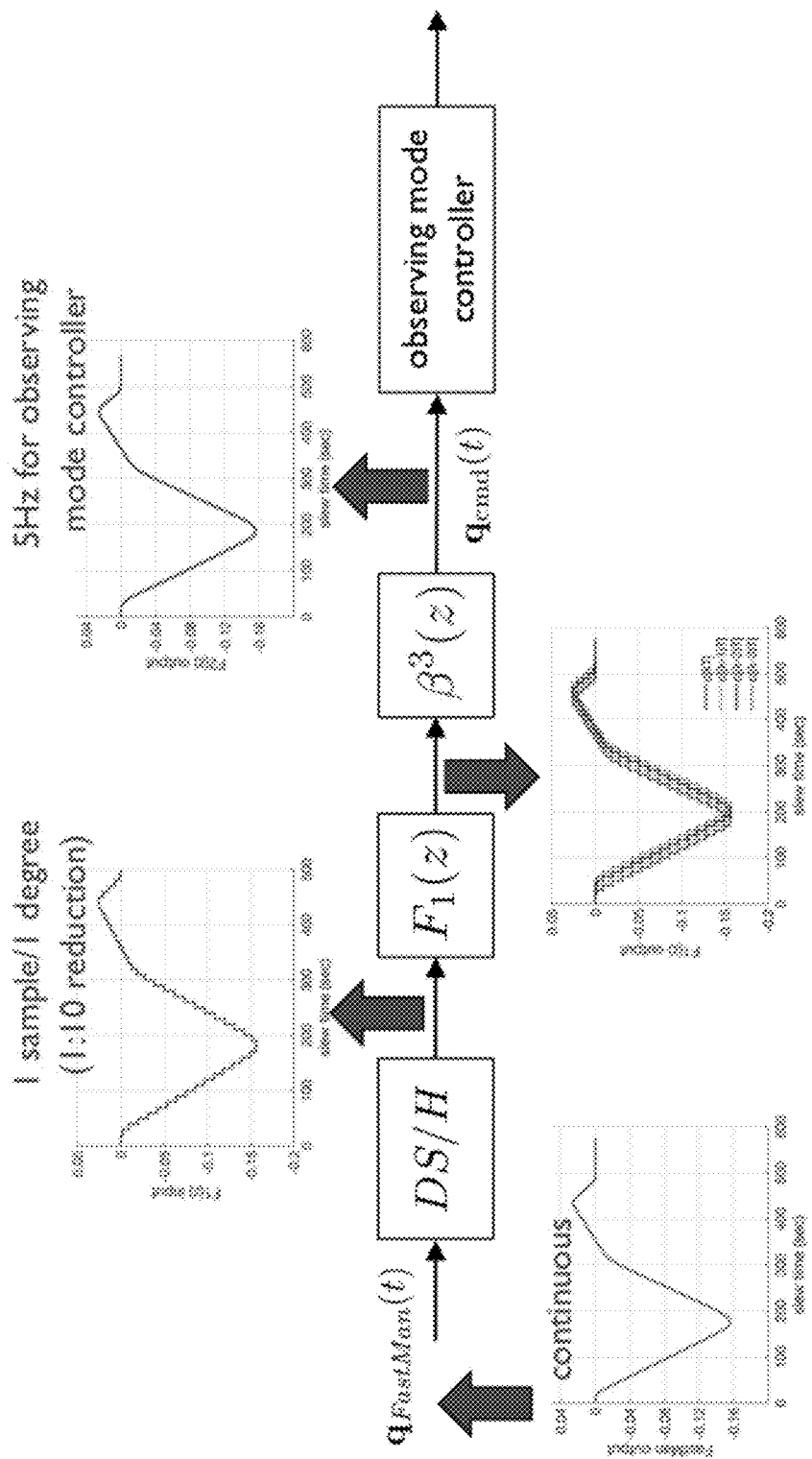
FIG. 33 shows Embodiment 2A Proof-of-concept implementation as disclosed herein.

With reference to FIG. 33, shown is Embodiment 2A Proof-of-concept implementation as disclosed herein.

Figure 34:
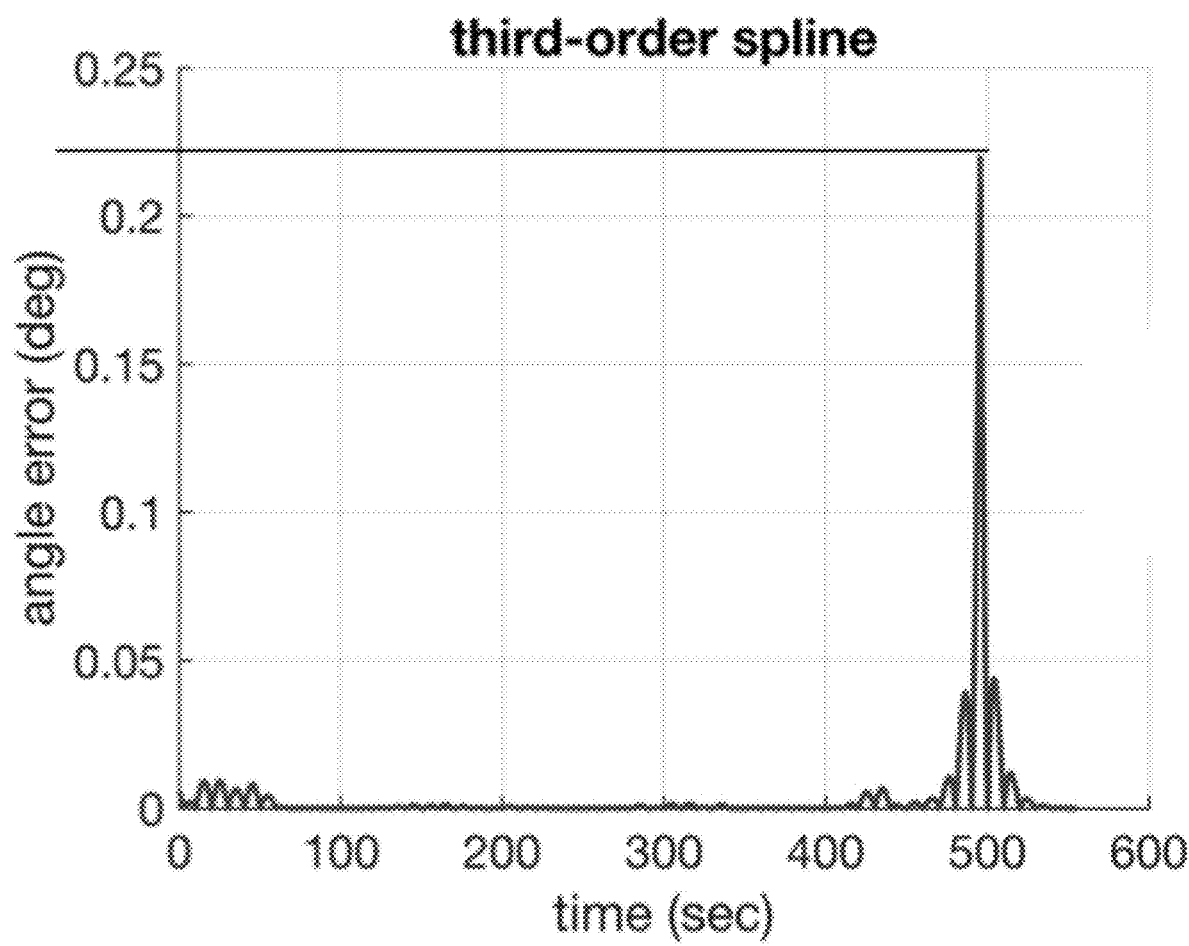
FIG. 34 shows Embodiment 2A Command profile interpolation error (peak error <0.25-deg). Notably same error as before.

With reference to FIG. 34, shown is Embodiment 2A Command profile interpolation error (peak error <0.25-deg). Notably same error as before.

Figure 35:
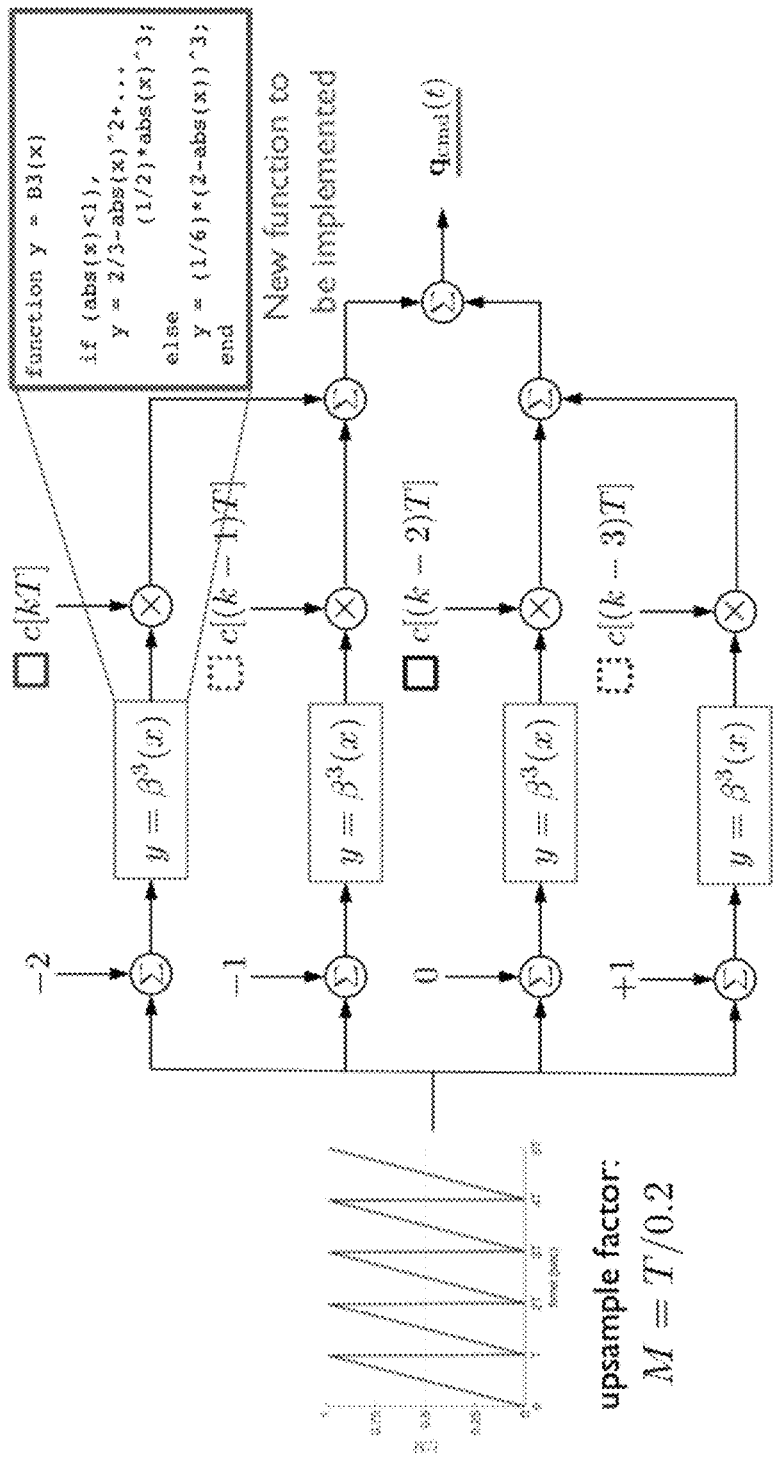
FIG. 35 shows Embodiment 2B including a DF-II+ Shifted Spline Interpolation Step 2B including: Compute B-spline functions as needed for convolution.

With reference to FIG. 35, shown is Embodiment 2B including a DF-II+Shifted Spline Interpolation Step 2B including: Compute B-spline functions as needed for convolution.

Figure 36:
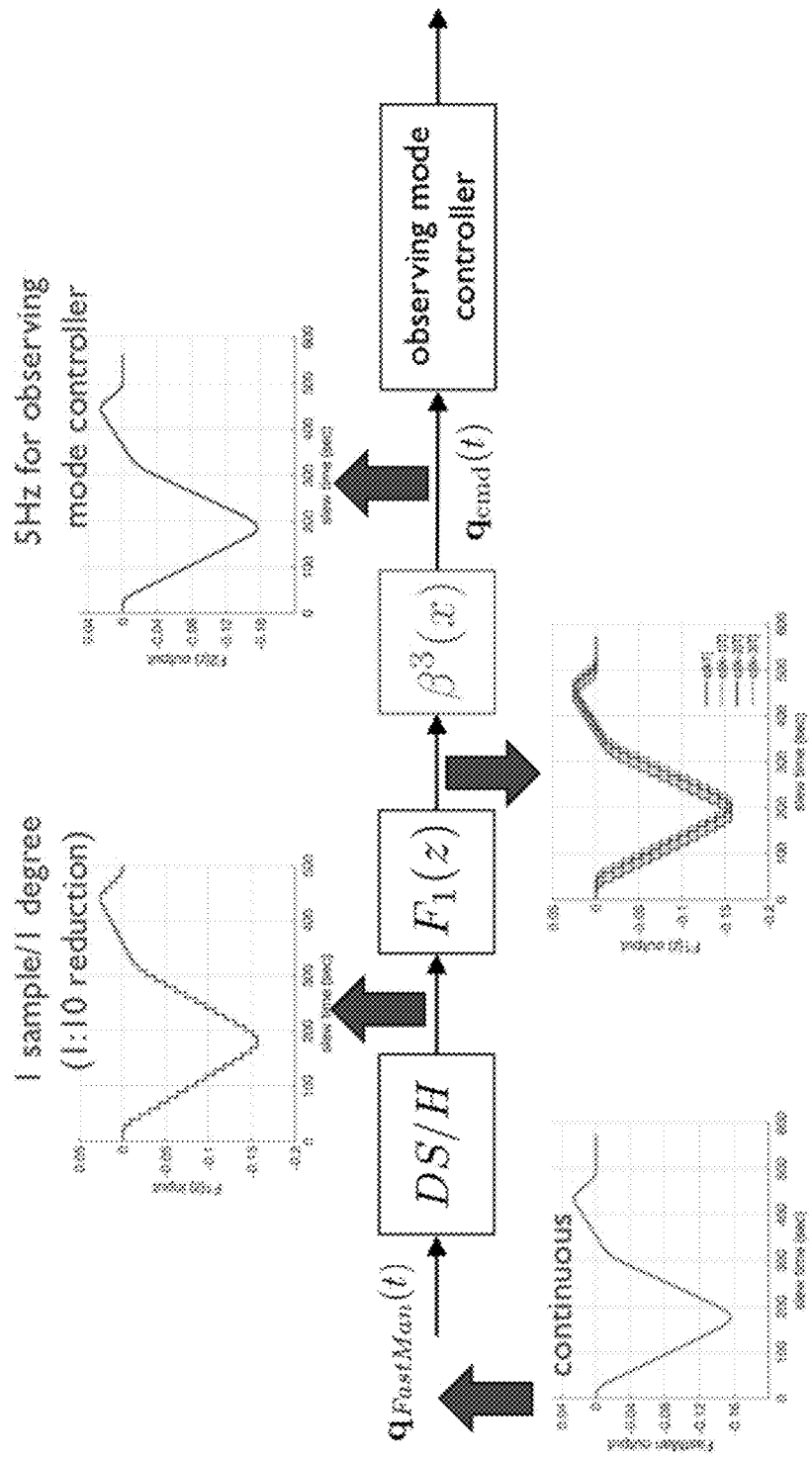
FIG. 36 shows Embodiment 2B Proof-of-concept implementation as disclosed herein.

With reference to FIG. 36, shown is Embodiment 2B Proof-of-concept implementation as disclosed herein.

Figure 37:
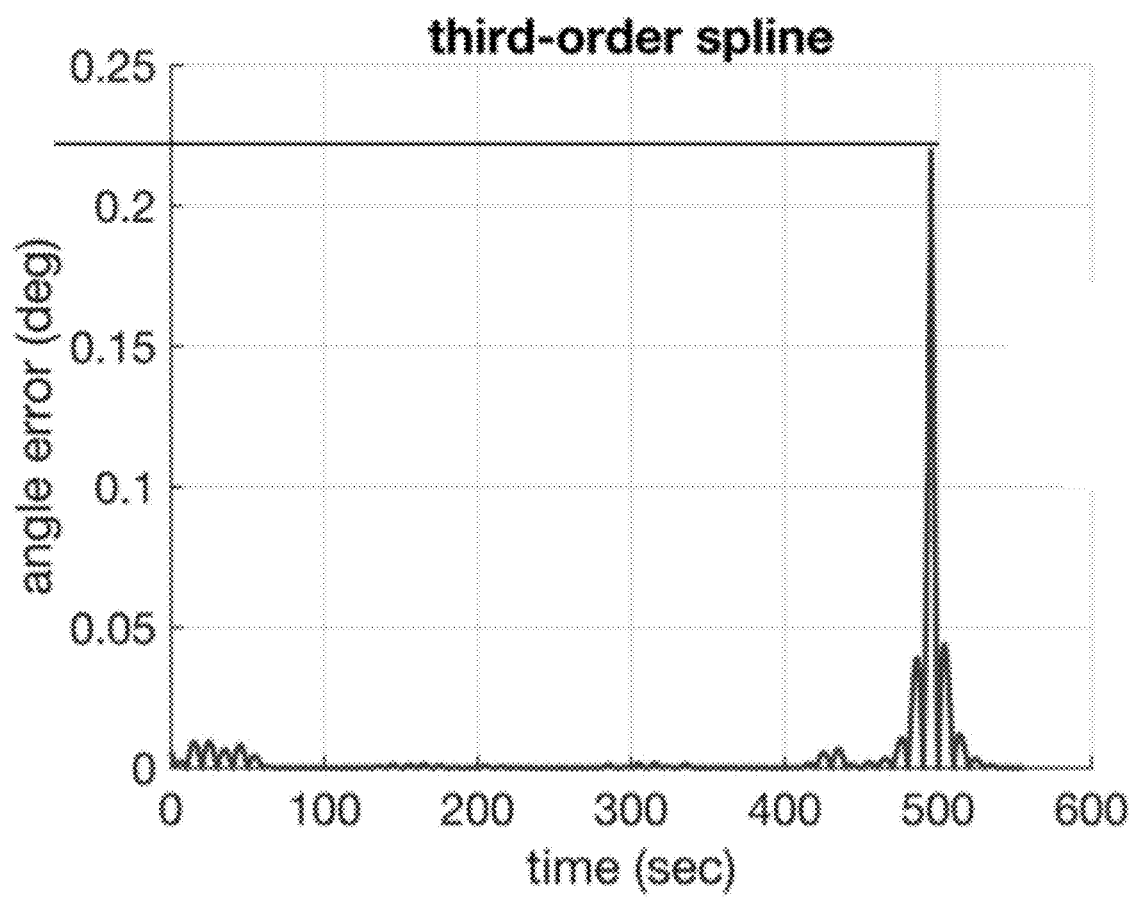
FIG. 37 shows Embodiment 2B Command profile interpolation error (peak error <0.25-deg).

With reference to FIG. 37, shown is Embodiment 2B Command profile interpolation error (peak error <0.25-deg).

Described now is another method and system for the command reduction process provided by spline coefficient generator/command reduction module 282 as described above (FIG. 16) This method and system for the command reduction includes 1) Estimation of Spline Coefficients using a Kalman filtering process and 2) Determining the Waypoint Coefficients using the Kalman filtering process described.

1) Estimation of Spline Coefficients Using Kalman Filtering Process

The waypoint coefficients c[k] for interpolation of an attitude guidance trajectory can be estimated in a number of ways. The waypoint coefficients are not necessarily the same as the attitude quaternions because in (16), transfer function H(z)=1. However, as shown above, the particular decomposition at hand involves two data rates: a faster data rate of the data s[n] and lower data rate of the spline coefficients c[k]. The same multirate convolution can be expressed by a bank of filters all implemented at the lowest data rate, the one of the coefficients, as follows. The convolution in equation (13) can be written as the parallel of M convolutions $$s[mM+\ell] = \sum_k c[k]h[(m-k)M+\ell] \quad (22)$$

$$= \sum_{k=0}^{3} h_\ell[k]c[m-k]$$

for $\ell = 0, \ldots, M-1$, where $$h_\ell[m] = h[mM+\ell], m = 0, \ldots, 3 \quad (23)$$

are called the polyphase components of the impulse response h[n].

Figure 38:
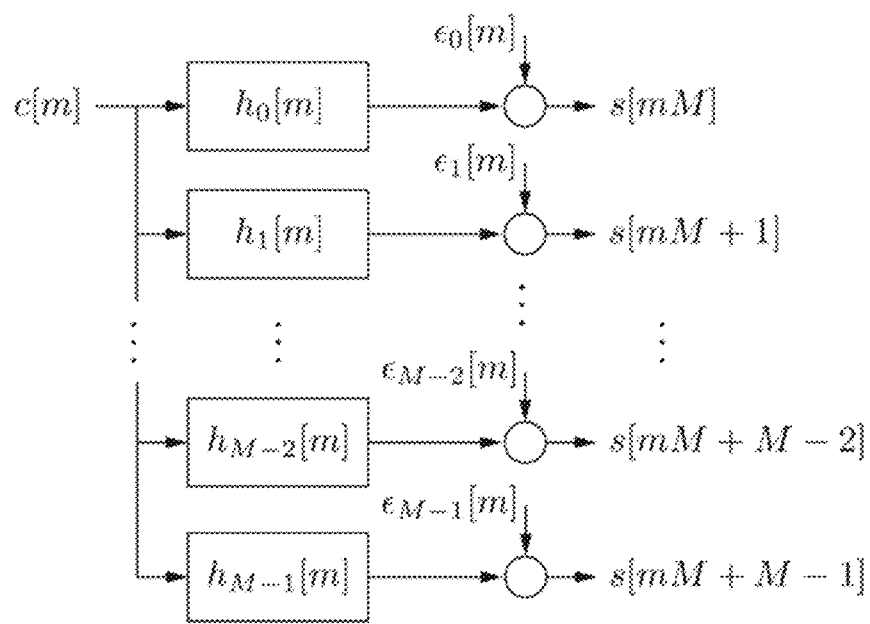
FIG. 38 shows a polyphase decomposition according to an example embodiment of this disclosure.
Figure 39A:
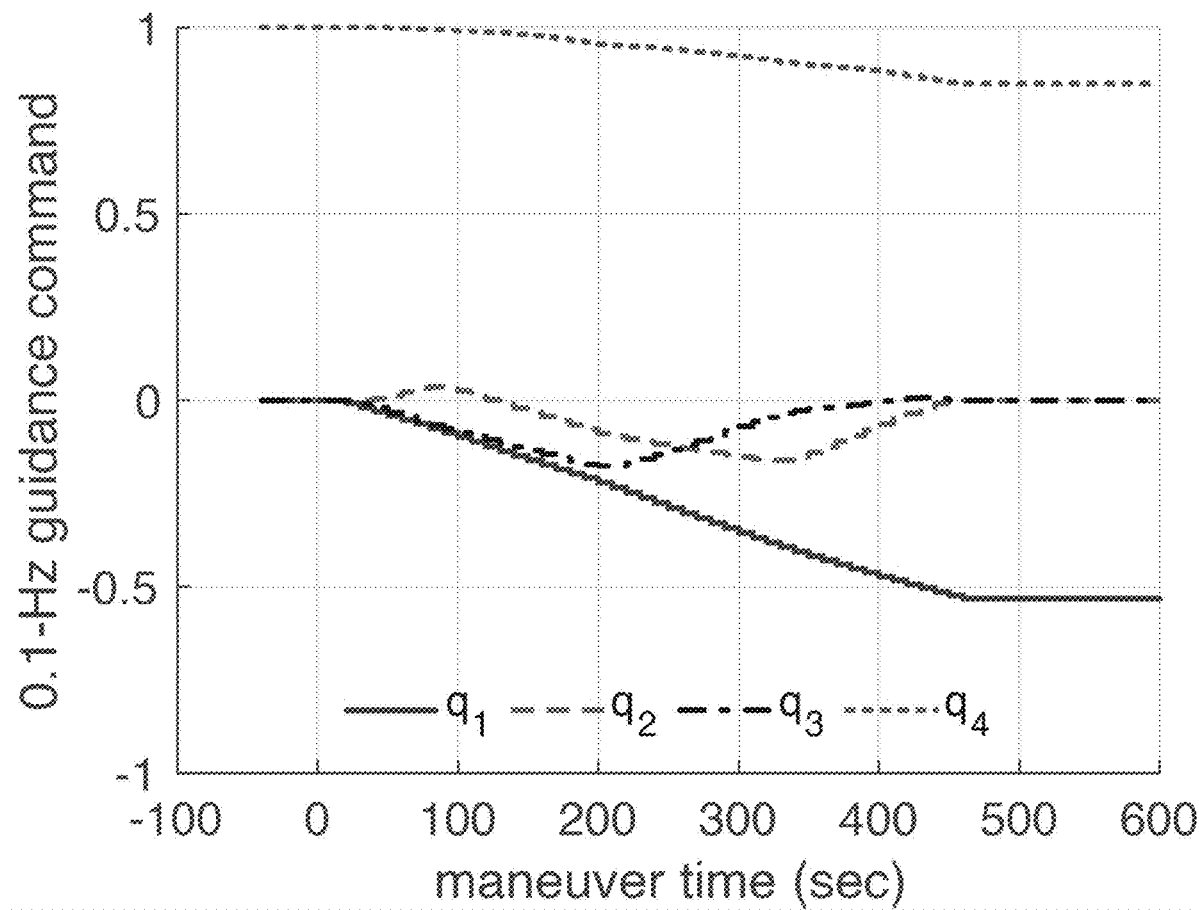
FIG. 39A shows example quaternion trajectories for attitude guidance: FastMan solution extended to the left and downsampled at 0.1°Hz
Figure 39B:
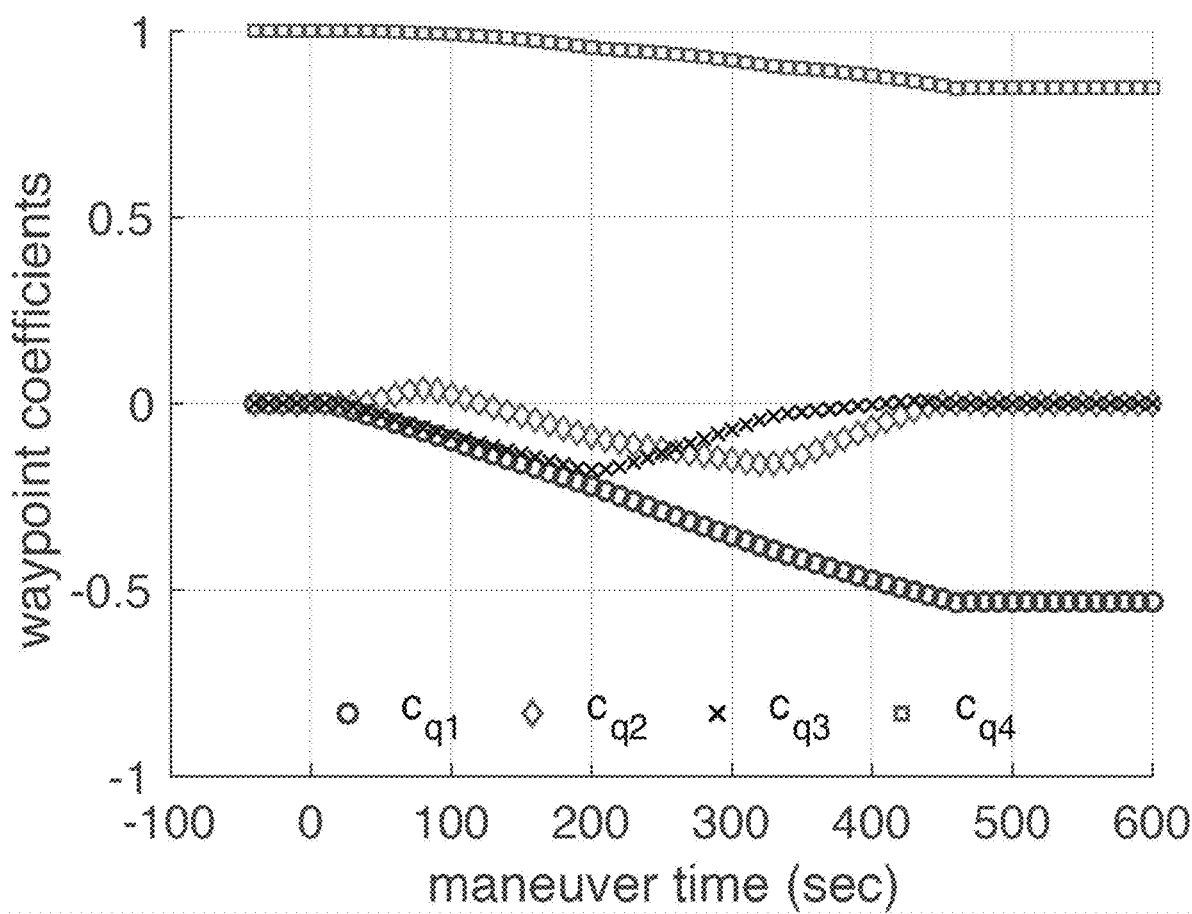
FIG. 39B shows example quaternion trajectories for attitude guidance: waypoint coefficients determined by Kalman filtering.

In this way, the implementation is as shown in FIG. 38 where all the filters are implemented at the lower data rate. In FIG. 38, variable f is an error. From the polyphase implementation we can determine a state space implementation which yields a more precise estimation of the spline coefficients c[k] using standard Kalman filtering techniques. By defining the state $$x[m]=[c[m],c[m-1],c[m-2],c[m-3]]^T \quad (24)$$

and the last component in the polyphase decomposition, corresponding to I=M−1

$$s[(m+1)M-1]=h_{M-1}[0]c[m]+\ldots+h_{M-1}[3]c[m-3]+\epsilon_{M-1}[m] \quad (25)$$

we obtain a predictor for the coefficients $$c[m+1] = -\frac{h_{M-1}[1]}{h_{M-1}[0]}c[m] - \frac{h_{M-1}[2]}{h_{M-1}[0]}c[m-1] - \frac{h_{M-1}[3]}{h_{M-1}[0]}c[m=2] + \frac{1}{h_{M-1}[0]}s[(k+1)M+M-1] + \frac{1}{h_{M-1}[0]}\epsilon_{M-1}[(k+1)M+M-1] \quad (26)$$

By equations (22) and (24) we can determine a state space model for the coefficients as $$\begin{cases} x[m+1] = Ax[m] + Bu[m] + v[m] \\ y[m] = Cx[m] + w[m] \end{cases} \quad (27)$$

with $$u[m] = s[(m+2)M-1] \quad (28)$$
$$v[m] = B \in [(m+2)M-1]$$
$$y[m] = [s[mM], s[Mm+1], \cdots, s[mM+M-2]]^T$$

and the matrices $$A = \begin{bmatrix} -\frac{h_{M-1}[1]}{h_{M-1}[0]} & -\frac{h_{M-1}[2]}{h_{M-1}[0]} & -\frac{h_{M-1}[3]}{h_{M-1}[0]} & 0 \\ 1 & 0 & 0 & 0 \\ 0 & 1 & 0 & 0 \\ 0 & 0 & 1 & 0 \end{bmatrix} \quad (29)$$

$$B = \begin{bmatrix} -\frac{1]}{h_{M-1}[0]} \\ 0 \\ 0 \\ 0 \end{bmatrix}; C = \begin{bmatrix} h_0 \\ h_1 \\ \vdots \\ h_{M-2} \end{bmatrix}$$

The vectors $h_0, \ldots, h_{M-2}$ are defined as $$h_\ell = [h_{\ell\,[0]}, h_{\ell\,[1]}, h_{\ell\,[2]}, h_{\ell\,[3]}],$$

for $\ell=0, \ldots, M-2$ (30)

Based on the state space model described above, the state coefficients c[m] are estimated by standard Kalman filtering:

m=0, . . . ,end; $\hat{x}_-[-1]$=initial conditions $\hat{x}_-[m]=A\hat{x}_+$
[m−1]$P_-[m]=AP_+[m-1]A^T+Q$ $K[m]=P_-[m]C^T$
$(CP_-[m]C^T+R)^{-1}\hat{x}_+[m]=\hat{x}_{-[m-}1]+K[m](y[m]-C\hat{x}_-$
$[m])P_+[m]=(I-K[m]C)P_-[m]$ (31)

Since the waypoint data is given in a fixed length interval, transient effects due to boundary conditions can be eliminated by filtering followed by a smoother as m=end−1, . . . ,0; $\hat{x}$[end]=$\hat{x}_+$[end]$\hat{x}_-[m]=\hat{x}_+[m]+H[m]$
$(\hat{x}[m+1]-\hat{x}_-[m+1])H[m]=P_+[m]A^TP_-^{-1}[m+1]$ (32)

2) Determining the Waypoint Coefficients Using a Kalman Filtering Process

The first step for implementing an attitude guided maneuver using the proposed interpolating pre-filter is to perform a data pre-processing step to determine the sequence of downsampled waypoint coefficients that will be used as the inputs for interpolation. This step is done using the Kalman filtering and smoothing process described earlier. Note that since the interpolating filter has dynamics, the interpolated quaternion profile will differ from the original data. Preprocessing a maneuver profile of length $N_p$ waypoints using that Kalman filter generates a sequence of compressed coefficients, $C_q[k]$, k=1, 2 . . . , $[N_p/M1]$, with M denoting the compression factor, that 'lead' the pre-filter response. These coefficient waypoints are used as the downsampled data for the attitude guidance trajectory.

Pre-processing also addresses two other practicalities. First, the attitude guidance trajectory should be extended to eliminate transient errors of the interpolated signal at the filter startup. Such errors can be mitigated by properly setting the initial states of the DF-II filter bank. Doing so may not be practical, however, because additional commanding would be required in order to initialize the filter states prior to each maneuver. Instead, by extending the trajectory to the left (and right) by N≥4 samples, the quaternion error between the commanded identity quaternion, $I_q=[0, 0, 0, 1]^T$, and the DF-II filter output at the beginning of the maneuver is on the order of $10^{-10}$ (less than 0.1-milliarcseconds). This facilitates a smooth transition from nadir attitude hold to attitude tracking. The right extension similarly facilitates smooth transition from attitude tracking to off-nadir attitude hold for scientific observations.

The second practicality that needs to be addressed is the fact that interpolation via the DF-II filter bank is a causal process and as a consequence, the interpolated output is delayed $t_d=2M\delta_T$ by, where M is the expansion factor and is reciprocal of the attitude controller update rate. In other words, the interpolator output at any instant in time depends on several preceding downsampled inputs. It is well known that such a delay could potentially cause instability in feedback loops and this is the main reason why such higher-order hold circuits are seldom used in control systems. However, in the present case, the DF-II filter bank is being used as a pre-filter that is not embedded in a feedback loop so instability is not a concern. Moreover, the delay can be annihilated simply by shifting the time tags on the entire sequence of $C_q$ to the left by ta seconds, i.e. by two downsamples.

Figure 40:
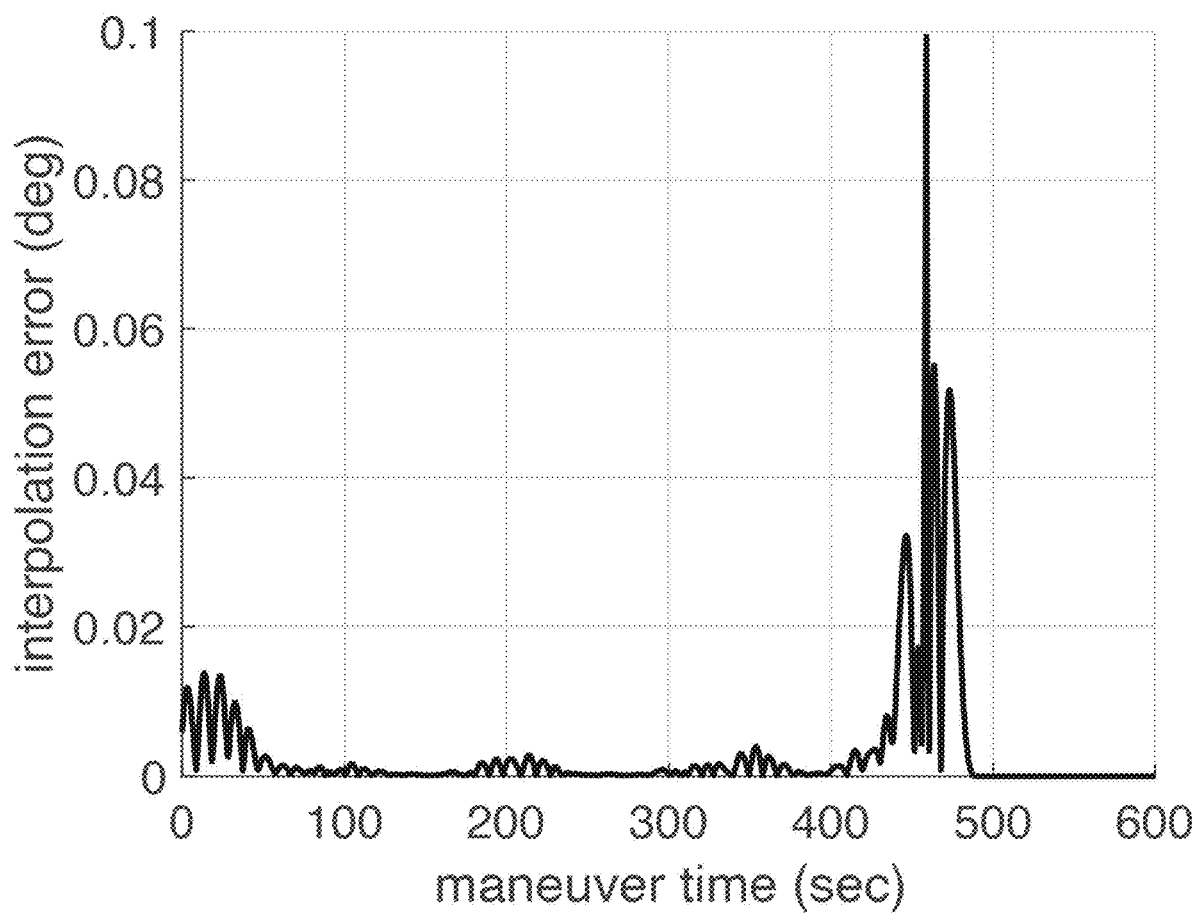
FIG. 40 shows interpolation "cone error" of an example attitude guidance command trajectory using waypoint coefficients determined by Kalman filtering.

Now that the nuances for a practical implementation have been addressed, the process of creating a quaternion command trajectory at the ACS update rate using a sequence of downsampled waypoints can be demonstrated. FIGS. 39A-FIG. 39D shows the downsampled attitude guidance trajectory, q[k], for the FastMan implemented on Aug. 25, 2021 as well as the corresponding waypoint coefficients, $c_q[k]$ that are generated by the application of the Kalman smoother. Note that the attitude command trajectory is referenced to the spacecraft orbital frame as opposed to ECI. Thus, the curves in FIGS. 39A-FIG. 39D represent an attitude 'offset' from the orbital frame. In FIGS. 39A-FIG. 39D, the downsampling rate was 0.1-Hz, which gives an interpolation expansion factor, M=50. As shown, the data sequence was extended to the left by six downsamples to accommodate interpolating filter start-up as well as to accommodate the delay introduced by the DF-II filter bank. As described above, either the sequence of q[k] or $c_q[k]$ can be processed by the interpolating filter. However, utilizing the waypoint coefficients, $c_q[k]$, minimizes the error between the continuous-time FastMan reference trajectory, $q_{ref}$, and the interpolated guidance trajectory, $q_{interp}$. The interpolation error is shown in FIG. 40, which reports the interpolation error in terms of the 'cone error' defined as $\phi_e=2 \tan^{-1}(\|v_e\|2/s_e)$, where $v_e$ and $s_e$ are the vector and scalar parts, respectively, of the quaternion error, $q_e=q-1_{interp} \otimes q_{ref}$.

Figure 41A:
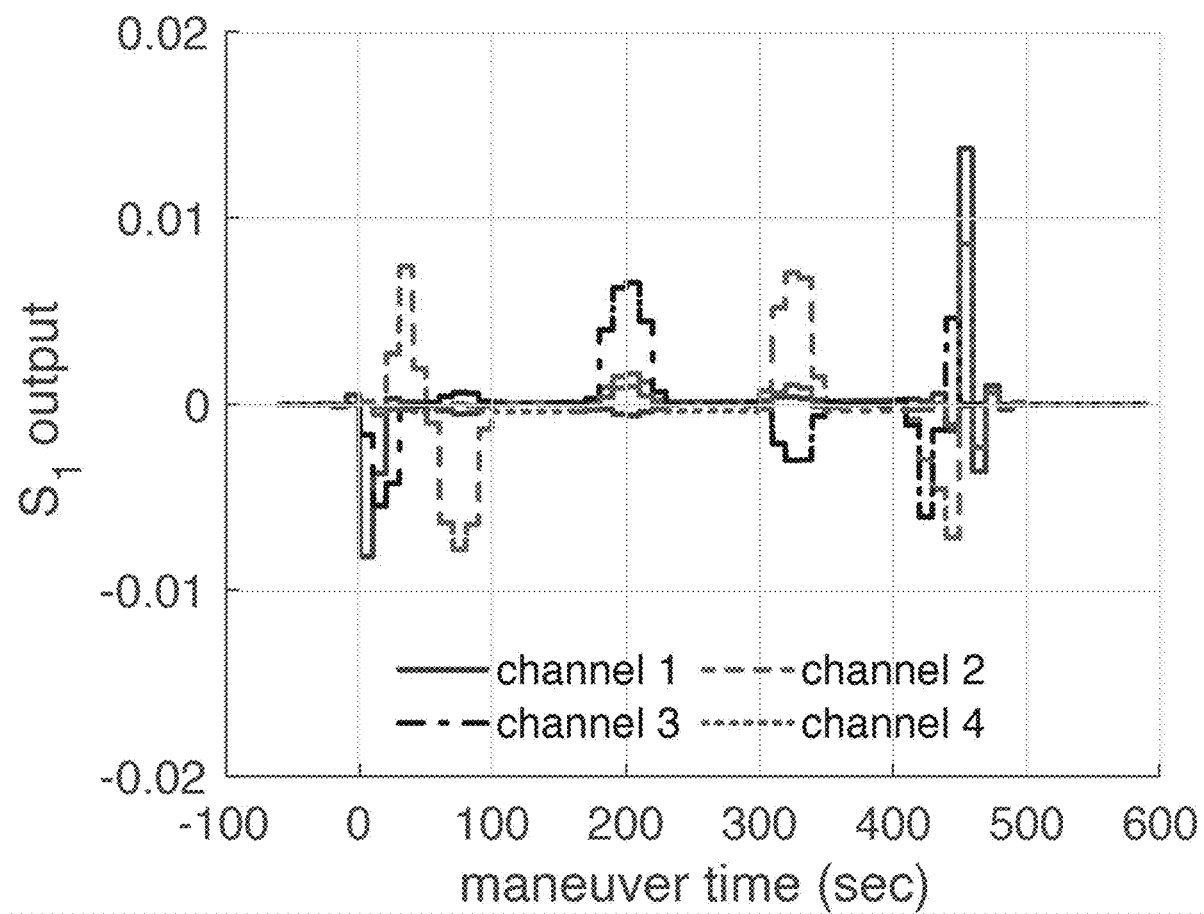
FIG. 41A shows the output of the DF-II filter stages for cubic spline interpolating pre-filters: slow filter $S_1$.
Figure 41B:
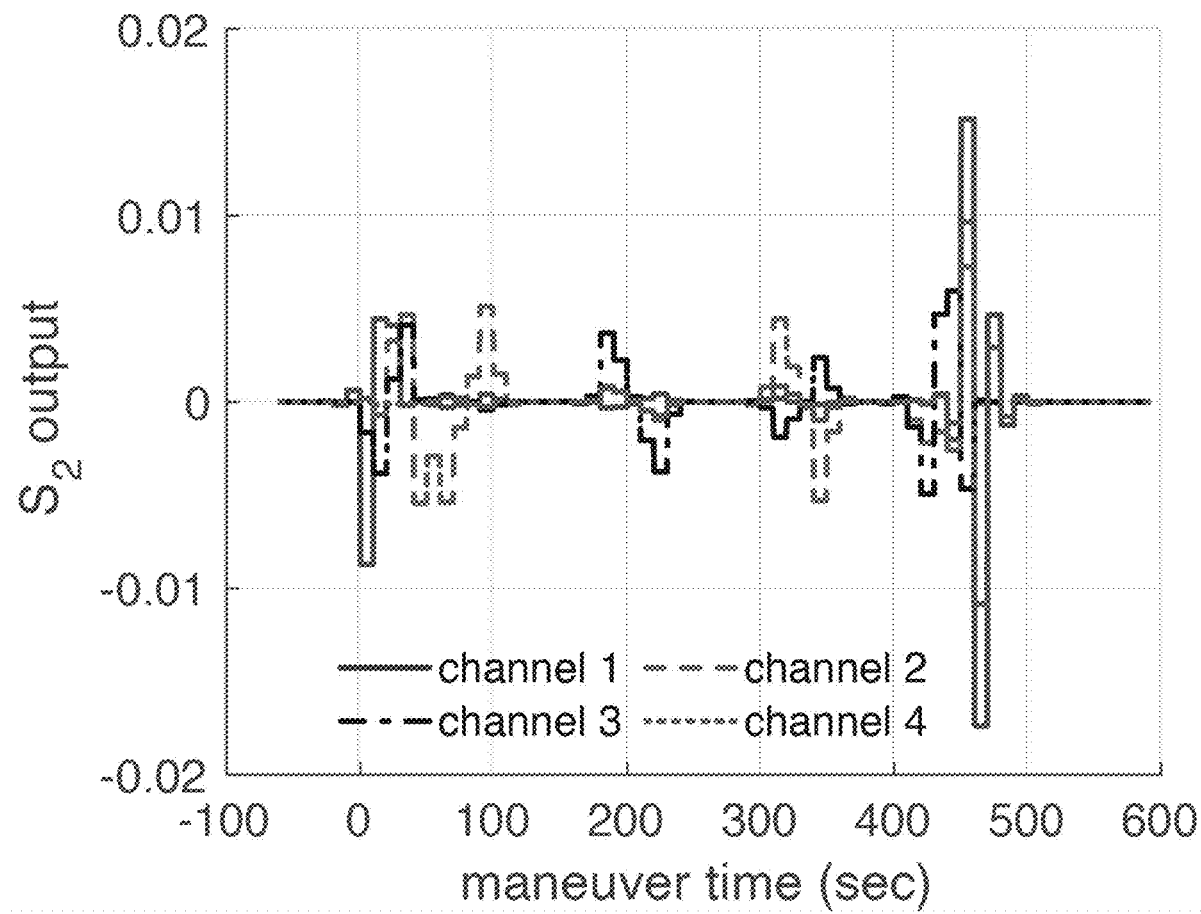
FIG. 41B shows the output of the DF-II filter stages for cubic spline interpolating pre-filters: slow filter $S_2$.
Figure 41C:
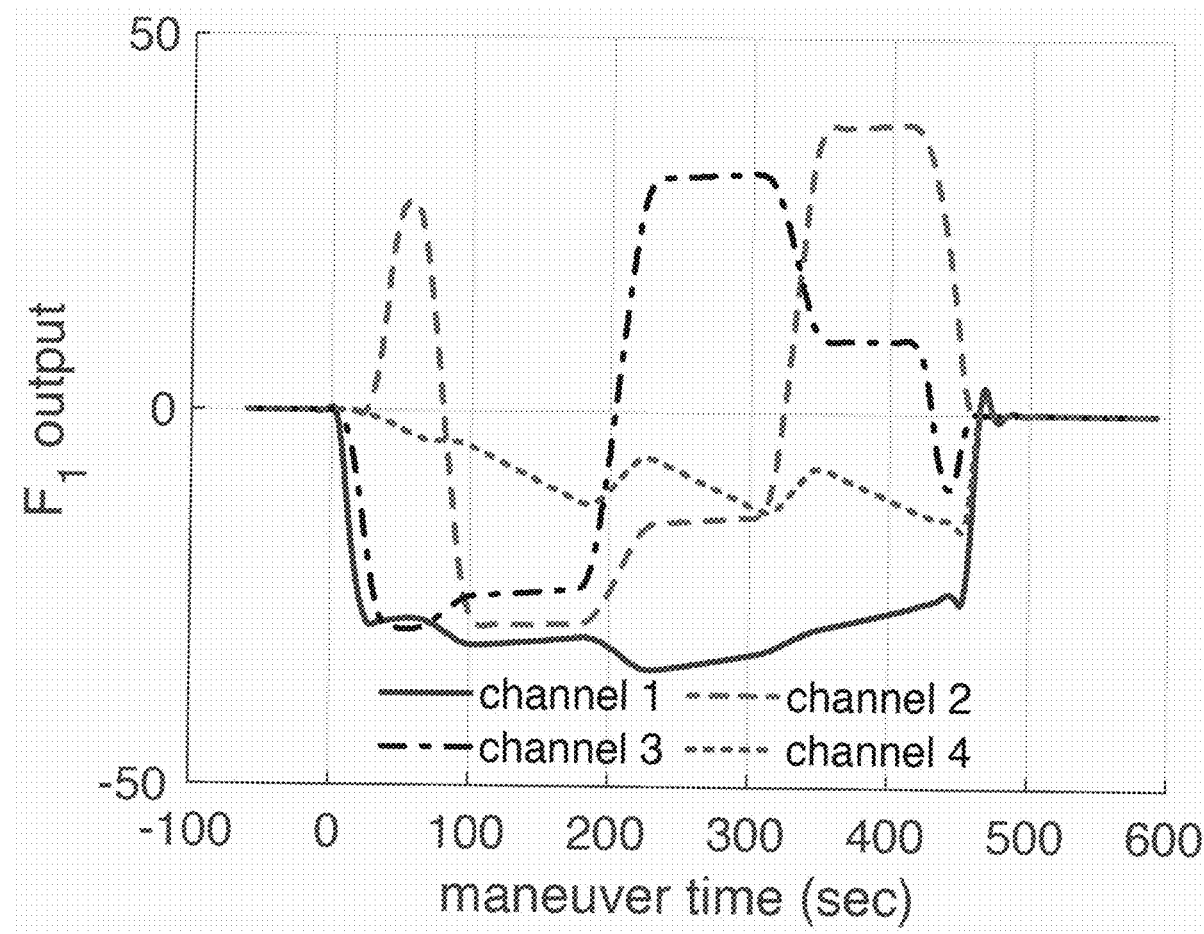
FIG. 41C shows the output of the DF-II filter stages for cubic spline interpolating pre-filters: fast filter $F_1$.
Figure 41D:
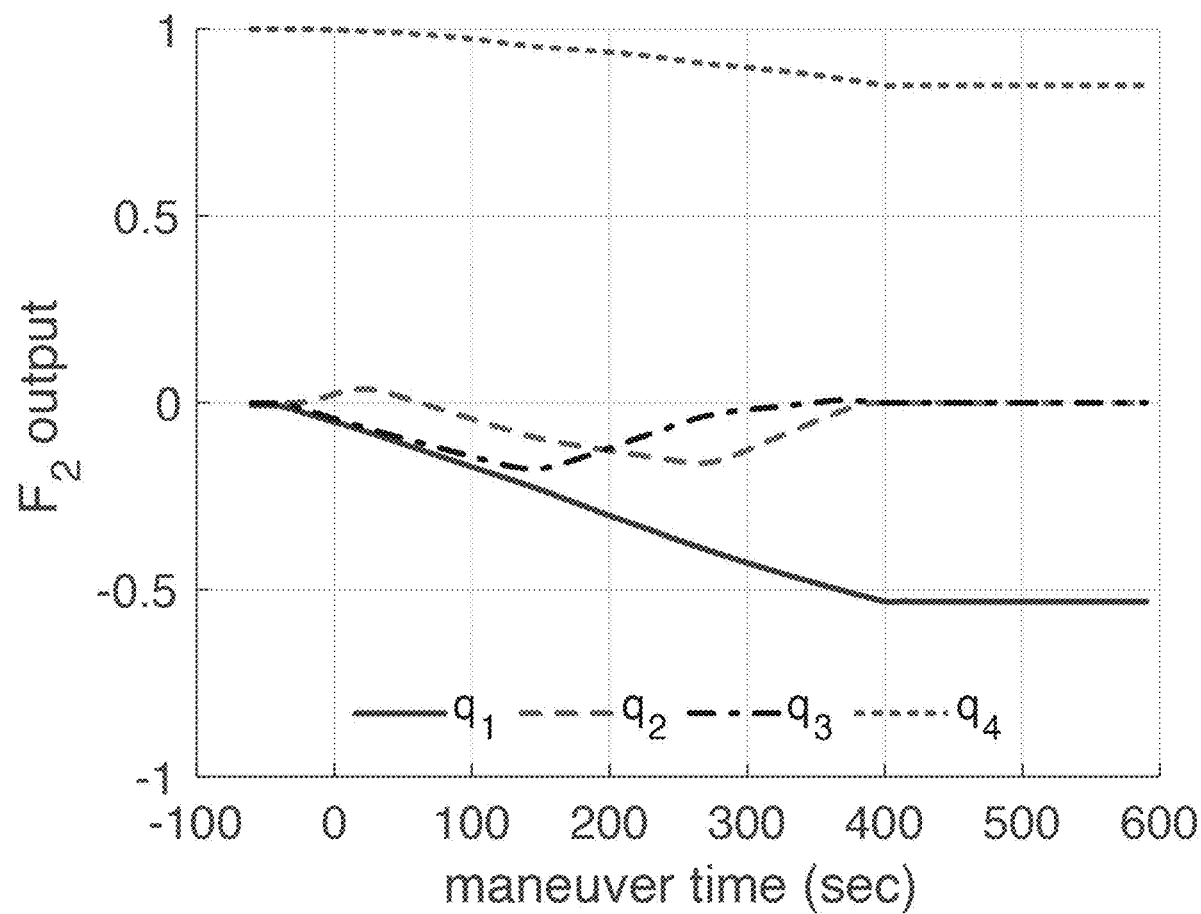
FIG. 41D shows the output of the DF-II filter stages for cubic spline interpolating pre-filters: fast filter $F_2$ normalized to preserve the unit norm condition.
Figure 42A:
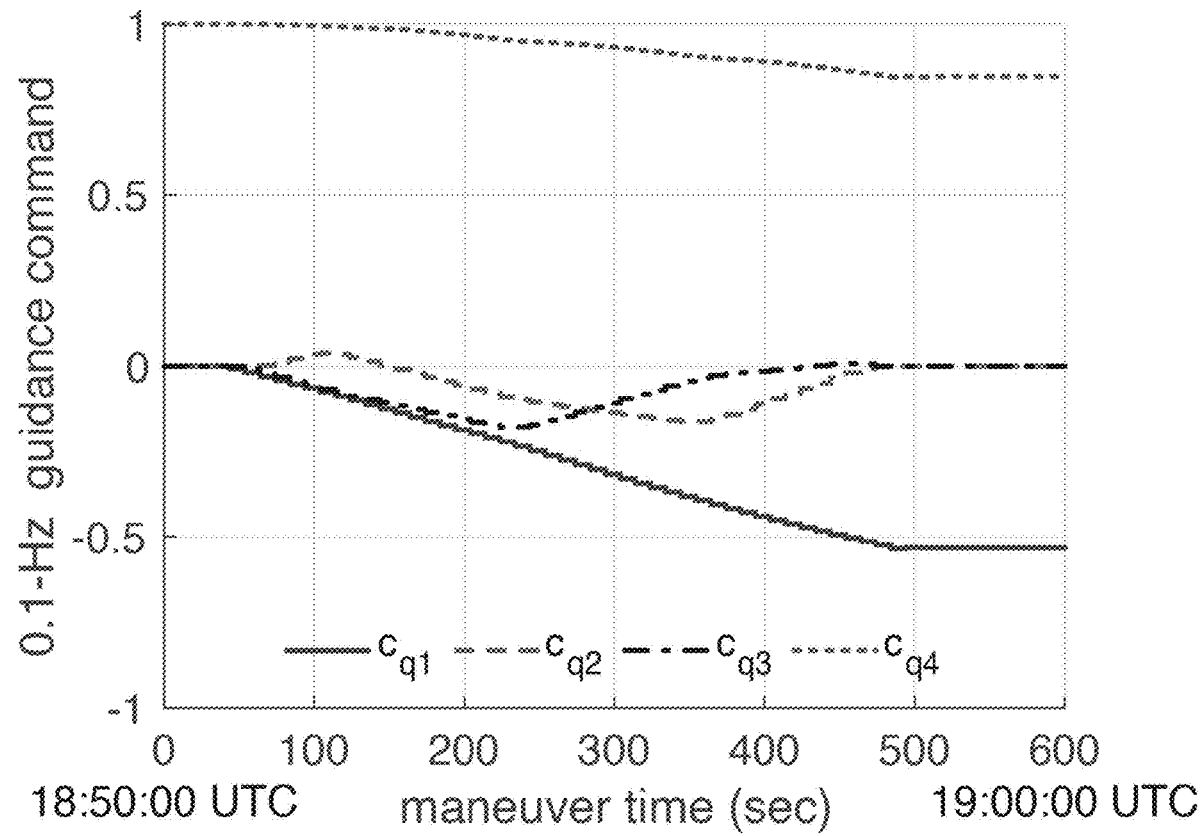
FIG. 42A shows High-fidelity simulation data for FastMan using a B-spline interpolating pre-filter: attitude guidance commands (downsampled at 0.1 Hz)
Figure 42B:
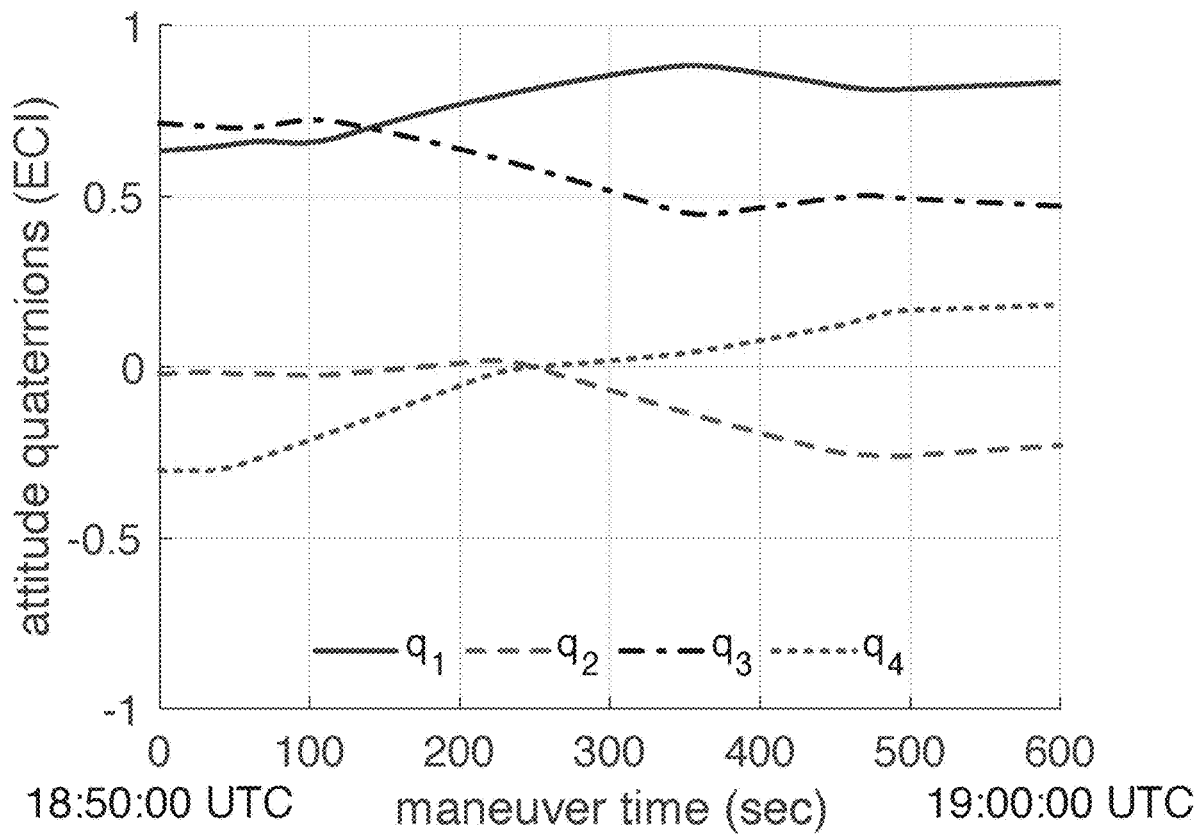
FIG. 42B shows High-fidelity simulation data for FastMan using a B-spline interpolating pre-filter: attitude response.
Figure 42C:
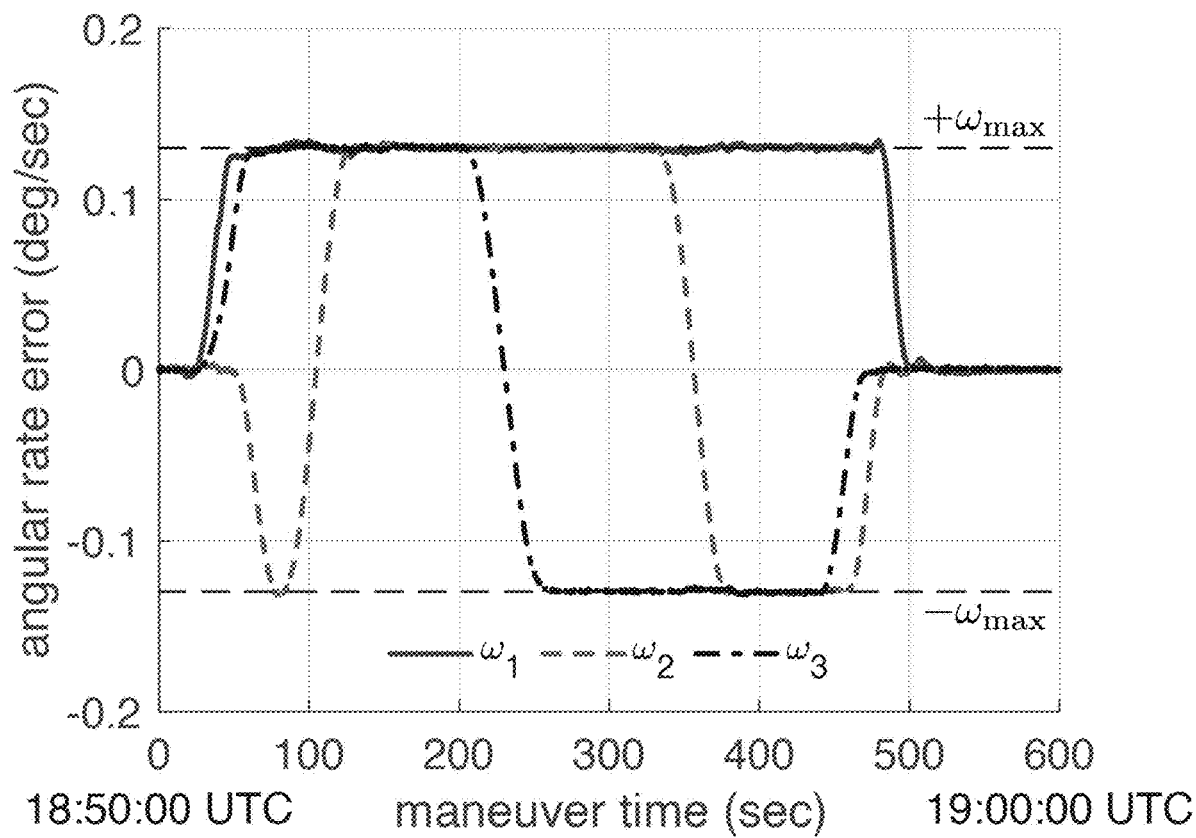
FIG. 42C shows High-fidelity simulation data for FastMan using a B-spline interpolating pre-filter: controller rate error.
Figure 42D:
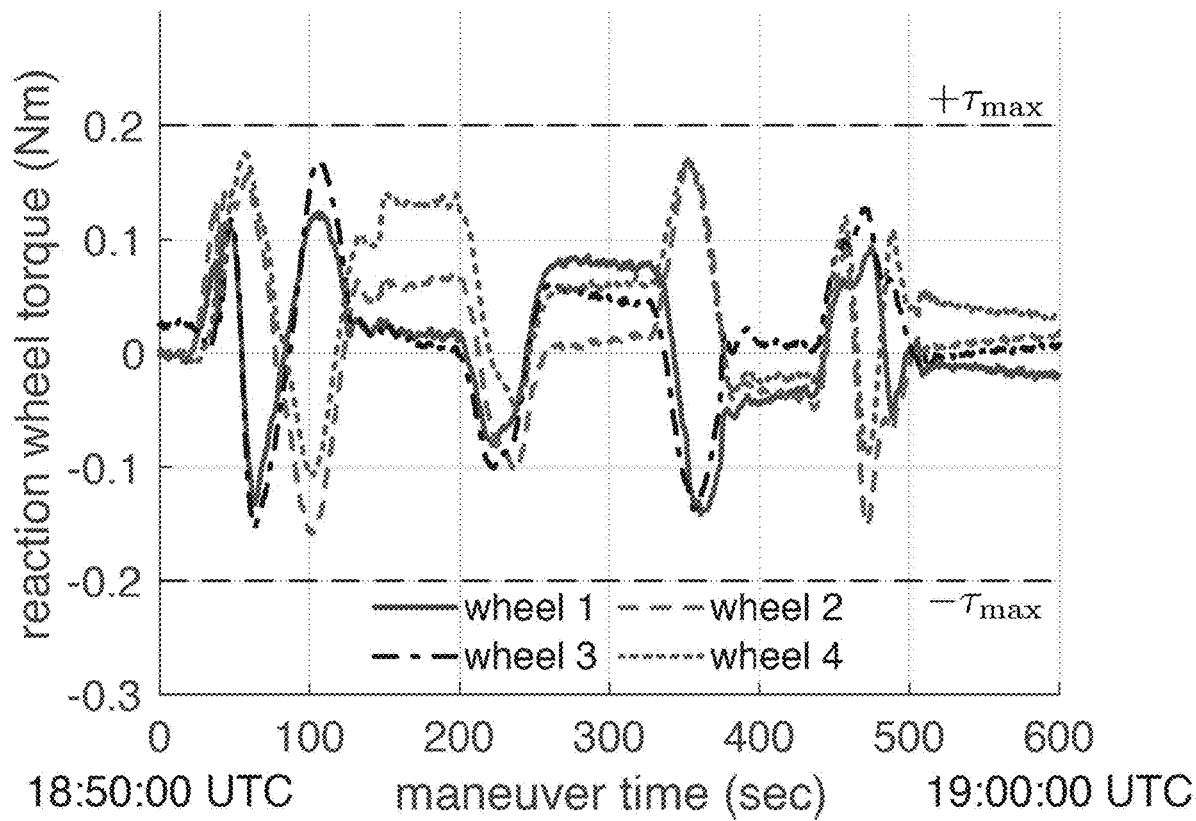
FIG. 42D shows High-fidelity simulation data for FastMan using a B-spline interpolating pre-filter: reaction wheel torques.

The interim outputs of the various DF-II filter stages are shown in FIGS. 41A-FIG. 41D to illustrate the evolution of the signals as they are processed through the filter bank. Referring to FIGS. 41A and 41B, it is seen that the command data stream, which is loaded serially from the spacecraft command buffer, is first manipulated by the two slow filters S1 and S2 (operating at the downsampling rate) to form a sequence of signals that are held constant over each downsample period. These signals can be interpreted as a series of constant 'jerk' segments, i.e. . . . for each quaternion. These are then integrated by the fast filters F1 and F2 (operating at the ACS update rate) to form a $C^2$ smooth quaternion trajectory (see FIGS. 41C and 41D that is applied as the input signal to the closed-loop attitude controller. Note that the curves in FIG. 41D are normalized to preserve the unit norm condition and so scaling by the factor $M^{-3}$ is not required.

Conclusions

In attitude guidance, a conventional closed-loop ACS is used to track an optimized maneuver trajectory as opposed to simply regulating to a set-point attitude. The maneuver trajectory for attitude guidance is generated as part of a ground operations process as a continuous-time quaternion profile that must be sampled for implementation on a spacecraft. This approach can reduce maneuver time and provide attitude steering to satisfy various engineering constraints, but requires a large amount of data to be transmitted and stored on the vehicle. This disclosure has presented a practical pre-filter that can be used to implement attitude guided maneuvers by interpolating at the attitude control system (ACS) update rate while significantly reducing data requirements for transmitting and storing maneuver command sequences. The interpolating pre-filter is built by implementing a third-order Cascaded Integrator Comb (CIC) filter, to achieve signal expansion by a user selected factor. The process for determining the sequence of waypoint coefficients, viz. time-tagged quaternion waypoints, for an attitude guided maneuver that eliminates the low-pass effects of the interpolating filter is described so that a maneuver can be implemented as if it were commanded at the native ACS update rate. An implementation of the filter that facilitates flight software implementation in terms of a series connection several second-order biquadratic filters was presented. Simulations using a high-fidelity model of NASA's Lunar Reconnaissance Orbiter showed that a 50:1 data compression (or more) can be achieved without any impact on maneuver performance and while enhancing overall performance by (i) eliminating undesirable intersample ripple phenomenon and (ii) reducing stress on the attitude control hardware.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A method for controlling an attitude of a spacecraft, the method comprising:
    obtaining, by a ground-based spacecraft control system, an attitude trajectory of the spacecraft, wherein the ground-based spacecraft control system is operatively associated with a spacecraft attitude control system;
    down sampling, by the ground-based spacecraft control system, the attitude trajectory and using a Kalman filtering process to determine a state space implementation of spline coefficients for time-tagged spacecraft commands;
    transmitting, by the ground-based spacecraft control system, the time-tagged spacecraft commands to the spacecraft after processing the down sampled attitude trajectory;
    applying, by the spacecraft attitude control system, a B-spline interpolation filter to a sequence of down-sampled attitude trajectory points to determine a set of interpolated spacecraft commands at an arbitrary upsampling rate;
    reconstructing, by the spacecraft attitude control system, a time varying attitude command trajectory by applying a rectangular pulse zero order hold (ZOH) function; and
    modifying, by the spacecraft attitude control system, an attitude of the spacecraft based on the interpolated spacecraft commands.

2. The method of claim 1, wherein each of the time-tagged spacecraft commands is loaded from an absolute time sequence command buffer or relative time sequence command buffer.

3. The method of claim 1, wherein the time-tagged spacecraft commands are produced at an update rate of the spacecraft attitude control system.

4. The method of claim 1, wherein the B-spline interpolation filter has an interpolation error controlled by an order of the B-spline interpolation filter.

5. The method of claim 1, wherein the B-spline interpolation filter has an interpolation error controlled by an expansion factor M.

6. The method of claim 1, wherein the B-spline interpolation filter is implemented with B-spline polynomial.

7. The method of claim 1, wherein the B-spline interpolation filter is implemented using a direct form filter structure or a series connection of direct form filter structures.

8. A vehicle guidance system for implementing attitude control of a vehicle, comprising:
    a command reduction module for generating a reduced data set corresponding to a time-varying attitude command trajectory for a vehicle;
    wherein the command reduction module circuitry is configured to receive at least one time-varying attitude command; wherein the time-varying attitude command trajectory defines an attitude of the vehicle; and reduces the at least one time-varying attitude command trajectory into a vector of B-spline polynomial coefficients using a Kalman filtering process and smoothing process; and a command reconstruction module for generating data corresponding to the time varying attitude command trajectory;

wherein the command reconstruction module is configured to receive the vector of B-spline polynomial coefficients; and reconstruct at least one time-varying attitude command trajectory by utilizing the vector of B-spline polynomial coefficients to perform a B-spline interpolation operation, and apply a zero order hold (ZOH) function.

9. The vehicle guidance system according to claim 8, further comprising:

a first communication interface located remote from the vehicle and a second communication interface located on the vehicle, the first communication interface configured to transmit the vector of B-spline polynomial coefficients to the second communication interface.

10. The vehicle guidance system according to claim 8, further comprising:

an attitude control system including an input for receiving a command trajectory; and a switching device including an input operatively coupled to the command reconstruction module, and an output operatively coupled to the attitude control system input, the switching device configured to selectively provide the reconstructed time-varying attitude command trajectory to the attitude control system input.

11. The vehicle guidance system according to claim 8, wherein the circuitry configured to reduce the at least one time-varying attitude command trajectory into the vector B-spline polynomial coefficients is configured to perform the reduction based on a user input.

12. The vehicle guidance system according to claim 8, wherein the user input comprises at least one of an initial maneuver time or an end maneuver time for the vehicle, time histories of vehicle attitude commands, a predetermined number N of B-spline polynomial coefficients to compute, N being an integer, a tolerance for an acceptable B-spline polynomial approximation error, a set of mathematical basis functions b(t), or a set of distinct time points or nodes.

13. The vehicle guidance system according to claim 8, wherein the circuitry configured to reduce the at least one time-varying attitude command trajectory is configured to expand N+1 mathematical basis functions b(t) over a selected time grid, compute the values of a set of B-spline polynomial coefficients c for N+1 basis functions using the Kalman filtering process, and evaluate the infinity norm, wherein N is a non-negative integer.

14. The vehicle guidance system according to claim 13, wherein the circuitry configured to reduce the at least one time-varying attitude command trajectory is configured to compare the evaluated infinity norm to a predetermined tolerance;

if the evaluated infinity norm is greater than the predetermined tolerance, increment N and repeat the expansion and evaluation steps; and if the evaluated infinity norm is less than the predetermined tolerance, conclude that the reduction process is complete.

15. The vehicle guidance system according to claim 8, wherein the circuitry configured to reconstruct the at least one time-varying attitude command trajectory is configured to perform the reconstruction based on at least one of an initial maneuver time for the vehicle, an end maneuver time for the vehicle, an attitude control system sample time, a clock time of the vehicle control system, a set of mathematical basis functions, or a set of distinct time points or nodes.

16. The vehicle guidance system according to claim 15, wherein the circuitry configured to reconstruct the at least one time-varying attitude command trajectory is configured to use B-spline polynomials as the basis functions $b_j(t)$.

17. A method for implementing attitude control of a vehicle, comprising:

receiving, at a remote location from the vehicle data corresponding to at least one time-varying attitude command trajectory defining an attitude of the vehicle;

processing, at the remote location, the at least one time-varying attitude command trajectory using a Kalman filter to determine a state space implementation of spline coefficients and generate a down sampled attitude command trajectory including a vector of B-spline polynomial coefficients;

communicating, at the remote location, the down sampled attitude command trajectory to the vehicle; and modifying, by the vehicle, an attitude of the vehicle based on the down sampled attitude command trajectory and an interpolation filter operatively associated with the vehicle, wherein the interpolation filter is a B-spline interpolation filter applied to a zero order hold (ZOH) function.

18. The method according to claim 17, further comprising:

receiving, at the vehicle, the vector of B-spline polynomial coefficients; and using circuitry of a command reconstruction module to reconstruct the at least one time-varying attitude command trajectory by utilizing the vector of B-spline polynomial coefficients to perform a B-spline polynomial interpolation operation.

19. The method according to claim 18, wherein the vehicle is a spacecraft and the remote location includes a ground-based spacecraft control system operatively associated with control of the spacecraft.

20. The method according to claim 18, wherein the B-spline interpolation filter has an interpolation error controlled by an expansion factor M.

* * * * *